(12) United States Patent
Enamito et al.

(10) Patent No.: US 8,611,186 B2
(45) Date of Patent: Dec. 17, 2013

(54) SOUND IMAGE LOCALIZATION APPARATUS

(75) Inventors: Akihiko Enamito, Kawasaki (JP); Osamu Nishimura, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 435 days.

(21) Appl. No.: 13/071,550

(22) Filed: Mar. 25, 2011

(65) Prior Publication Data

US 2012/0033530 A1  Feb. 9, 2012

(30) Foreign Application Priority Data

Aug. 4, 2010  (JP) .................................. 2010-175691

(51) Int. Cl.
*G01S 15/00* (2006.01)
*G01S 15/88* (2006.01)

(52) U.S. Cl.
CPC ..................................... *G01S 15/88* (2013.01)
USPC .............................................. 367/99; 381/77

(58) Field of Classification Search
USPC .............................................. 367/99; 381/77
See application file for complete search history.

(56) References Cited

U.S. PATENT DOCUMENTS

| | | | |
|---|---|---|---|
| 2003/0185404 A1* | 10/2003 | Milsap | 381/77 |
| 2005/0195985 A1* | 9/2005 | Croft et al. | 381/77 |
| 2008/0273725 A1* | 11/2008 | Hartung et al. | 381/302 |
| 2008/0304361 A1* | 12/2008 | Peng et al. | 367/127 |
| 2009/0067291 A1* | 3/2009 | Atsmon et al. | 367/118 |
| 2009/0226000 A1* | 9/2009 | Kadar | 381/77 |
| 2010/0054483 A1* | 3/2010 | Mizuno et al. | 381/17 |

FOREIGN PATENT DOCUMENTS

| | | |
|---|---|---|
| JP | 11-88994 | 3/1999 |
| JP | 2003-174699 A | 6/2003 |
| JP | 2009-124395 A | 6/2009 |
| JP | 2010-074238 A | 4/2010 |
| JP | 2010-206265 A | 9/2010 |

OTHER PUBLICATIONS

Japanese Office Action dated Jul. 17, 2012 from corresponding JP 2010-175691, 6 pages.

Hasegawa, et al., *"Simply Realization of Sound Localization Using HRTF Approximated by IIR Filter"*; IEICE Trans. Fundamentals, vol. E83-A, No. 6, Jun. 2000, pp. 973-978.

* cited by examiner

*Primary Examiner* — Isam Alsomiri
*Assistant Examiner* — James Hulka
(74) *Attorney, Agent, or Firm* — Ohlandt, Greeley, Ruggiero & Perle, L.L.P.

(57) ABSTRACT

According to one embodiment, a sound image localization apparatus includes following units. The first signal generating unit is configured to generate a first acoustic signal. The first speaker is configured to generate a first sound according to the first acoustic signal. The input unit is configured to input a localization magnification n. The first control filter unit is configured to adjust the first acoustic signal with a first control filter G1 calculated based on the input localization magnification n to generate a first adjusted acoustic signal. The second control filter unit is configured to adjust the first acoustic signal with a second control filter G2 calculated based on the input localization magnification n to generate a second adjusted acoustic signal. The second and third speakers are configured to generate second and third sounds according to the first and second adjusted acoustic signals, respectively.

6 Claims, 41 Drawing Sheets

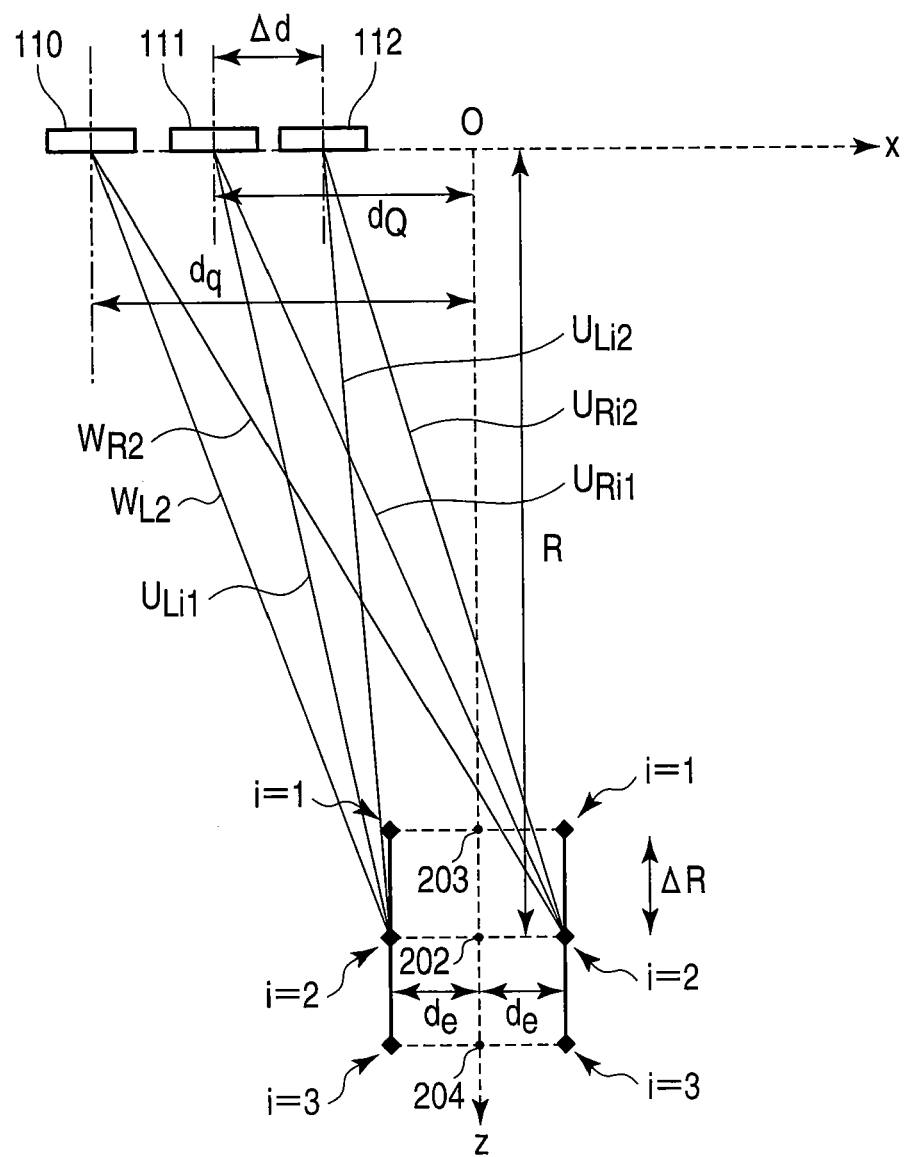
F I G. 4

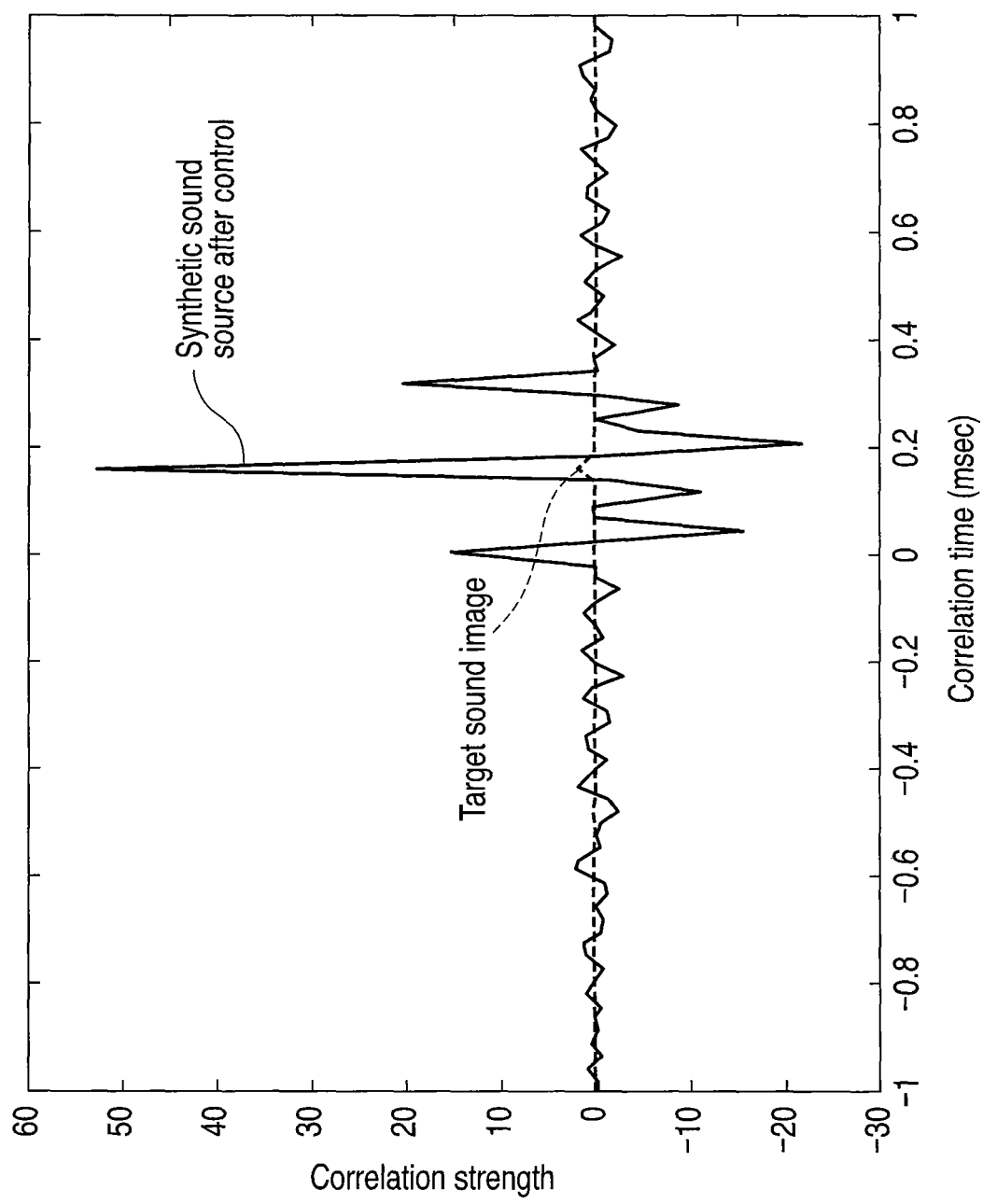
F I G. 11

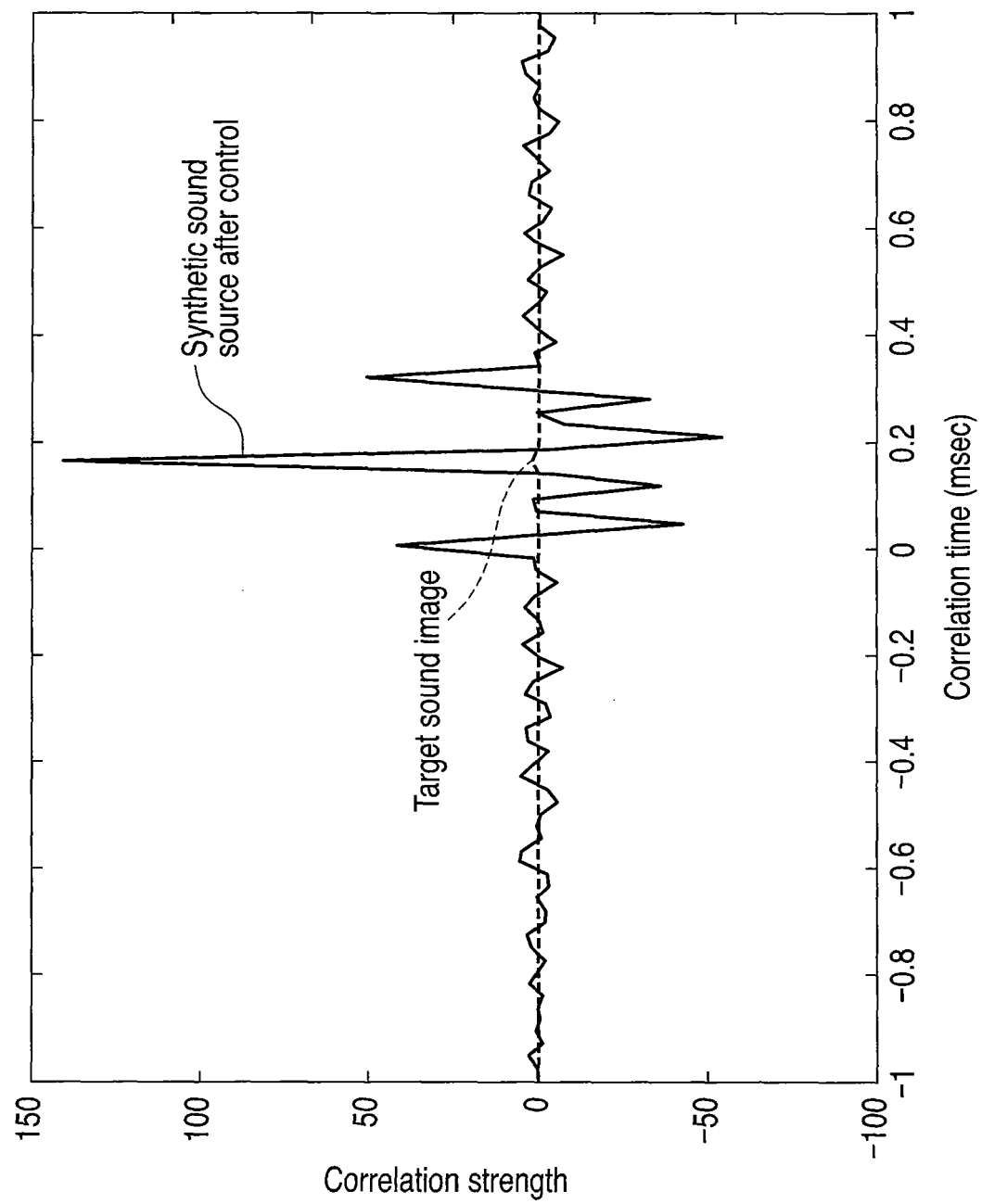
F I G. 12

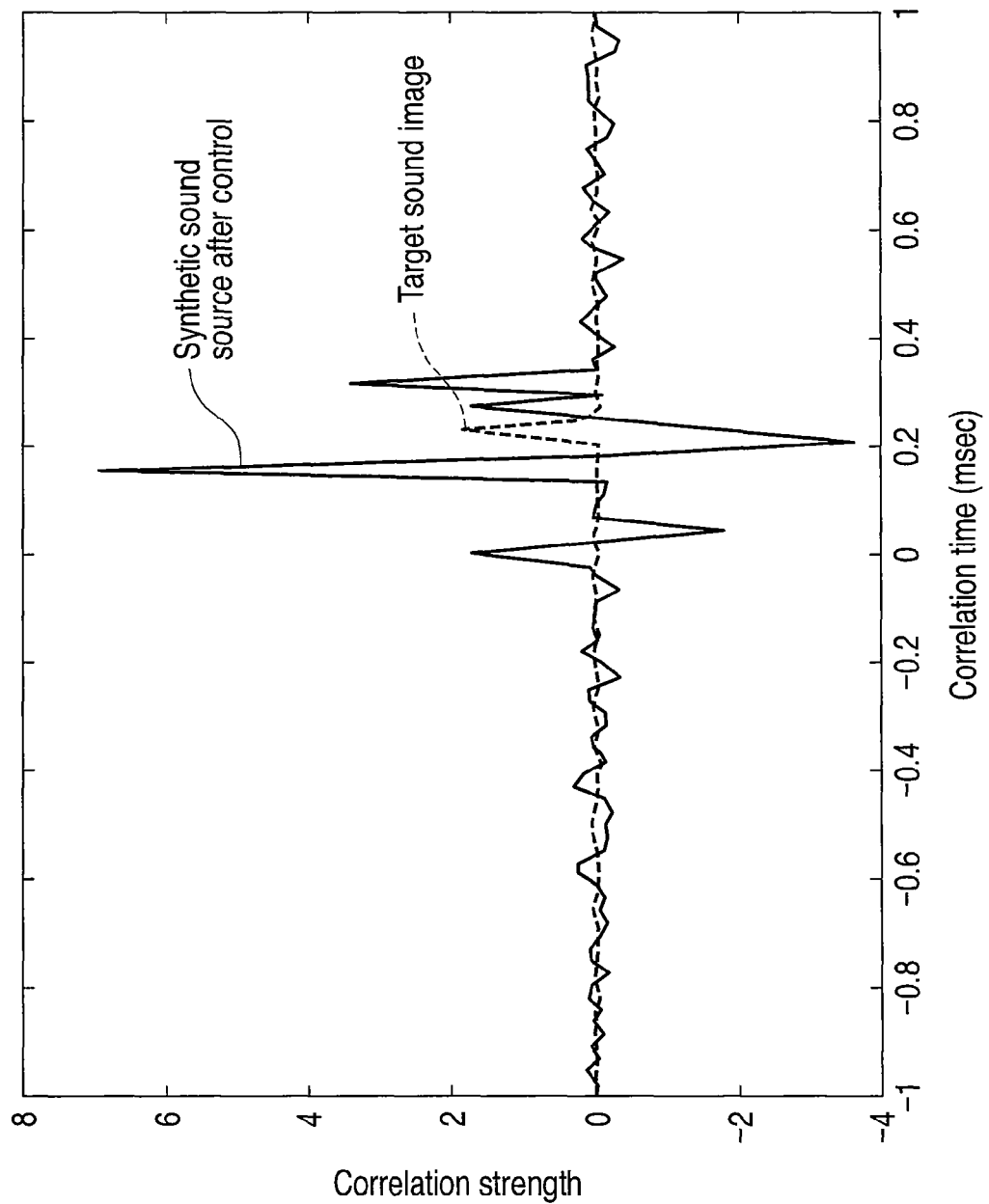
F I G. 13

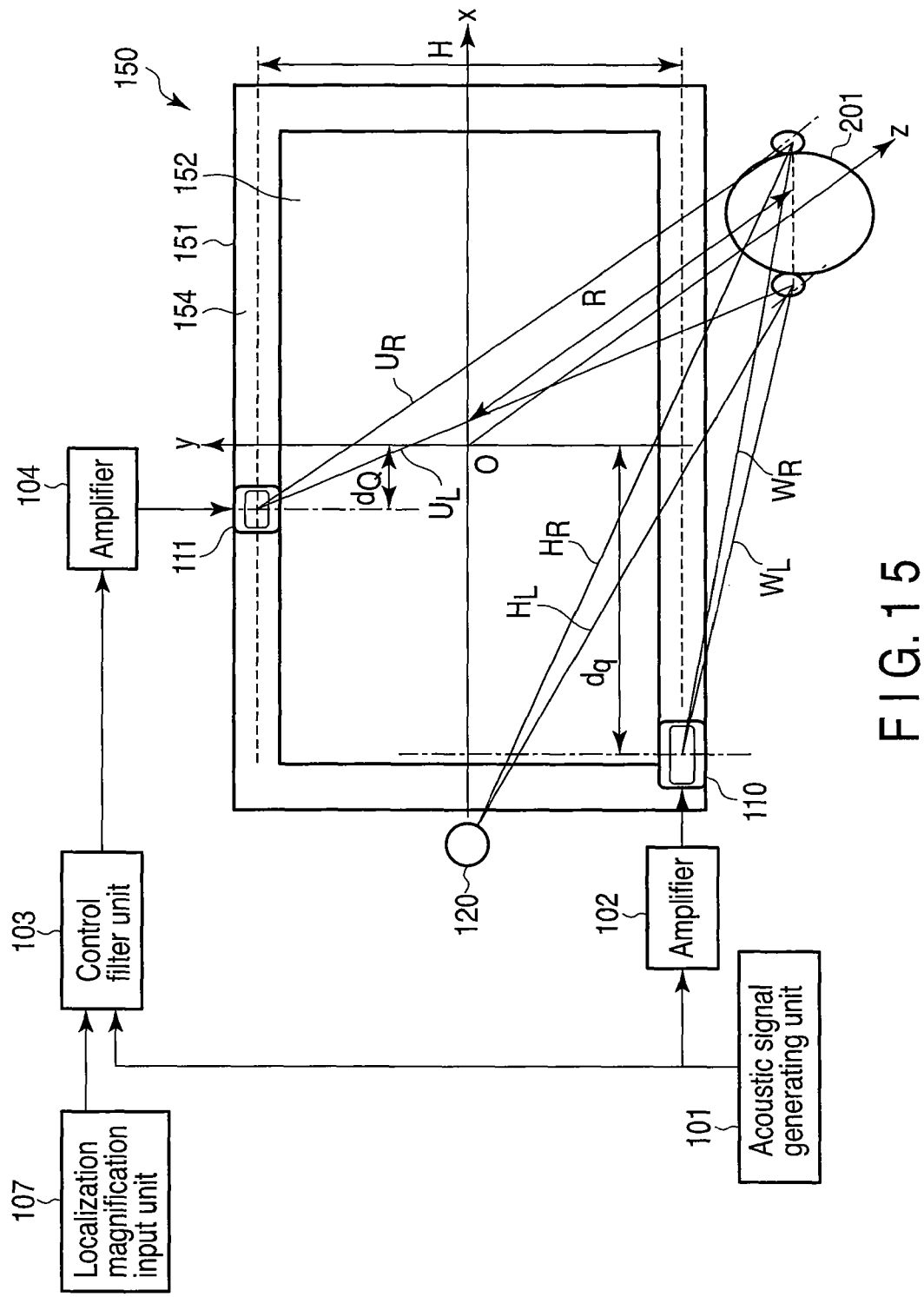
F I G. 15

Relationship between hearing distance R(m) and path tap difference ΔN

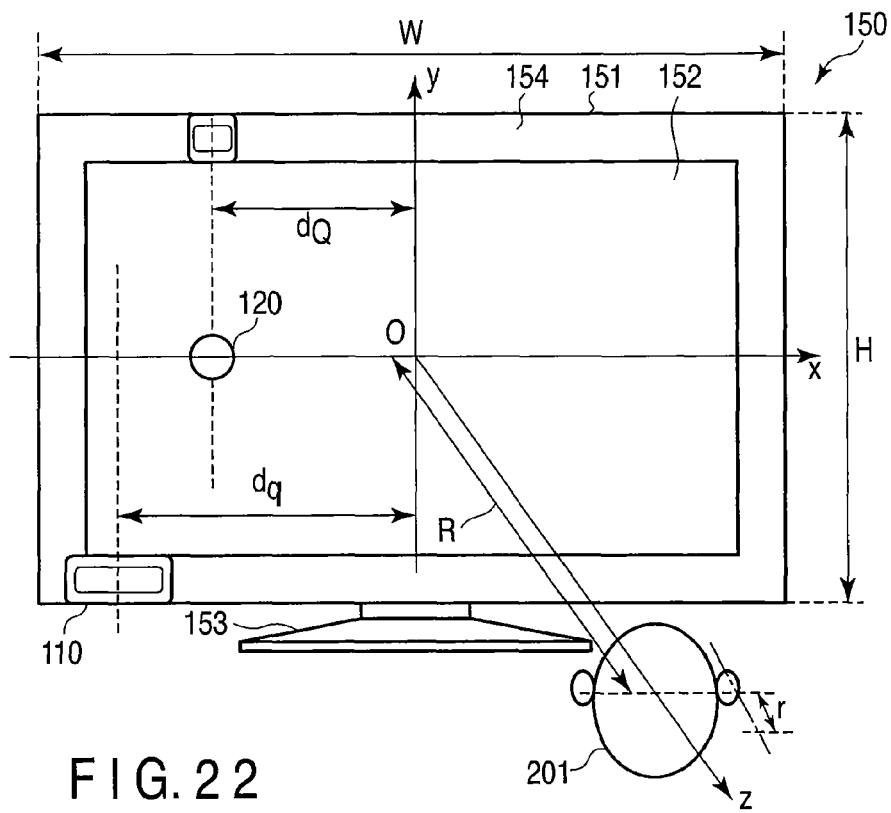
F I G. 2 2
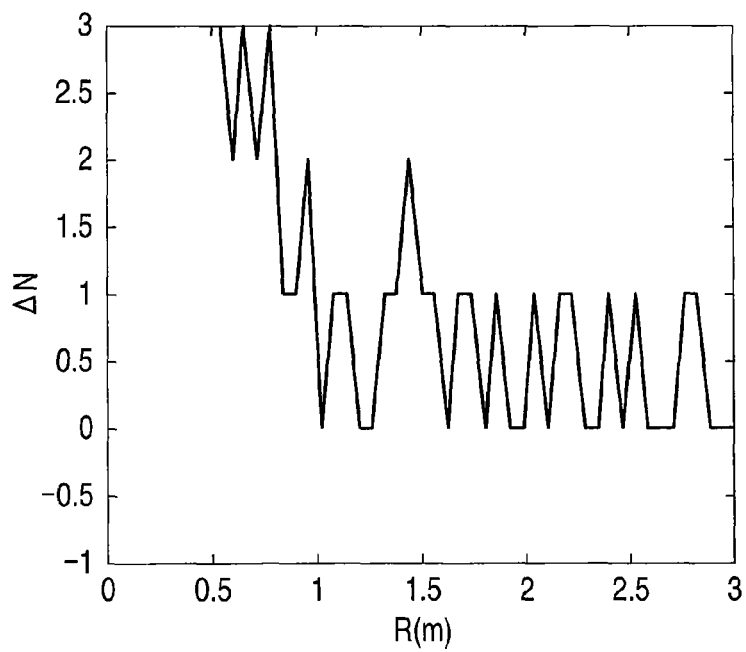
Relationship between hearing distance
R(m) and path tap difference ΔN
F I G. 2 3

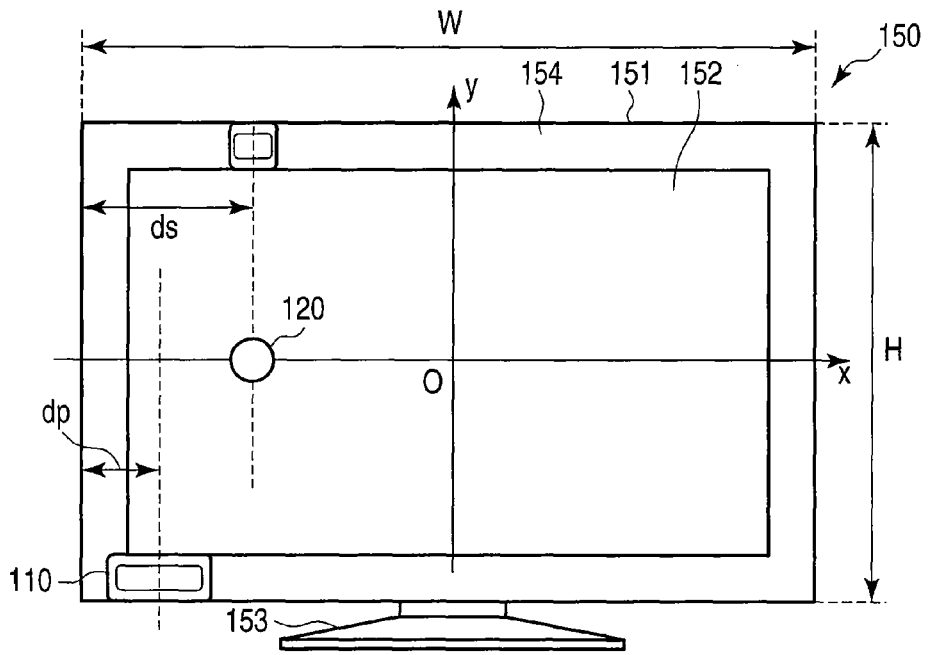
F I G. 24
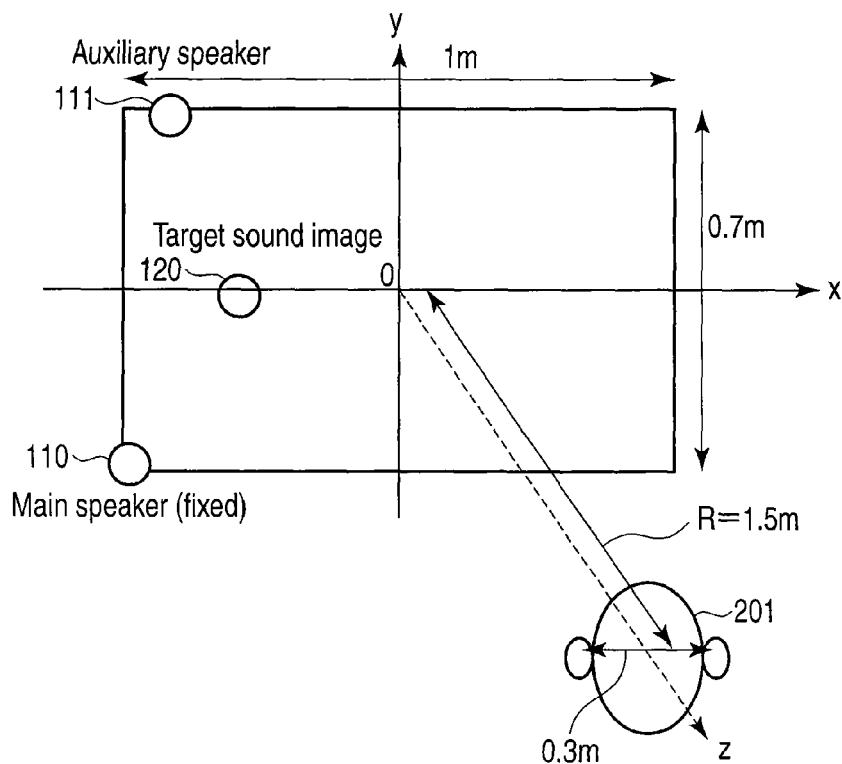
F I G. 25

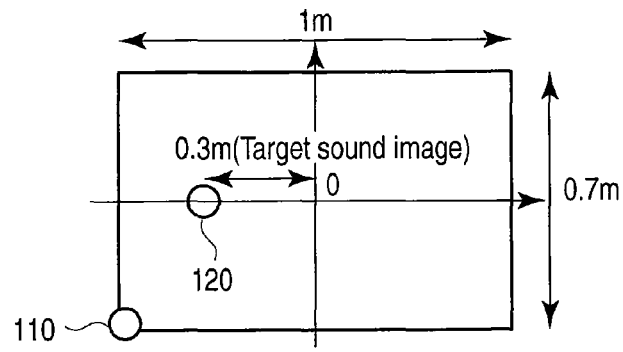
F I G. 27
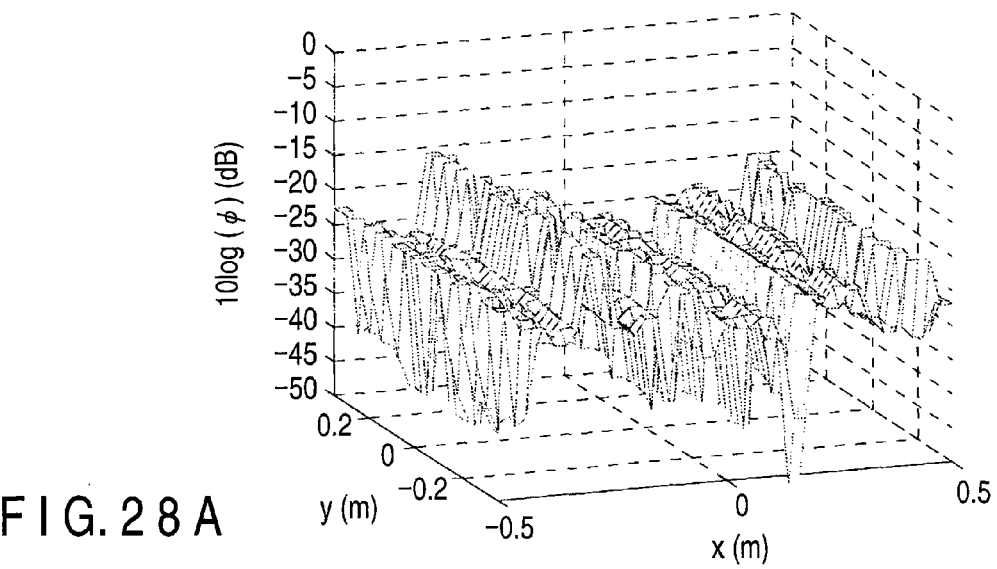
F I G. 28 A
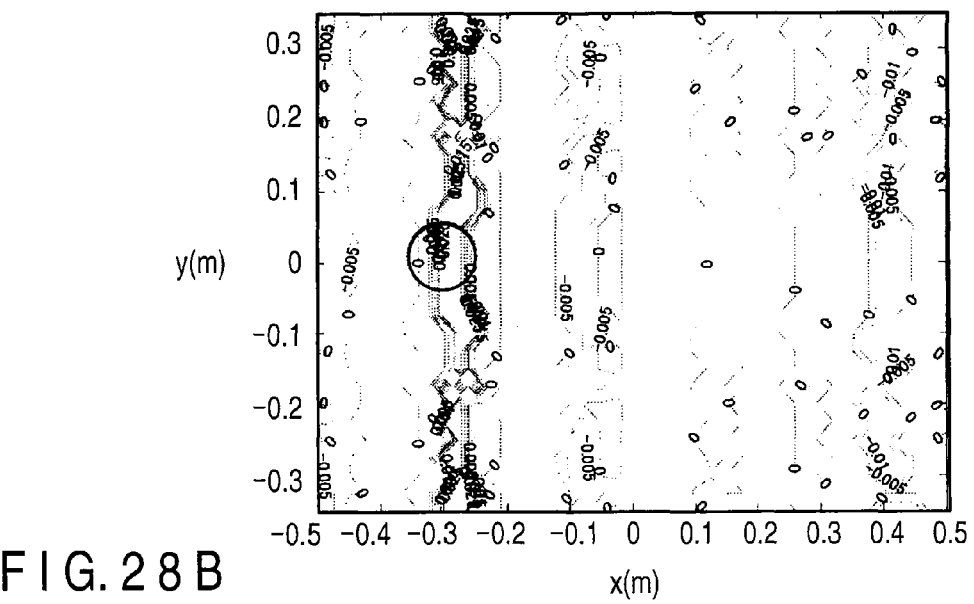
F I G. 28 B

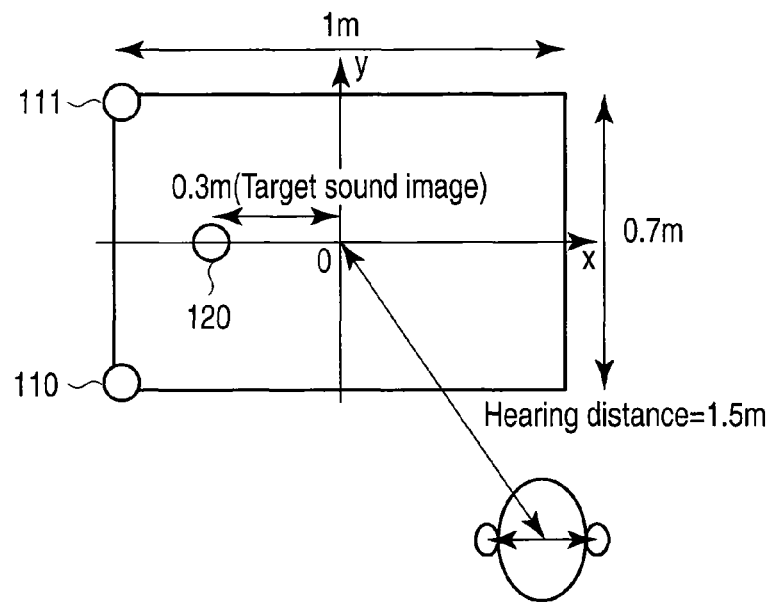
F I G. 30 A
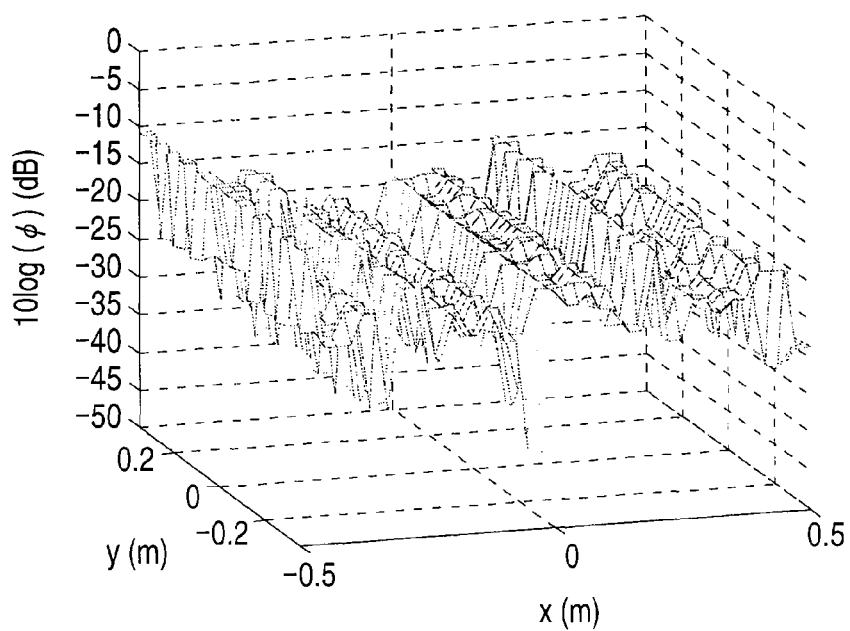
F I G. 30 B

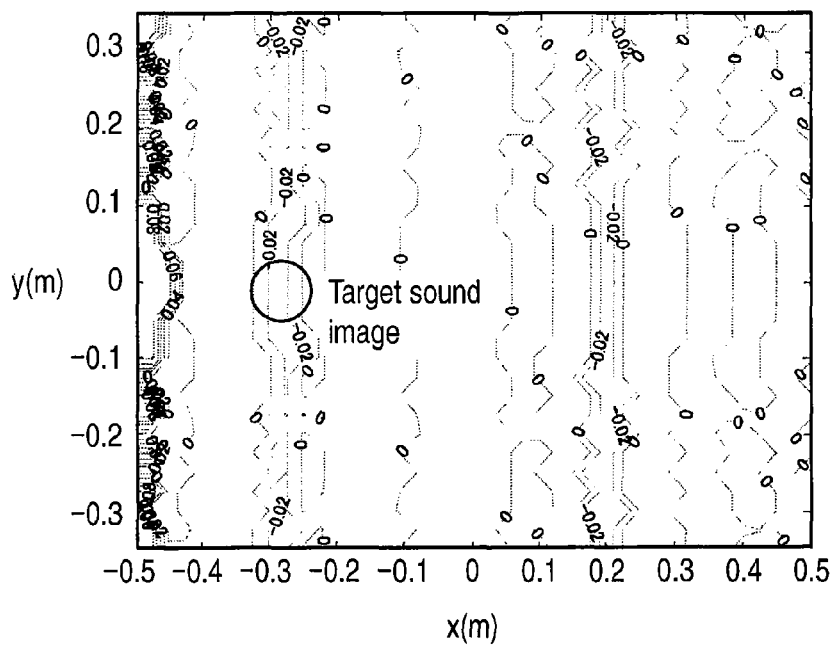
F I G. 30 C
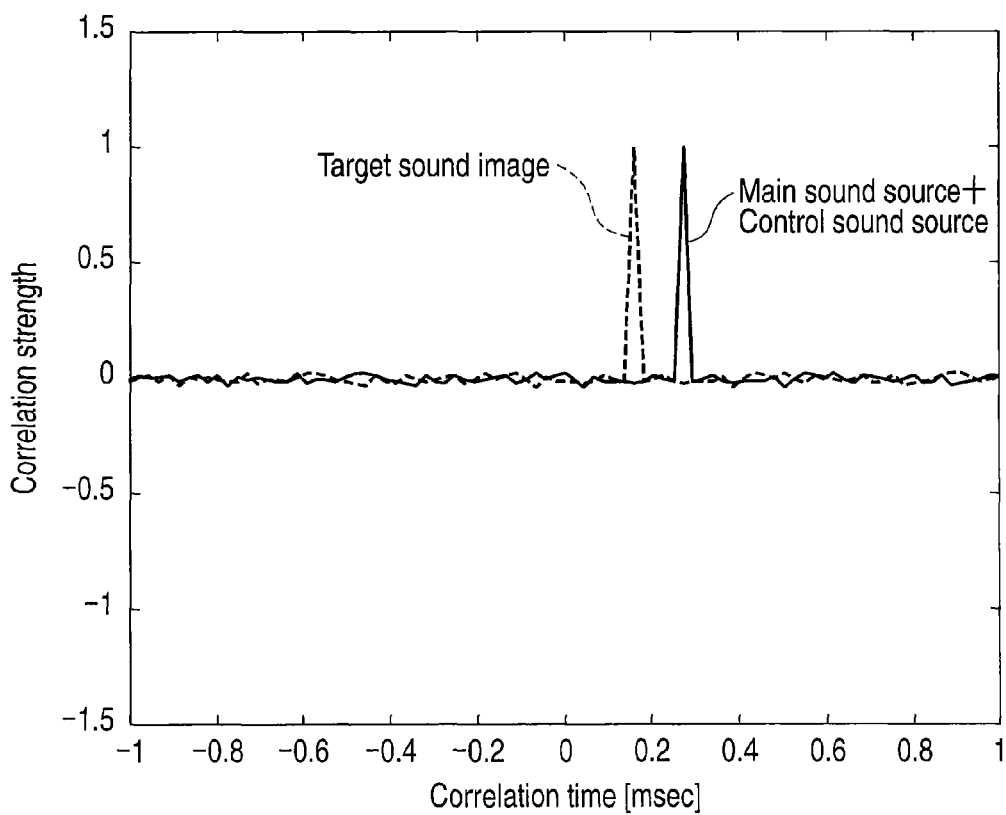
F I G. 30 D

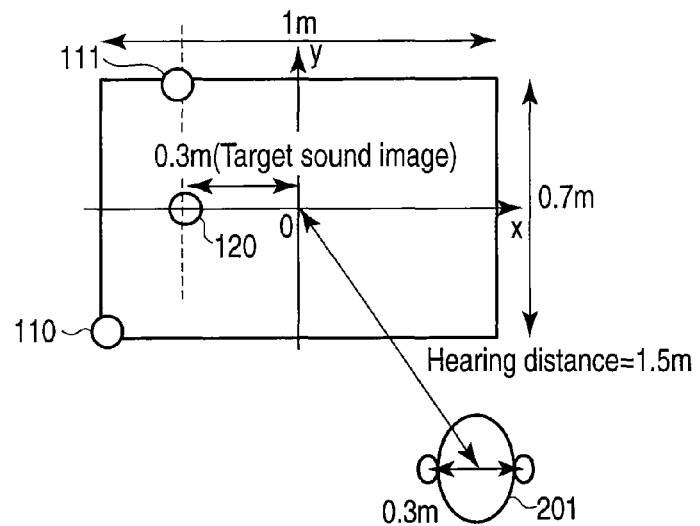
F I G. 31 A
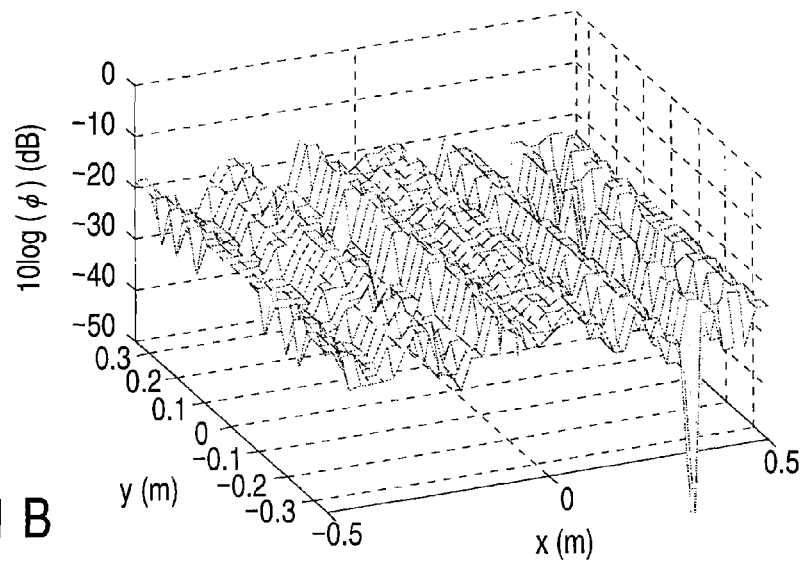
F I G. 31 B
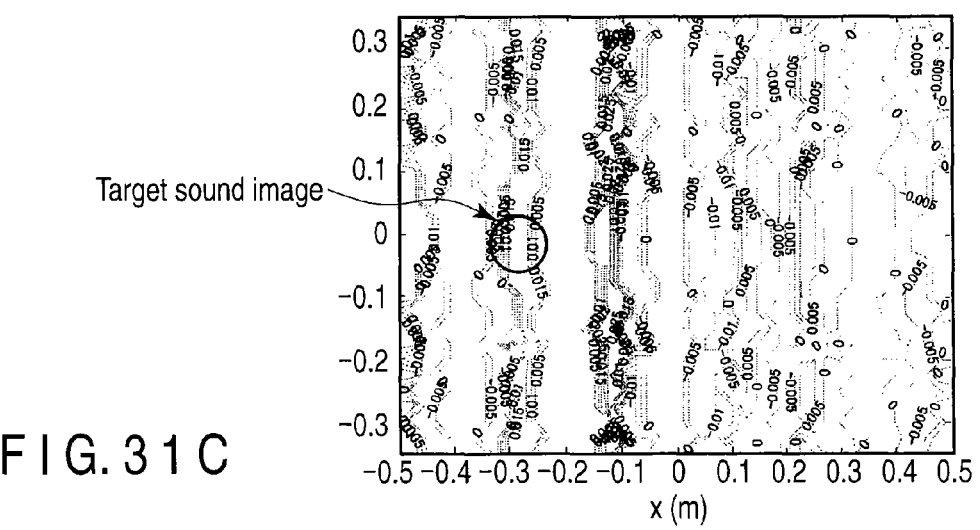
F I G. 31 C

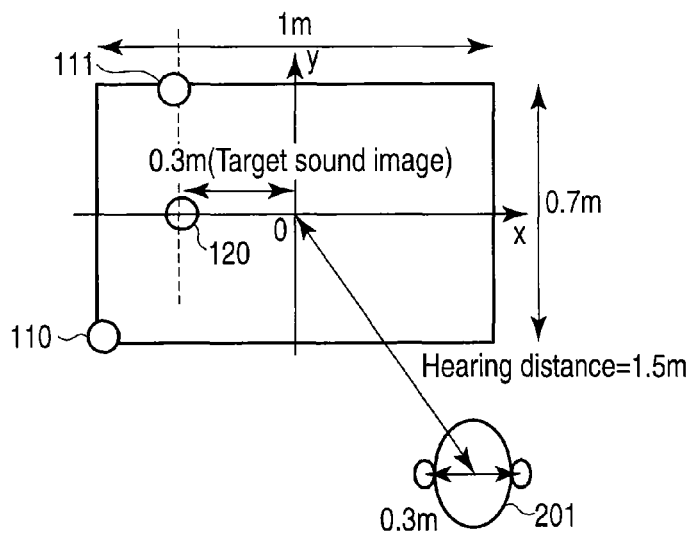
F I G. 3 2 A
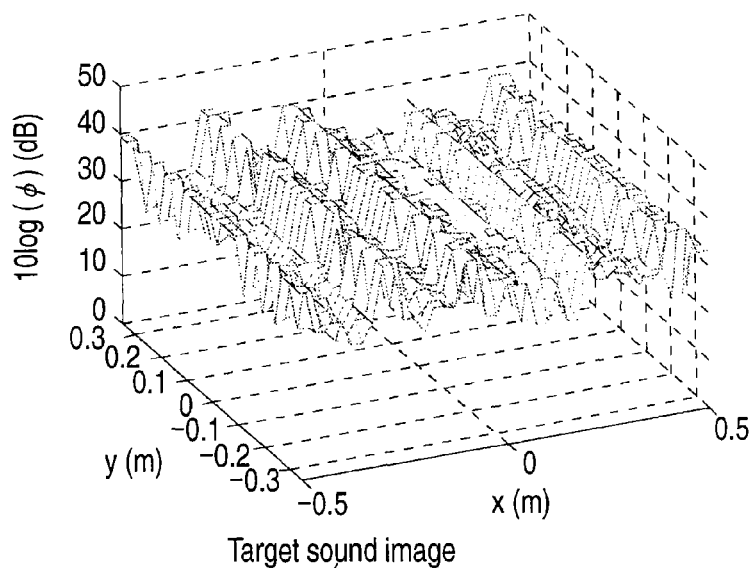
F I G. 3 2 B
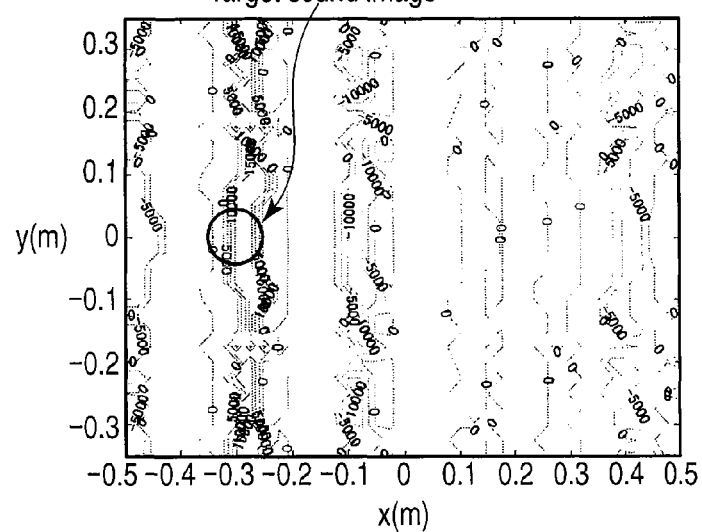
F I G. 3 2 C

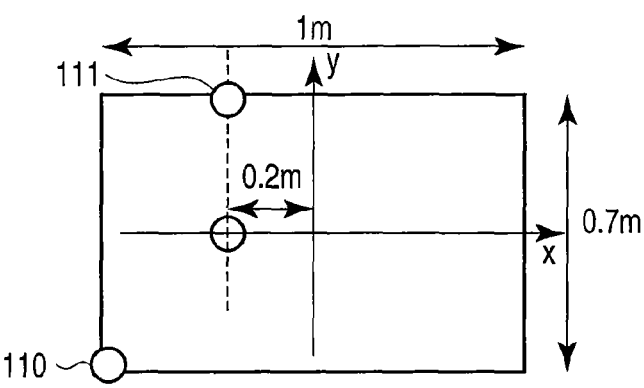
F I G. 3 4 A
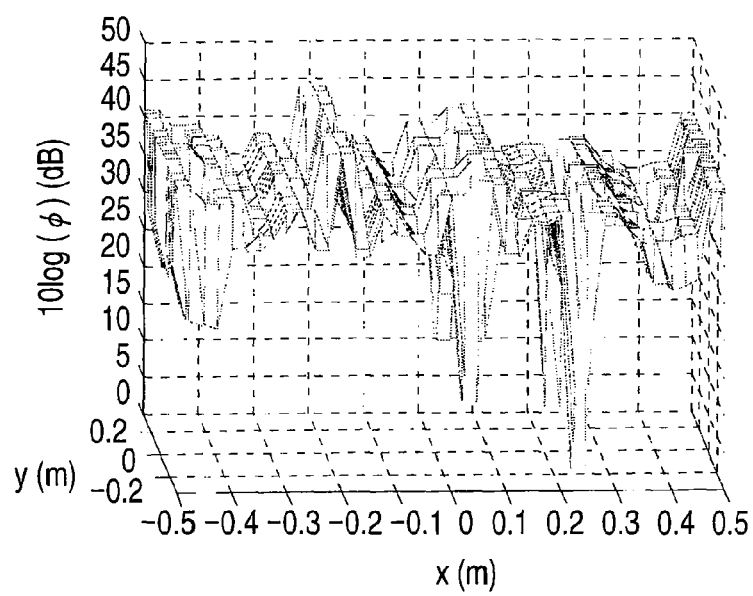
F I G. 3 4 B
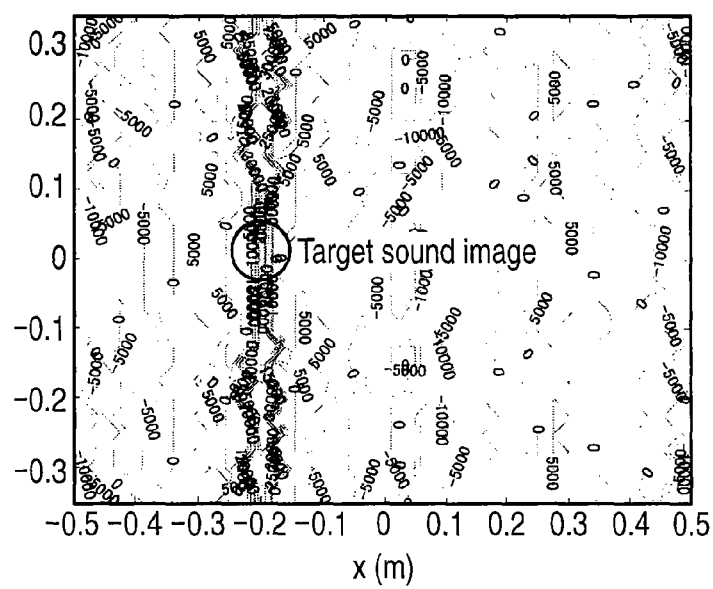
F I G. 3 4 C

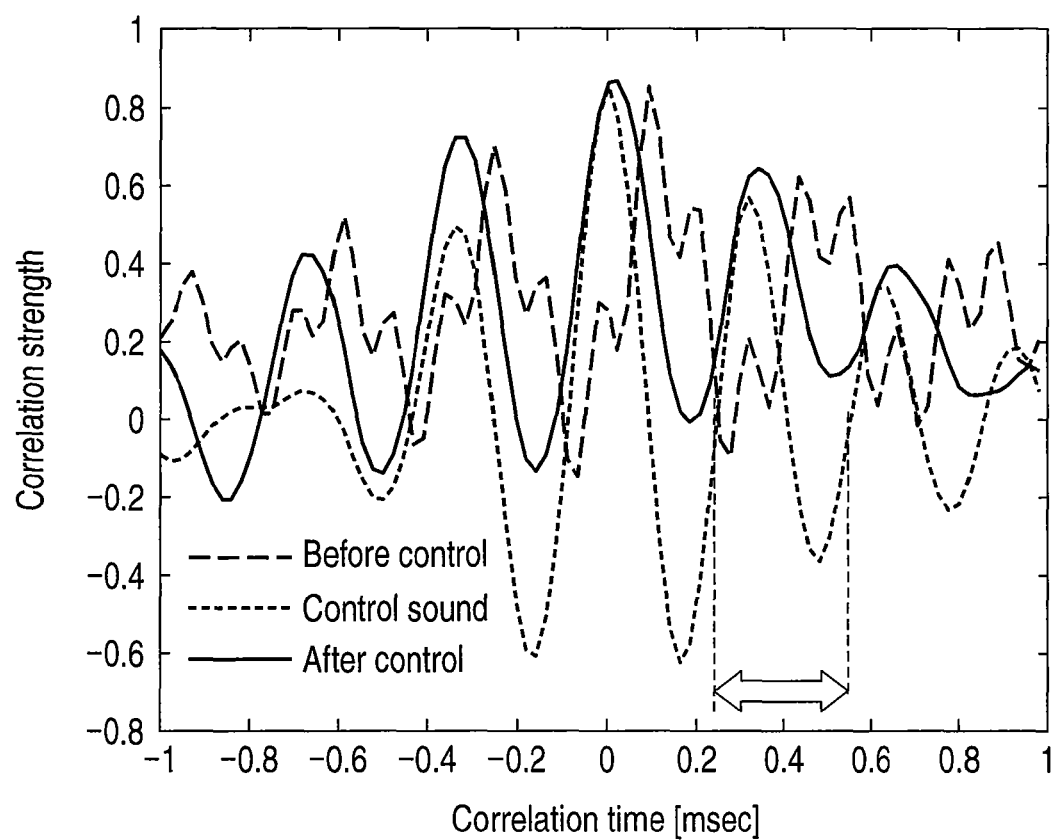
F I G. 4 3

SOUND IMAGE LOCALIZATION APPARATUS

CROSS-REFERENCE TO RELATED APPLICATIONS

This application is based upon and claims the benefit of priority from Japanese Patent Application No. 2010-175691, filed Aug. 4, 2010; the entire contents of which are incorporated herein by reference.

FIELD

Embodiments described herein relate generally to an apparatus which localizes a sound image in a target position.

BACKGROUND

Sound image localization techniques for localizing a sound image in an arbitrary position differing from an actual sound source using a pair of sound sources (e.g., speakers) have been known in the audio engineering field. To localize a sound image in a target position, the amplitude and phase of an acoustic signal reproduced with a pair of sound sources are adjusted so that the sound pressure difference between the sound pressure arriving at the left ear of the listener from a pair of sound sources and the sound pressure arriving at the right ear of the listener from the pair of sound sources may coincide with the sound pressure difference between the sound pressure arriving at the left ear of the listener from a virtual sound source located in the target position and the sound pressure arriving at the right ear of the listener from the virtual sound source. To derive a control filter for adjusting an acoustic signal, it is necessary to measure a spatial transfer function, which includes a head-related transfer function, from an actual speaker located in a target position to the entrance to the eardrum of the listener.

As a display panel of an image display device, such as a liquid crystal television, is getting larger, a mismatch between a displayed image and a sound begins to develop. For example, when a speaker is arranged in the lower part of the display panel (also referred to as screen), the viewer hears sound coming from the lower part of the display panel even if the announcer is displayed in the middle of the display panel. In the liquid crystal television or the like, it is difficult to arrange a speaker behind the display panel as in a movie theater.

To overcome the difficulty, the application of sound image localization to such a large image display device may be considered. However, since the head-related transfer function varies widely according to a direction in which a sound comes from the sound source, it is difficult to construct a method of identifying a head-related transfer function when sound image localization is applied to an image display device whose speaker arrangement differs according to the model, screen size, or the like.

Therefore, in the sound image localization apparatus, it is necessary to derive a control filter easily.

BRIEF DESCRIPTION OF THE DRAWINGS

FIG. 4 is a top view showing the positional relationship between the individual speakers shown in FIG. 2 and the listener;

FIG. 11 is a graph showing the result of calculating a cross-correlation function of a synthetic sound source after control when the localization magnification is 3 according to the first embodiment;

FIG. 12 is a graph showing the result of calculating a cross-correlation function of a synthetic sound source after control when the localization magnification is 5 according to the first embodiment;

FIG. 13 is a graph showing that the position of a sound image localized by the sound image localization apparatus of FIG. 2 is independent of the position of a target sound image;

FIG. 15 is a schematic diagram of a sound image localization apparatus according to a third embodiment;

FIG. 22 is a schematic diagram showing the positions of both ears of the listener according to a seventh embodiment;

FIG. 23 is a graph showing the relationship between a hearing distance R and a tap difference $\Delta N$ according to the seventh embodiment;

FIG. 24 is a front view showing an external appearance of an image display device that includes a sound image localization apparatus according to an eighth embodiment;

FIG. 25 is a diagram showing the positions of each speaker and a target sound image according to Example 1;

FIG. 27 is a diagram showing the positions of a main speaker and a target sound image according to a first comparative example;

FIG. 28A is a graph three-dimensionally showing a correlation strength distribution of the target sound image of FIG. 27;

FIG. 28B is a graph showing a correlation strength distribution of the target sound image of FIG. 27;

FIG. 30A is a diagram showing the positions of a main speaker, an auxiliary speaker, and a target sound image according to a second comparative example;

FIG. 30B is a graph three-dimensionally showing a correlation strength distribution of a synthetic sound source according to the second comparative example;

FIG. 30C is a graph showing a correlation strength distribution of a synthetic sound source according to the second comparative example;

FIG. 30D is a graph showing the result of calculating a cross-correlation function of a synthetic sound source according to the second comparative example;

FIG. 31A is a diagram showing the positions of a main speaker, an auxiliary speaker, and a target sound image according to a third comparative example;

FIG. 31B is a graph three-dimensionally showing a correlation strength distribution of a synthetic sound source according to the third comparative example;

FIG. 31C is a graph showing a correlation strength distribution of a synthetic sound source according to the third comparative example;

FIG. 32A is a diagram showing the positions of a main speaker, an auxiliary speaker, and a target sound image according to Example 1;

FIG. 32B is a graph three-dimensionally showing a correlation strength distribution of a synthetic sound source according to Example 1;

FIG. 32C is a graph showing a correlation strength distribution of a synthetic sound source according to Example 1;

FIG. 34A is a diagram showing the positions of a main speaker, an auxiliary speaker, and a target sound image according to Example 2;

FIG. 34B is a graph three-dimensionally showing a correlation strength distribution of a synthetic sound source according to Example 2;

FIG. 34C is a graph showing a correlation strength distribution of a synthetic sound source according to Example 2;

FIG. 43 is a graph showing the result of measuring a cross-correlation function of a synthetic sound source and a target sound image according to Example 3 when a music signal is used as an acoustic signal.

DETAILED DESCRIPTION

Figure 1:
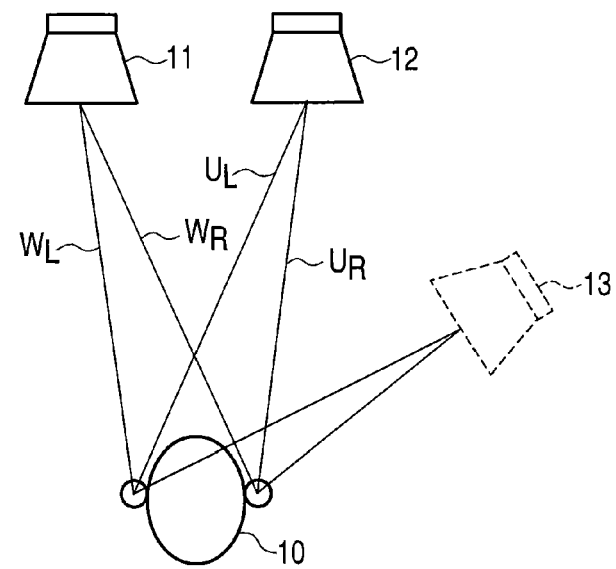
FIG. 1 is a diagram to explain the fundamental principle of sound image localization.

Embodiments described herein are directed to apparatuses for localizing a sound image in a target position from which a synthesized sound is directed to a viewing area in front of a display device. In one embodiment, an apparatus includes a first signal generating unit, an input unit, first and second control filter units, and first, second and third speakers. The first signal generating unit is configured to generate a first acoustic signal. The first speaker is provided on the display device and configured to generate a first sound according to the first acoustic signal. The input unit is configured to input a localization magnification n. The first control filter unit is configured to adjust the first acoustic signal with a first control filter G1 expressed by Equation (101) to generate a first adjusted acoustic signal. The first control filter G1 is calculated based on the input localization magnification n. The second speaker is provided on the display device and configured to generate a second sound according to the first adjusted acoustic signal. The second control filter unit is configured to adjust the first acoustic signal with a second control filter G2 expressed by Equation (102) to generate a second adjusted acoustic signal. The second control filter G2 is calculated based on the input localization magnification n. The third speaker is provided on the display device and configured to generate a third sound according to the second adjusted acoustic signal. The first, second and third sounds are produced as the synthesized sound in the viewing area.

$$G_1 = \alpha + \beta \cdot G_2 \quad (101)$$

$$G_2 = -\frac{\sum_{i=1}^{N} A_i \cdot B_i^*}{\sum_{i=1}^{N} B_i \cdot B_i^*} \quad (102)$$

where $$A_i = (1 - 2n)W_{Ri} + \alpha \cdot U_{Ri1}$$

$$B_i = \beta \cdot U_{Ri1} + U_{Ri2}$$

$$\alpha = \frac{(2n-1)\sum_{i=1}^{N}(W_{Li} \cdot U_{Li1}^*)}{\sum_{i=1}^{N}(U_{Li1} \cdot U_{Li1}^*)}$$

$$\beta = \frac{\sum_{i=1}^{N}(U_{Li2} \cdot U_{Li1}^*)}{\sum_{i=1}^{N}(U_{Li1} \cdot U_{Li1}^*)}$$

N is denotes a number of left ear positions which are set along a direction perpendicular to a display panel included in the display device, N also denotes a number of right ear positions which are set in parallel with the left ear positions respectively, $W_{Li}$ denotes a transfer function determined by a linear distance between the first speaker and an i-th left ear position of the left ear positions, $W_{Ri}$ denotes a transfer function determined by a linear distance between the first speaker and an i-th right ear position of the right ear positions, $U_{Li1}$ denotes a transfer function determined by a linear distance between the second speaker and the i-th left ear position, $U_{Ri1}$ denotes a transfer function determined by a linear distance between the second speaker and the i-th right ear position, $U_{Li2}$ denotes a transfer function determined by a linear distance between the third speaker and the i-th left ear position, $U_{Ri2}$ denotes a transfer function determined by a linear distance between the third speaker and the i-th right ear position, and i is an arbitrary natural number not more than N.

Hereinafter, sound image localization apparatuses according to embodiments will be described with reference to the accompanying drawings. In the embodiments, like reference numbers denote like elements, and duplication of explanation will be avoided.

With Reference to FIG. 1, the fundamental principle of sound image localization will be explained.

Sound image localization is the technique for localizing a sound image in an arbitrary position different from an actual sound source by using a pair of sound sources (e.g., speakers). As an example, a sound emitted from each of a first and a second speaker 11, 12 is controlled, thereby causing the listener to sense a sound as if the sound were being emitted from a nonexistent virtual speaker 13 as shown in FIG. 1. In this case, the amplitude and phase of the acoustic signal reproduced by each of the first and second speakers 11, 12 are adjusted so that the difference between the sound pressures reaching the right and left ears of the listener may coincide with the difference between the sound pressures reaching the right and left ears of the listener 10 when the acoustic signal is reproduced by the virtual speaker 13.

A control filter for adjusting an acoustic signal is derived using spatial transfer functions $W_R$, $W_L$ from the first speaker 11 to the right and left ears of the listener 10 and spatial transfer functions $U_R$, $U_L$ from the second speaker 12 to the right and left ears of the listener 10. Each of the spatial transfer functions $W_R$, $W_L$, $U_R$, $U_L$ normally includes a head-related transfer function depending on the shape of the head and auricle. The head-related transfer function is dependent so severely on the direction in which a sound source arrives that its frequency characteristic and phase characteristic vary greatly if the sound source merely shifts several degrees back and forth, up and down, or left and right. It is known that the head-related transfer function varies greatly from individual to individual due to a difference in the shape of the head and auricle. Therefore, to realize high-accuracy sound image localization, it is necessary to actually measure a head-related transfer function when the head-related transfer function is used.

When sound image localization is applied to an image display device with a large display panel, it is difficult to identify a spatial transfer function including a head-related transfer function to localize a sound image on the display panel for the following reason. The head-related transfer function varies greatly, depending on the direction in which a sound arrives, and also varies according to the installation condition, ambient condition, and the like of speakers. Therefore, it is difficult to construct a method of identifying a head-related transfer function in connection with an image display device where the installation locations of speakers change according to the model or size of the display panel.

In sound image localization apparatuses according to various embodiments explained below, a spatial transfer function is used which is identified by a geometric arrangement determined according to the size of an image display device and the arrangement of speakers without using a head-related transfer function.

(First Embodiment)

Figure 2:
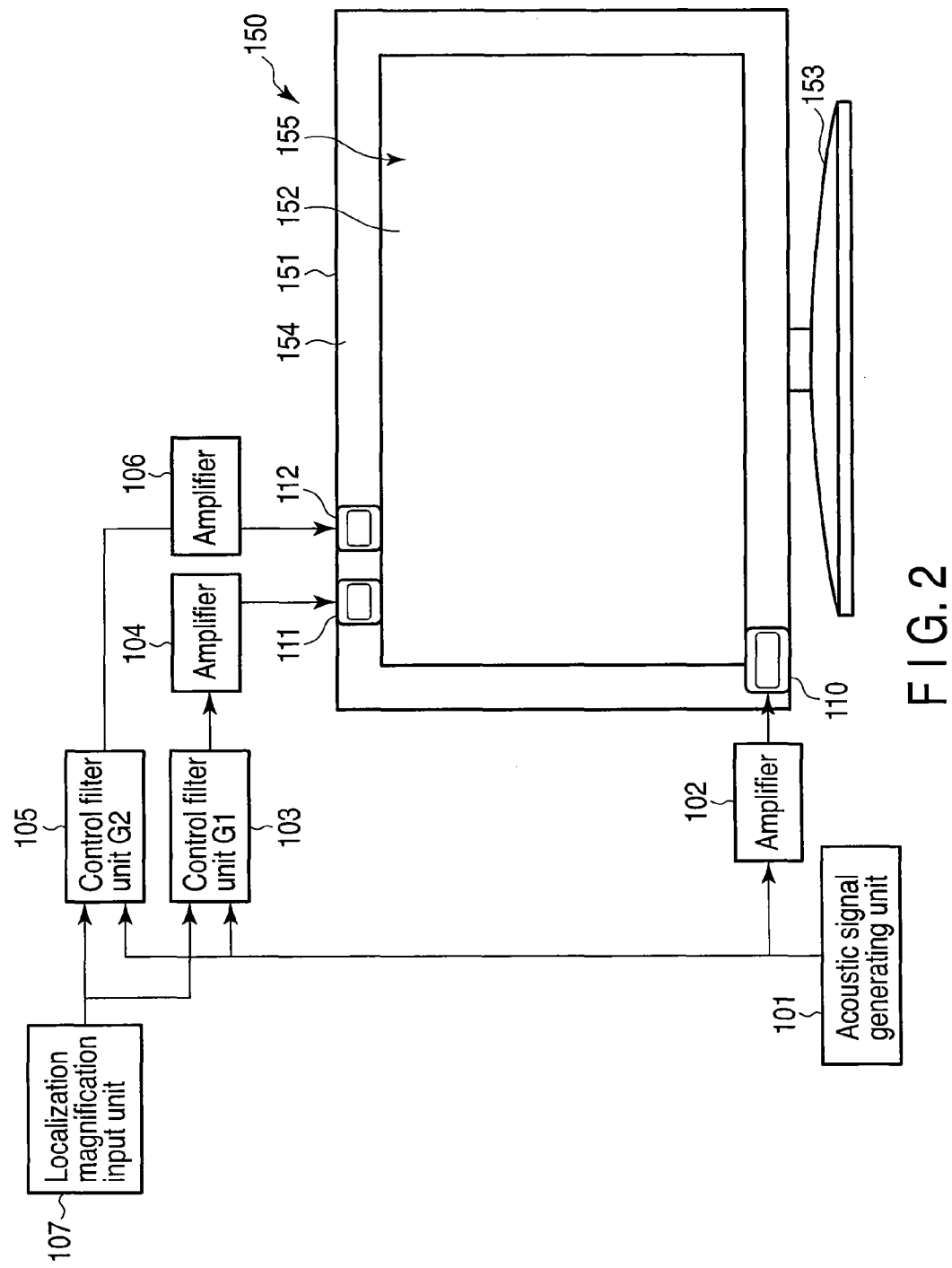
FIG. 2 is a schematic diagram of a sound image localization apparatus according to a first embodiment.

FIG. 2 schematically shows a sound image localization apparatus according to a first embodiment. As shown in FIG. 2, the sound image localization apparatus is provided in an image display device 150 such as a liquid-crystal television. The image display device 150 includes a housing 151, a display panel (also referred to as a screen) 152 that is housed in the housing 151 and displays an image, and a supporting base 153 that supports the housing 151. The display panel 152 is exposed to the outside through an opening 155 formed in a front frame 154 of the housing 151. As the display panel 152, it is possible to use a liquid-crystal panel, a plasma display panel, or the like. The front frame 154 is so formed that it takes the shape of a frame so as to enclose the opening 155.

A main speaker 110 corresponding to a main sound source is arranged below the display panel 152. A first and a second auxiliary speaker 111, 112 corresponding to control sound sources are arranged in parallel above the display panel 152. More specifically, the main speaker 110 is arranged at the lower end of the front frame 154 which is located below the display panel 152. The first and second auxiliary speakers 111, 112 are arranged in parallel at the upper end of the front frame 154, which arranged opposite to the lower end with the display panel 152 interposed between the upper and lower ends. The first and second auxiliary speakers 111, 112 are located closer to the middle of the display panel 152 than the main speaker 110.

The image display device 150 includes a tuner (not shown) that receives a television broadcast signal and demodulates the signal. According to the demodulated signal, an acoustic signal generating unit 101 generates an acoustic signal. The acoustic signal is amplified by an amplifier 102. The amplified acoustic signal is input to the main speaker 110, which converts the amplified acoustic signal into a sound.

The acoustic signal generated by the acoustic signal generating unit 101 is also sent to a first control filter unit 103 having a control filter G1 and a second control filter unit 105 having a control filter G2. In the first control filter unit 103, the phase and amplitude of the acoustic signal are adjusted by using the control filter G1. The acoustic signal adjusted by the first control filter unit 103 is amplified by an amplifier 104. The amplified acoustic signal is converted by the first auxiliary speaker 111 into a sound. In the second control filter unit 105, the phase and amplitude of the acoustic signal are adjusted by using the control filter G2. The acoustic signal adjusted by the second control filter unit 105 is amplified by an amplifier 106. The amplified acoustic signal is converted by the second auxiliary speaker 111 into a sound. A sound (main sound) emitted from the main speaker 110, a sound (control sound) emitted from the first auxiliary speaker 111, and a sound (control sound) emitted from the second auxiliary speaker 112 are directed from the front faces of the main speaker 110, first auxiliary speaker 111, and second auxiliary speaker 112 toward the listener in front of the image display device 150, respectively.

A localization magnification input unit (also referred to simply as an input unit) 107 inputs a localization magnification n set by the user (e.g., listener) to the first and second control filter units 103, 105. The localization magnification n is used to adjust the strength of sound image localization. The control filters G1 and G2 depend on the localization magnification n.

Figure 3:
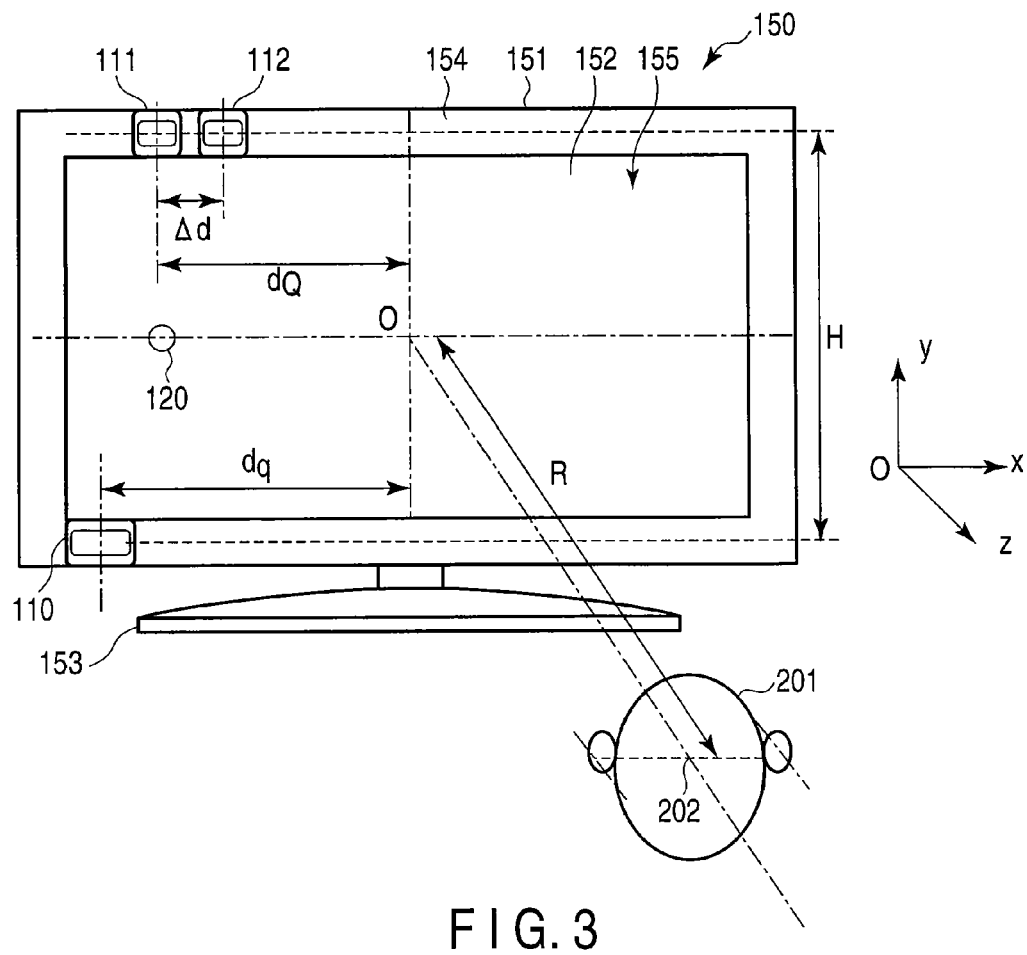
FIG. 3 is a perspective view showing an external appearance of an image display device shown in FIG. 2.

As an example, a target sound image 120 is set below the first auxiliary speaker 111 and level with the center O of the display panel, as shown in FIG. 3. In the first embodiment, the main sound from the main speaker 110 is controlled by the control sounds from the first and second auxiliary speakers 111, 112, thereby localizing a sound image in the position of the target sound image 120.

FIG. 3 shows an external appearance of the image display device 150 that includes the sound image localization apparatus of FIG. 2. In FIG. 3 and other figures, a three-dimensional coordinate system (x-y-z coordinate system) is set for purposes of explanation. In the x-y-z coordinate system, the origin O is set at the center (hereinafter, also referred to as the screen center) of the display panel 152, the width direction (corresponding to horizontal direction) is set as the x-axis direction, the height direction (corresponding to vertical direction) is set as the y-axis direction, and the depth direction (corresponding to a direction perpendicular to the x-y plane) is set as the z-axis direction.

As shown in FIG. 3, distance $d_q$ denotes the distance between the sound source center of the main speaker 110 and the screen center in the width direction, distance $d_Q$ denotes the distance between the sound source center of the first auxiliary speaker 111 and the screen center in the width direction, and distance $\Delta d$ denotes the distance between the sound source center of the first auxiliary speaker 111 and the sound source center of the second auxiliary speaker 112 in the width direction. The sound source center described herein indicates the center of the sound radiating surface of a sound source such as a speaker. The second auxiliary speaker 112 is arranged closer to the middle of the display panel than the first auxiliary speaker 111. The distance between the sound source center of the second auxiliary speaker 112 and the screen center in the width direction is $dQ-\Delta d$. Distance H denotes the distance between the sound source center of the main speaker 110 and the sound source center of the first auxiliary speaker 111 (or second auxiliary speaker 112) in the height direction. Distance R denotes the distance between the around-the-ear position (the midpoint between both ears) 202 of the listener 201 in front of the image display device 150 and the screen center. Distance R is determined according to the size of the image display device 150 (e.g., the distance H or the size (e.g., height and width) of the display panel 152).

In the first embodiment, a plurality of around-the-ear positions are set using the around-the-ear position 202 of the listener (or viewer) 201 as a reference. Each around-the-ear position is represented by an index i. Here, i is a natural number not larger than N. N indicates the number of evaluation points and is a natural number. A plurality of around-the-ear positions are introduced to take the space average of sound pressures near the reference around-the-ear position 202. As shown in FIG. 4, the index i of the reference around-the-ear position 202 is 2 and the distance between the reference around-the-ear position 202 and the screen center is R. An around-the-ear position whose index i is 1 is set closer to the image display device 150 than the reference around-the-ear position 202. The distance between the around-the-ear position 203 and the screen center is $R-\Delta R$. An around-the-ear position 204 whose index i is 3 is set in a position farther away from the image display device 150 than the reference around-the-ear position 202. The distance between the around-the-ear position 204 and the screen center is $R+\Delta R$. In addition, the distance between an around-the-ear position whose index is 4 and the screen center is $R+2\times\Delta R$. The distance between an around-the-ear position whose index is 5 and the screen center is $R+3\times\Delta R$. $\Delta R$ indicates the interval between evaluation points. In the first embodiment, the evaluation point interval $\Delta R$ is set to approximately 0.1 m.

The position of each of the right and left ears corresponding to the around-the-ear position i is set to a position moved $\pm de$ from the around-the-ear position i in the width direction. Since the distance between both ears ($2\times de$) is almost the same for everyone, the distance is, for example, 0.3 m and therefore de=0.15 m. Thus, N left ear positions and N light ear positions are set in a viewing area in front of the display device 150 and arranged along a direction perpendicular to a display panel 152. N is a natural number and i is an arbitrary natural number not more than N.

A sound pressure signal $P_{Li}$ reaching a i-th left ear of the left ear positions can be expressed by the sound pressure of a synthetic sound including a main sound from the main speaker 110 and control sounds from the first and second auxiliary speakers 111, 112 as expressed by Equation (1) below. Similarly, a sound pressure signal $P_{Ri}$ reaching a i-th right ear position of the right ear positions can be expressed by the sound pressure of a synthetic sound including a main sound from the main speaker 110 and a control sound from each of the first and second auxiliary speakers 111, 112 as expressed by Equation (2) below. Here, the i-th right ear position and the i-th left ear position indicate the positions of the right ear and left ear corresponding to the around-the-ear position whose index is i, respectively.

$$P_{Li}=W_{Li}q_P+G_1 \cdot U_{Li1}q_P+G_2 \cdot U_{Li2}q_p \qquad (1)$$

$$P_{Ri}=W_{Ri}q_P+G_1 \cdot U_{Ri1}q_P+G_2 \cdot U_{Ri2}q_p \qquad (2)$$

Here, $q_p$ denotes the intensity of a sound output from the main speaker 110. $W_{Li}$ denotes a transfer function from the sound source center of the main speaker 110 to the i-th left ear position and is determined by the linear distance $L_{wLi}$ between the sound source center of the main speaker 110 and the i-th left ear position. $W_{Ri}$ denotes a transfer function from the sound source center of the main speaker 110 to the i-th right ear position and is determined by the linear distance $L_{wRi}$ between the sound source center of the main speaker 110 and the i-th right ear position. $U_{Li1}$ denotes a transfer function from the sound source center of the first auxiliary speaker 111 to the i-th left ear position and is determined by the linear distance $L_{uLi1}$ between the sound source center of the first auxiliary speaker 111 and the i-th left ear position. $U_{Li2}$ denotes a transfer function from the sound source center of the second auxiliary speaker 112 to the i-th left ear position and is determined by the linear distance $L_{uLi2}$ between the sound source center of the second auxiliary speaker 112 and the i-th left ear position. In addition, $U_{Ri1}$ denotes a transfer function from the sound source center of the first auxiliary speaker 111 to the i-th right ear position and is determined by the linear distance $L_{uRi1}$ between the sound source center of the first auxiliary speaker 111 and the i-th right ear position. $U_{Ri2}$ denotes a transfer function from the sound source center of the second auxiliary speaker 112 to the i-th right ear position and is determined by the linear distance $L_{uRi2}$ between the sound source center of the second auxiliary speaker 112 and the i-th right ear position.

As an example, the transfer functions and distances can be represented by following Equations (3) to (8):

$$W_{Li} = \frac{e^{-jkL_{wLi}}}{L_{wLi}} \quad (3)$$

$$L_{wLi} = \sqrt{(-d_q + d_e)^2 + (R + \Delta R(i-2))^2 + \left(-\frac{H}{2}\right)^2}$$

$$W_{Ri} = \frac{e^{-jkL_{wRi}}}{L_{wRi}} \quad (4)$$

$$L_{wRi} = \sqrt{(-d_q - d_e)^2 + (R + \Delta R(i-2))^2 + \left(-\frac{H}{2}\right)^2}$$

$$U_{Li1} = \frac{e^{-jkL_{uLi1}}}{L_{uLi1}} \quad (5)$$

$$L_{uLi1} = \sqrt{(-d_q + d_e)^2 + (R + \Delta R(i-2))^2 + \left(-\frac{H}{2}\right)^2}$$

$$U_{Ri1} = \frac{e^{-jkL_{uRi1}}}{L_{uRi1}} \quad (6)$$

$$L_{uRi1} = \sqrt{(-d_q - d_e)^2 + (R + \Delta R(i-2))^2 + \left(-\frac{H}{2}\right)^2}$$

$$U_{Li2} = \frac{e^{-jkL_{uLi2}}}{L_{uLi2}} \quad (7)$$

$$L_{uLi2} = \sqrt{(-d_Q + \Delta d + d_e)^2 + (R + \Delta R(i-2))^2 + \left(\frac{H}{2}\right)^2}$$

$$U_{Ri2} = \frac{e^{-jkL_{uRi2}}}{L_{uRi2}} \quad (8)$$

$$L_{uRi2} = \sqrt{(-d_Q + \Delta d - d_e)^2 + (R + \Delta R(i-2))^2 + \left(\frac{H}{2}\right)^2}$$

where j denotes an imaginary unit and k denotes a wave number.

Here, using sound pressures at the respective right and left ears of the listener, an inter-aural cross-correlation function (IACF) generally used as an indicator to estimate the extensity of sound is represented as follows:

$$IACF(\tau) = \frac{\int_{t1}^{t2} P_L(t) P_R(t+\tau) dt}{\sqrt{\int_{t1}^{t2} P_L^2(t) dt \cdot \int_{t1}^{t2} P_R^2(t) dt}} \quad (9)$$

Here, $P_R(t)$ and $P_L(t)$ denote sound pressures reaching the right and left ears at time t, respectively. t1 and t2 denote measurement times. Although t1=0 and t2=∞, t2 is actually set to a measuring time about as long as a reverberation time.

In addition, τ denotes correlation time and is in the range from negative 1 millisecond to 1 millisecond. The maximum value of the absolute value of the inter-aural cross-correlation function is called an inter-aural cross correlation (IACC) and indicates how much the sound pressure waveforms reaching both ears coincide with each other. The larger the value of the inter-aural cross correlation, the greater the strength of sound image localization, that is, the more a sense of sound image localization increases. The smaller the value, the more a sense of sound image localization decreases, i.e., the more the sound image is spread out.

Since the inter-aural cross-correlation function is equivalent to a cross spectrum (expressed by Equation (22)) of the sound pressures at the right and left ears in a frequency range, the absolute amplitude of the cross spectrum corresponds to a correlation strength. To improve the correlation strength, synthetic sound pressures $P_{Li}$, $P_{Ri}$ of the left and right ear positions expressed by Equation (1) and Equation (2) respectively have to be amplified by control filtering with the first and second control filter units 103, 105.

Figure 5:
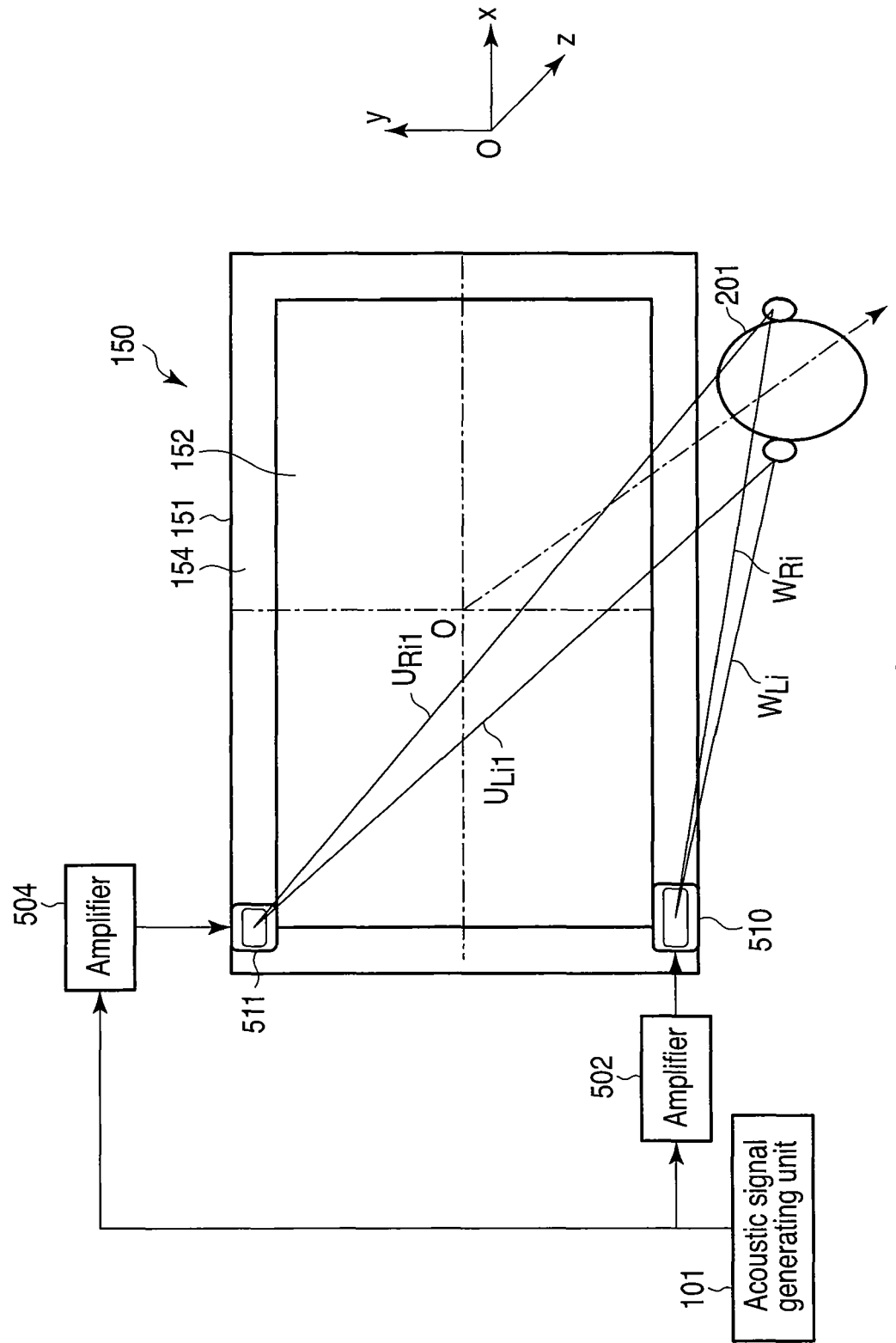
FIG. 5 is a schematic diagram of a speaker system for deriving a reference sound pressure used in the first embodiment.

The reference sound pressure for determining a target increasing amount of a sound pressure is determined in connection with a speaker system shown in FIG. 5. An acoustic signal generating unit 501, amplifiers 502, 504, a main speaker 510, and an auxiliary speaker 511 in the speaker system of FIG. 5 have the same capabilities as the acoustic signal generating unit 101, amplifiers 102, 104, main speaker 110, and first auxiliary speaker 111 in the sound image localization apparatus of FIG. 2, respectively. The main speaker 510 is arranged opposite to the auxiliary speaker 511, with the display panel 152 interposed between them, and the main speaker 510 and auxiliary speaker 511 are arranged on the front frame 154 of the housing 151. A signal reproduced by the main speaker 510 is the same as that reproduced by the auxiliary speaker 511. In FIG. 5, the supporting base 153 is omitted.

In the speaker system of FIG. 5, a sound pressure $P_{Li}$ reaching the i-th left ear position and a sound pressure $P_{Ri}$ reaching the i-th right ear position are derived as expressed by Equation (10) and Equation (11), respectively:

$$P_{Li} = W_{Li}q_p + U_{Li}q_p = 2W_{Li}q_p \therefore U_{Li} = W_{Li} \quad (10)$$

$$P_{Ri} = W_{Ri}q_p + U_{Ri}q_p = 2W_{Ri}q_p \therefore U_{Ri} = W_{Ri} \quad (11)$$

In the speaker system, the linear distance between the sound source center of the main speaker 510 and the i-th left ear position is equal to the linear distance between the sound source center of the auxiliary speaker 511 and the i-th left ear position. Therefore, transfer function $U_{Li}$ is equal to transfer function $W_{Li}$. Similarly, the linear distance between the sound source center of the main speaker 510 and the i-th right ear position is equal to the linear distance between the sound source center of the auxiliary speaker 511 and the i-th right ear position. Therefore, transfer function $U_{Ri}$ is equal to transfer function $W_{Ri}$. In the first embodiment, synthetic sound pressures $P_{Li}$, $P_{Ri}$ expressed by Equation (10) and Equation (11) respectively are used as reference sound pressures.

If the synthetic sound pressures after control expressed by Equation (1) and Equation (2) have been amplified n times as compared with the reference sound pressures expressed by Equation (10) and Equation (11) respectively, Equation (12) and Equation (13) are derived as follows:

$$P_{Li} = W_{Li}q_p + G_1 \cdot U_{Li1}q_p + G_2 \cdot U_{Li2}q_p = 2nW_{Li}q_p \quad (12)$$

$$P_{Ri} = W_{Ri}q_p + G_1 \cdot U_{Ri1}q_p + G_2 \cdot U_{Ri2}q_p = 2nW_{Ri}q_p \quad (13)$$

Control filters G1 and G2 satisfying Equation (12) and Equation (13) can be calculated as follows. First, square sums $U_L$ and $U_R$ of sound pressures which are expressed by Equation (16) and Equation (17) below, are calculated using a sound pressure $P_{Li}'$ at the i-th left ear position which is defined by Equation (14) and a sound pressure $P_{Ri}'$ at the i-th right ear position which is defined by Equation (15). Then, control filters G1 and G2 that minimize the square sums $U_L$ and $U_R$ are derived. Here, control filters G1 and G2 that have a finite impulse response (FIR) calculation function of adjusting the amplitude and phase are complex functions.

$$P'_{Li} = (1 - 2n)W_{Li}q_p + G_1 \cdot U_{Li1}q_p + G_2 \cdot U_{Li2}q_p \quad (14)$$

$$P'_{Ri} = (1 - 2n)W_{Ri}q_p + G_1 \cdot U_{Ri1}q_p + G_2 \cdot U_{Ri2}q_p \quad (15)$$

$$U_L = \sum_{i=1}^{N} (P'_{Li} \cdot P'^{*}_{Li}) \quad (16)$$

$$U_R = \sum_{i=1}^{N} (P'_{Ri} \cdot P'^{*}_{Ri}) \quad (17)$$

In Equation (16) and Equation (17), the superscript symbol * represents a complex conjugate.

Control filters G1 and G2 are derived as expressed by Equation (19) below by partially differentiating the square sum $U_L$ expressed by Equation (16) with respect to each of the real part $G_2^r$ and imaginary part $G_2^i$ of control filter G2, as expressed by Equation (18), and further partially differentiating sound pressure square sum $U_R$ expressed by Equation (17) with respect to each of the real part $G_2^r$ and imaginary part $G_2^i$ of control filter G1:

$$\frac{\partial U_L}{\partial G_2^r} = 0 \quad (18)$$

$$\frac{\partial U_L}{\partial G_2^i} = 0$$

$$\frac{\partial U_R}{\partial G_1^r} = 0$$

$$\frac{\partial U_R}{\partial G_1^i} = 0$$

$$G_1 = \alpha + \beta \cdot G_2 \quad (19)$$

$$G_2 = -\frac{\sum_{i=1}^{N} A_i \cdot B_i^*}{\sum_{i=1}^{N} B_i \cdot B_i^*}$$

where $$A_i = (1 - 2n)W_{Ri} + \alpha \cdot U_{Ri1} \quad (20)$$

$$B_i = \beta \cdot U_{Ri1} + U_{Ri2}$$

$$\alpha = \frac{(2n - 1)\sum_{i=1}^{N}(W_{Li} \cdot U_{Li1}^*)}{\sum_{i=1}^{N}(U_{Li1} \cdot U_{Li1}^*)}$$

$$\beta = \frac{\sum_{i=1}^{N}(U_{Li2} \cdot U_{Li1}^*)}{\sum_{i=1}^{N}(U_{Li1} \cdot U_{Li1}^*)}$$

Figure 6:
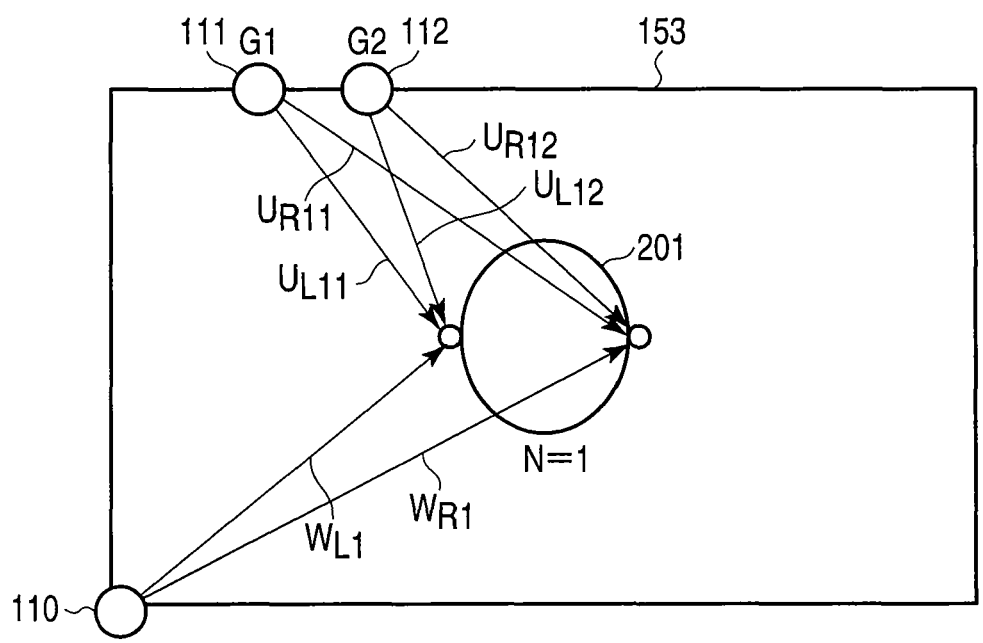
FIG. 6 is a diagram to explain transfer functions when the number N of evaluation points is 1.

It is seen from Equation (19) that each of the denominator of control filter G1 and that of control filter G2 is the sum of absolute values. For clarity, an example where the number N of evaluation points is 1 and the localization magnification n is 1 will be explained with reference to FIG. 6. In an example where the number N of evaluation points is 1, the index of the reference around-the-ear position is assumed to be 1. At this time, $W_{L1}$ denotes a transfer function from the sound source center of the main speaker 110 to the left ear position of the listener 201 and $W_{R1}$ denotes a transfer function from the sound source center of the main speaker 110 to the right ear position of the listener 201. $U_{L11}$ denotes a transfer function from the sound source center of the first auxiliary speaker 111 to the left ear position and $U_{R11}$ denotes a transfer function from the sound source center of the first auxiliary speaker 111 to the right ear position. $U_{L12}$ denotes a transfer function from the sound source center of the second auxiliary speaker 112 to the left ear position and $U_{R12}$ denotes a transfer function from the sound source center of the second auxiliary speaker 112 to the right ear position. If the number N of evaluation points is 1, Equations (19) are transformed into Equations (21) below:

$$\therefore G_1 = \frac{W_{L1}}{U_{L11}} + \frac{U_{L12}}{U_{L11}} \cdot G_2 \quad (21)$$

$$\therefore G_2 = -\frac{W_{L1}U_{R11} - W_{R1}U_{L11}}{U_{L12}U_{R11} + U_{L11}U_{R12}}$$

As seen from Equations (21) or Equations (19) and Equations (20), the denominator of each of control filters G1 and G2 is expressed by the sum of transfer functions. As for a control filter G in a third embodiment and others described later, the denominator is expressed by the difference between transfer functions. Under a specific condition, the denominator approaches zero or may become zero. For example, in the case of a control filter G in a sixth embodiment described later, when the hearing distance R is 1.2 m, the denominator of control filter G becomes zero. If the denominator of control filter G approaches zero or becomes zero, the gain of control filter G become extremely large or diverges, making it impossible to produce a practical control filter G.

Figure 7:
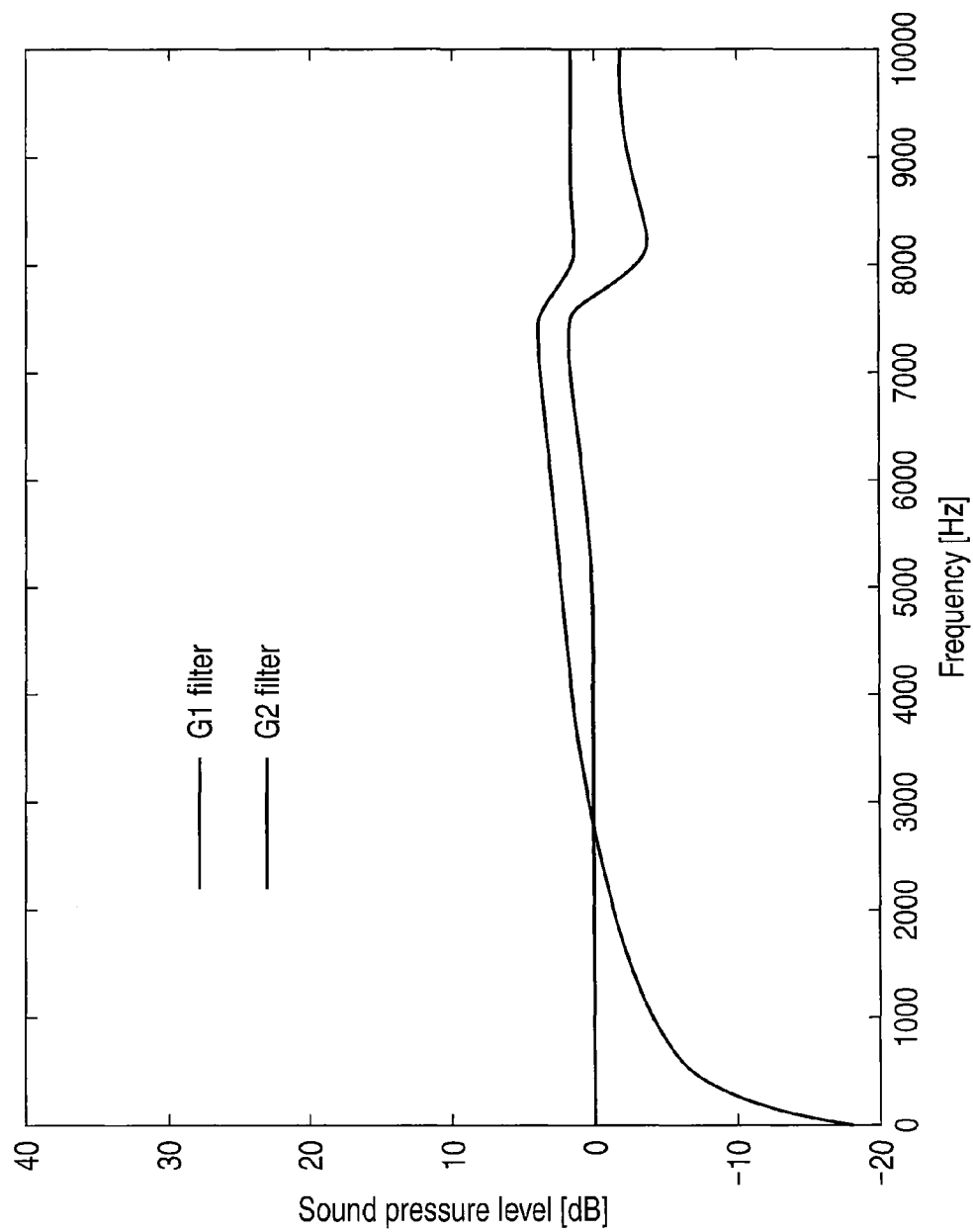
FIG. 7 is a graph showing the result of calculating control filters G1, G2 in the first embodiment.

In each of control filters G1 and G2 in the first embodiment, the denominator is expressed as the sum of transfer functions. Therefore, the denominator does not approach zero and therefore does not become zero. Accordingly, the gain of each of control filters G1 and G2 neither becomes extremely large nor diverges. FIG. 7 shows gain-frequency characteristics of control filters G1 and G2. It is seen from FIG. 7 that an increase in the gain has been suppressed over the entire frequency band. The graph of FIG. 7 shows the result of calculating control filters G1 and G2 using the following values: dq=0.5 [m], dQ=0.3 [m], Δd=0.1 [m], H=0.7 [m], R=1.5 [m], ΔR=0.1 [m], and de=0.15 [m].

If each of the controlled synthetic sound pressures $P_{Li}$ and $P_{Ri}$ reaching the i-th left ear position and i-th right ear position increases n-fold, a cross spectrum η expressed by the following Equation (22) will increase $n^2$-fold:

$$\eta = |P_{Li} \cdot P_{Ri}^*| \quad (22)$$

Figure 8:
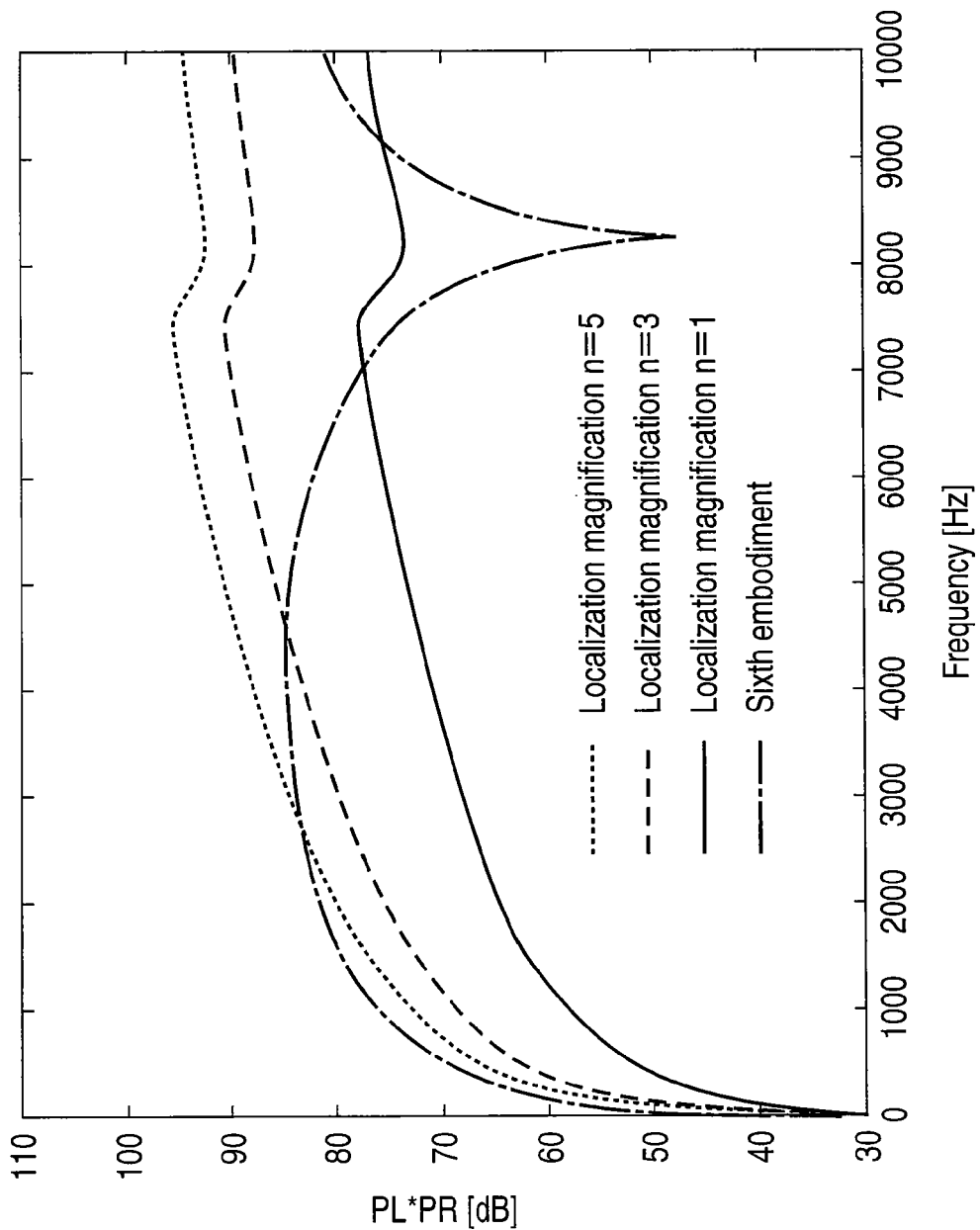
FIG. 8 is a graph showing the result of calculating a cross spectrum for each localization magnification according to the first embodiment.

FIG. 8 shows a cross spectrum calculated using Equation (22). The cross spectrums shown in FIG. 8 are calculated for a controlled synthetic sound pressure when the localization magnification n is 1, 3, and 5. In the calculations, the hearing distance R is 1.5 m. It is seen from FIG. 8 that the amplitude of the cross spectrum increases over the entire frequency band as the localization magnification n increases. FIG. 8 also shows a cross spectrum calculated for a controlled synthetic sound pressure in a sixth embodiment described later. When the hearing distance R is 1.5 m, although the denominator of control filter G of the sixth embodiment does not become zero, the effect of sound pressure interference between transfer paths has occurred and a local minimum point appears at about 8.4 kHz.

Figure 9:
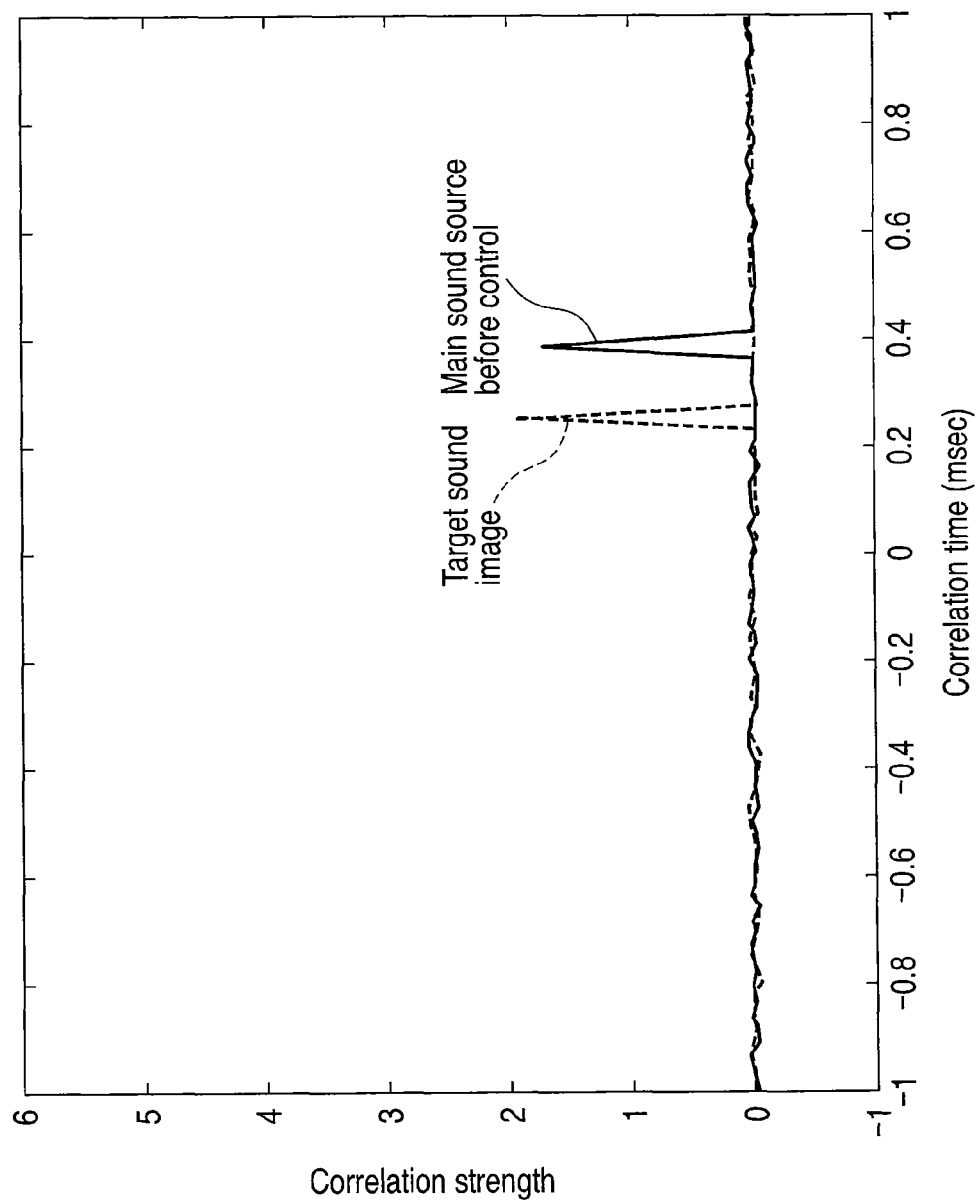
FIG. 9 is a graph showing the result of calculating cross-correlation functions of a target sound image and a main sound source shown in FIG. 2.

FIG. 9 shows the result of calculating an inter-aural cross-correlation function based on sound pressures reaching the right and left ears of the listener 201 from the main speaker 110 and the result of calculating an inter-aural cross-correlation function based on sound pressures reaching the right and left ears of the listener 201 from an actual speaker actually arranged in the position of a target sound image 120. As shown in FIG. 3, the target sound image 120 is set below the first auxiliary speaker 111 and is 0.3 m away from the screen center on the left. For ease of explanation, in the first embodiment, an inter-aural cross-correlation function based on sound pressures reaching the right and left ears from the main speaker 110 is referred to as a cross-correlation function of a main sound source. When an actual speaker is arranged in the position of the target sound image 120, an inter-aural cross-correlation function based on a sound pressure reaching the right and left ears from the speaker is referred to as a cross-correlation function of the target sound image.

When a cross-correlation function is calculated, a sampling frequency is set to 44.1 kHz and it is assumed that white noise is output from each speaker. Each transfer function is convolved into the white noise, thereby calculating time history waveforms of sound pressures at the respective right and left ears which are transmitted from each speaker to the hearing position 1.5 m away from the front side of the image display device 150. Based on the calculated time history waveforms, an inter-aural cross-correlation function is calculated in a time region. In graphs showing inter-aural cross-correlation functions of FIG. 9 and others, the transverse axis denotes correlation time and the vertical axis denotes correlation strength. Since an inter-aural cross-correlation function (IACF) has been normalized using the magnitude of an aural incoming sound pressure, the values of all correlation peaks in the vertical axis are the same (1 at a maximum) and are therefore unsuitable for evaluating an inter-aural cross correlation (maximum correlation peak). Therefore, in FIGS. 9, 10, 11, 12, and others, inter-aural cross-correlation functions calculated to the exclusion of the denominators or without normalization are shown.

In FIG. 9, an cross-correlation function of the main sound source is shown by a solid line and a cross-correlation function of the target sound image is shown by a broken line. The correlation peak of each cross-correlation function appears when the correlation time $\tau$ is positive. As shown in FIG. 3, this means that a sound reaches the right ear later than the left ear serving as a reference in correlation calculation because the main speaker 110 and target sound image 120 are arranged in front of the listener 201 on the left. In addition, since the main speaker 110 is farther away from the both ears of the listener 201 than the target sound image, a distance decay occurs and the inter-aural cross correlation of the main sound source is lower than that of the target sound image.

Figure 10:
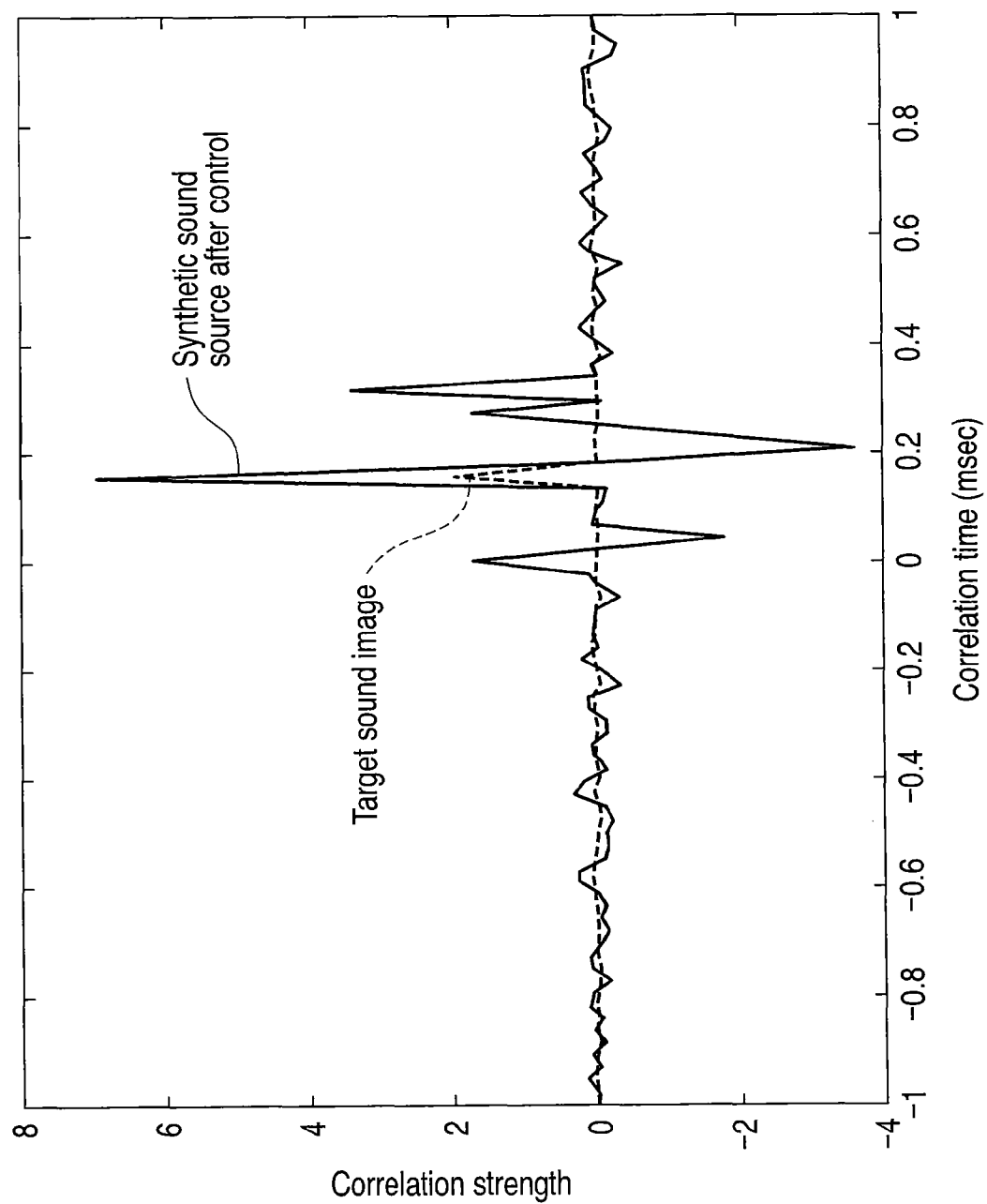
FIG. 10 is a graph showing the result of calculating a cross-correlation function of a synthetic sound source after control when the localization magnification is 1 according to the first embodiment.

FIGS. 10, 11, and 12 show inter-aural cross-correlation functions based on synthetic sound pressures reaching the right and left ears of the listener 201 from a synthetic sound source including the main speaker 110 and the first and second auxiliary speakers 111, 112 with the localization magnification n being 1, 3, and 5, respectively. For ease of explanation, a cross-correlation function based on a synthetic sound pressure reaching the right and left ears of the listener from a synthetic sound source is referred to as a cross-correlation function of a synthetic sound source. It is seen from FIGS. 10, 11, and 12 that, as the localization magnification n increases, the inter-aural cross correlation increases by the square of the localization magnification n. In terms of sound pressure level, for example, when the localization magnification n is 3, the inter-aural cross correlation of a controlled synthetic sound source has become higher than that of the target sound image by about 20 dB (=10 log(140/1.5)). As described above, the larger the value of the inter-aural cross correlation, the more a sense of sound image localization increases. The smaller the value, the more a sense of sound image localization decreases. Since the sound image localization apparatus of the first embodiment includes the localization magnification input unit 107 for inputting the localization magnification n and can change the localization magnification n from the outside, the listener can create a sense of localization to taste.

In FIGS. 10, 11, and 12, since the first auxiliary speaker 111 is arranged directly above the target sound image 120, the correlation time indicating the correlation peak of the cross-correlation function of the synthetic sound source coincides with the correlation time indicating the correlation peak of the cross-correlation function of the target sound image. However, when the first auxiliary speaker 111 and target sound image 120 are arranged in different positions from the aforementioned positions, they do not necessarily coincide with each other. FIG. 13 shows the result of calculating a cross-correlation function of the target sound image when the target sound image is set in a position 0.4 m away from the screen center on the left. In FIG. 13, a cross-correlation function of a synthetic sound pressure calculated with the localization magnification n being 1 is superimposed on the calculation result. As shown in FIG. 13, in the cross-correlation function of the target sound image, the movement of the target sound image 120 to the left makes larger the difference between the distance from the target sound image 120 to the left ear of the listener 201 and the distance from the target sound image 120 to the right ear of the listener 201, with the result that a correlation peak appears where the correlation time $\tau$ is greater than in FIG. 10. However, the position of the correlation peak of the cross-correlation function of the synthetic sound source remains unchanged. The reason for this is that there is no item about the target sound image in the course of deriving a control filter. In the first embodiment, control filters G1 and G2 are not derived according to the position of the target sound image 120 and the position of a sound image to be localized changes according to the arrangement of the individual speakers and others.

As described above, with the sound image localization apparatus according to the first embodiment, control filters G1, G2 for localizing a sound image in a target position can be derived easily using the size of the image display device 150 and such a geometric arrangement as the arrangement of the individual speakers 110, 111, 112. Furthermore, with the sound image localization apparatus, the main speaker 110 is arranged at the lower end of the front frame 154 of the housing 151. The first and second auxiliary speakers 111, 112 are arranged at the upper end of the front frame 154 so as to be closer to the middle of the display panel than the main speaker 110. An acoustic signal adjusted by applying control filters G1, G2 expressed by Equation (19) is reproduced with the first and second auxiliary speakers 111, 112, thereby enabling a sound image to be localized on the display panel 152. In addition, since the sound image localization apparatus of the first embodiment includes the localization magnification input unit 107 for inputting the localization magnification n and enables the localization magnification n to be externally changed, the listener can create a sense of localization to taste.

(Second Embodiment)

Figure 14:
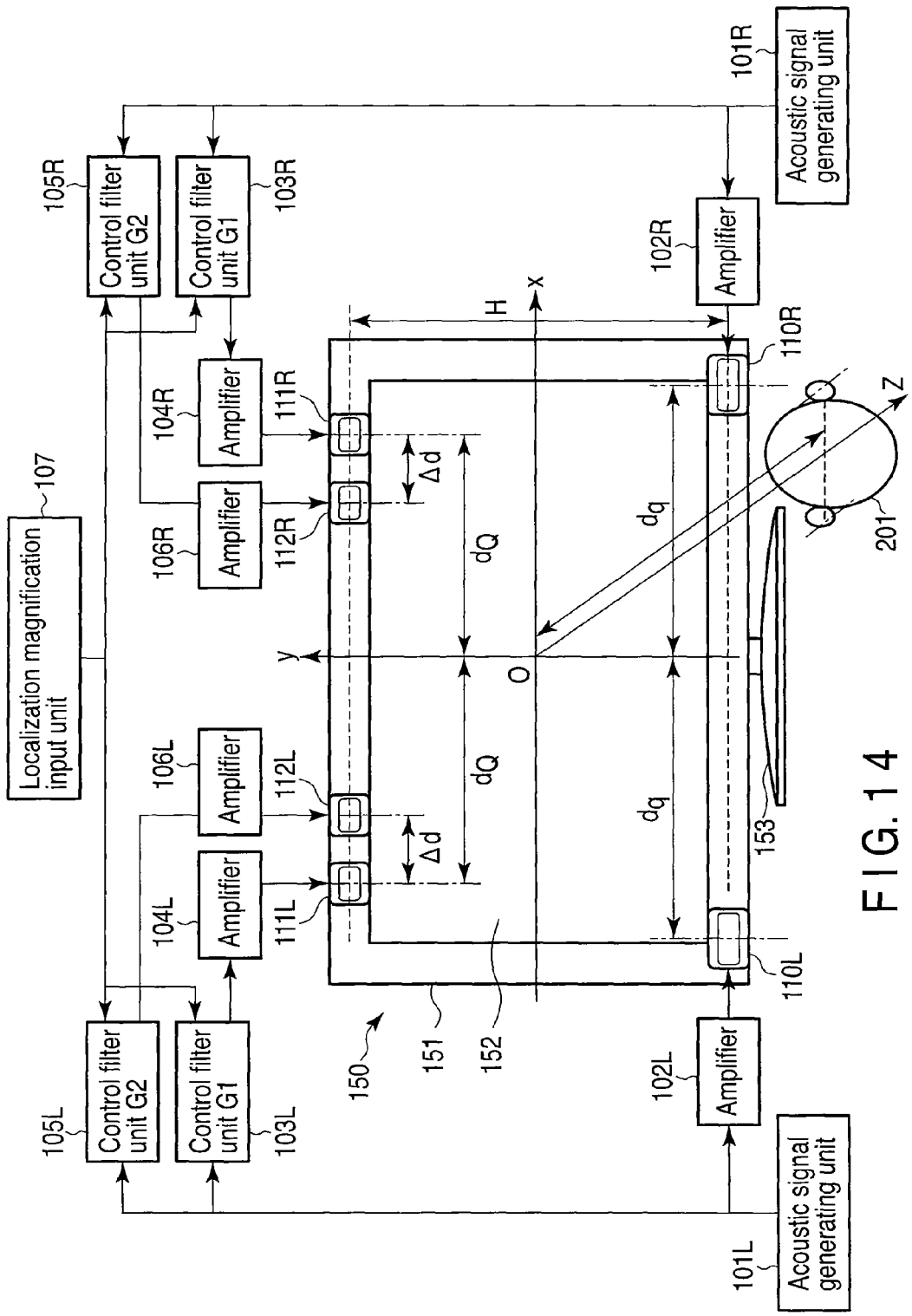
FIG. 14 is a schematic diagram of a sound image localization apparatus according to a second embodiment.

FIG. 14 schematically shows a sound image localization apparatus according to a second embodiment. The sound image localization apparatus of FIG. 14 is such that the sound image localization apparatus of FIG. 2 is applied to a stereo speaker system. In FIG. 14, the same parts are indicated by the same reference symbols as those of FIG. 2 and suffixes L and R attached to symbols indicate use for the left sound source and right sound source of the stereo speaker system, respectively. The localization magnification input unit 107 is shared by the right and left sound sources and inputs the localization magnification n set by the user (such as a listener, viewer) to first control filter units 103L, 103R and second control filter units 105L, 105R.

In FIG. 14, according to a television broadcast signal demodulated by the tuner (not shown) of the image display device 150, a left acoustic signal is generated at an acoustic signal generating unit 101L and a right acoustic signal is generated at an acoustic signal generating unit 101R. The right and left acoustic signals correspond to two channels of a stereo signal. Main speakers 110L, 110R, first auxiliary speakers 111L, 111R, and second auxiliary speakers 112L, 112R are arranged substantially symmetrically with respect to the middle of the display panel 152, that is, with respect to the y-z plane. Consequently, sound images created according to the left and right acoustic signals are also localized in positions located symmetrically with respect to the middle of the display panel 152. As a result, when the stereo signal is reproduced, a sound image is localized in the middle of the display panel 152. This is the same as the fact that, in an ordinary image display device that reproduces a stereo sound source, changing the right and left volume balance causes the listener to feel a sound image localized in the middle of the display panel moving right and left.

As described above, in the sound image localization apparatus according to the second embodiment, the sound image localization apparatus of the first embodiment has been applied to a stereo speaker system, enabling a sound image to be localized in the middle of the display panel 152. Furthermore, since the sound image localization apparatus of the second embodiment includes the localization magnification input unit 107 for inputting the localization magnification n and enables the localization magnification n to be externally changed, the user can create a sense of localization to taste.

(Third Embodiment)

FIG. 15 schematically shows a sound image localization apparatus according to a third embodiment. The sound image localization apparatus of FIG. 15 differs from the sound image localization apparatus of FIG. 2 in that the number of auxiliary speakers is one and a control filter is calculated based on a preset position of the target sound image 120.

The sound image localization apparatus of FIG. 15 includes an acoustic signal generating unit 101 that generates an acoustic signal, an amplifier 102 that amplifies an acoustic signal, and a main speaker 110 that converts the acoustic signal amplified by the amplifier 102 into a sound. The sound image localization apparatus further includes a control filter unit 103 that adjusts the amplitude and phase of an acoustic signal with a control filter G, an amplifier 104 that amplifies the acoustic signal adjusted by the control filter unit 103, and an auxiliary speaker 111 that converts the acoustic signal amplified by the amplifier 104 into a sound. The control filter G of the control filter unit 103 of FIG. 15 differs from the control filter G1 of the first control filter unit 103 of FIG. 2. The control filter G depends on the localization magnification n input from the localization magnification input unit 107. The sound pressure at each of the right and left ears after control increases n-fold and a cross spectrum i expressed by Equation (22) increases $n^2$-fold. That is, the localization strength increases $n^2$-fold.

The main speaker 110 is arranged on the extreme left of the lower end of the front frame 154. The auxiliary speaker 111 is arranged on the left side of the upper end of the front frame 154 so as to be closer to the middle of the display panel than the main speaker 110. That is, the distance dq from the y-z plane, which is symmetrically dividing a display panel 152, to the main speaker 110 is larger than the distance dQ from the y-z plane to the auxiliary speaker 111. The target sound image 120 is set on the x-y plane including the display panel 152. As an example, the target sound image 120 is set above the main speaker 110 and outside the housing 151.

The sound pressure reaching the left ear of the listener 201 can be represented by the sound pressure of a synthetic sound including the main sound from the main speaker 110 and the control sound from the auxiliary speaker 111. To localize a sound image in the position of the target sound image 120, the sound pressure of the synthetic sound is controlled so as to coincide with the sound pressure reaching the left ear when the main sound is output from the target sound image 120. Therefore, a spatial transfer function $H_L$ as far as the left ear using the strength $q_p$ of a sound output from the main speaker 110 as a reference is expressed as Equation (23) below. Similarly, the sound pressure signal reaching the right ear of the listener can be represented by the sound pressure of a synthetic sound including the main sound from the main speaker 110 and the control sound from the auxiliary speaker 111. To localize a sound image in the position of the target sound image 120, the sound pressure of the synthetic sound is controlled so as to coincide with the sound pressure reaching the right ear when the main sound is output from the target sound image 120. Therefore, a spatial transfer function $H_R$ as far as the right ear using the strength $q_p$ of a sound output from the main speaker 110 as a reference is expressed as Equation (24) below.

$$H_L = \frac{e^{-jkL_{q\_L}}}{L_{q\_L}} + G \cdot \frac{e^{-jkL_{Q\_L}}}{L_{Q\_L}} = \frac{e^{-jkL_{Tq\_L}}}{L_{Tq\_L}} \quad (23)$$

$$H_R = \frac{e^{-jkL_{q\_R}}}{L_{q\_R}} + G \cdot \frac{e^{-jkL_{Q\_R}}}{L_{Q\_R}} = \frac{e^{-jkL_{Tq\_R}}}{L_{Tq\_R}} \quad (24)$$

Here, $L_{Tq\_R}$ denotes the linear distance between the target sound image 120 and the right ear position which set in the viewing area in front of the display panel 152, and $L_{Tq\_L}$ denotes the linear distance between the target sound image 120 and the left ear position which set in the viewing area in front of the display panel 152. $L_{q\_R}$ denotes the linear distance between the main speaker 110 and the right ear position and $L_{q\_L}$ denotes the linear distance between the main speaker 110 and the left ear position. $L_{Q\_R}$ denotes the linear distance between the auxiliary speaker 111 and the right ear position and $L_{Q\_L}$ denotes the linear distance between the auxiliary speaker 111 and the left ear of the listener. If the localization magnification n is 1, Equation (23) and Equation (24) hold. If n is not 1, the rightmost term of each of Equation (23) and Equation (24) is multiplied by n.

From Equation (23) and Equation (24), the control filter G is derived as expressed by the following Equation (25):

$$G = -\frac{H_R \cdot W_L - H_L \cdot W_R}{H_R \cdot U_L - H_L \cdot U_R} \quad (25)$$

$$= -\frac{\dfrac{e^{-jk(L_{Tq\_R}+L_{q\_L})}}{L_{Tq\_R} \cdot L_{q\_L}} - \dfrac{e^{-jk(L_{Tq\_L}+L_{q\_R})}}{L_{Tq\_L} \cdot L_{q\_R}}}{\dfrac{e^{-jk(L_{Tq\_R}+L_{Q\_L})}}{L_{Tq\_R} \cdot L_{Q\_L}} - \dfrac{e^{-jk(L_{Tq\_L}+L_{Q\_R})}}{L_{Tq\_L} \cdot L_{Q\_R}}}$$

Here, $W_L$ denotes a transfer function from the main speaker 110 to the left ear position, $W_R$ denotes a transfer function from the main speaker 110 to the right ear position, $U_L$ denotes a transfer function from the auxiliary speaker 111 to the left ear position, and $U_R$ denotes a transfer function from the auxiliary speaker 111 to the right ear position. In the control filter G expressed by Equation (25), the denominator may become zero. If the denominator becomes zero, Equation (25) will diverge. A condition under which the denominator does not become zero is represented by the following expression (26):

$$\frac{e^{-jkL_{Tq\_R}}}{L_{Tq\_R}} \cdot \frac{e^{-jkL_{Q\_L}}}{L_{Q\_L}} \neq \frac{e^{-jkL_{Tq\_L}}}{L_{Tq\_L}} \cdot \frac{e^{-jkL_{Q\_R}}}{L_{Q\_R}} \quad (26)$$

Expression (26) means that an impulse response of $1/(L_{Tq\_R} \times L_{Q\_L})$ at time $(L_{Tq\_R}+L_{Q\_L})/C$ does not coincide with an impulse response of $1/(L_{Tq\_L} \times L_{Q\_R})$ at time $(L_{Tq\_L}+L_{Q\_R})/C$. Here, C denotes the speed of sound. Therefore, a condition under which the denominator does not become zero is represented by Expression (27) and Expression (28) below:

$$\Delta L = L_{Tq\_R}+L_{Q\_L}-L_{Tq\_L}-L_{Q\_R} \neq 0 \quad (27)$$

$$L_{Tq\_R} \cdot L_{Q\_L} \neq L_{Tq\_L} \cdot L_{Q\_R} \quad (28)$$

Although the right and left ear positions are set so as to be symmetric with respect to the screen center, each of the target sound image 120, main speaker 110, and auxiliary speaker 111 is arranged so as to be a different distance away from the screen center and therefore Expression (27) is satisfied. However, in terms of digital control, since the spatial resolution is about 0.7 cm at a sampling frequency Δf of 44.1 (kHz), if the path difference ΔL is minute, that is, if $0.7 > \Delta L > 0$, the impulse response peak cannot be practically shifted one tap, with the result that the path difference ΔL becomes practically zero. Therefore, a condition under which the denominator of Equation (25) does not become zero is represented by the tap difference ΔN based on impulse responses, giving the following Expression (29):

$$\Delta N = \left| \frac{(L_{Tq\_R}+L_{Q\_L}-L_{Tq\_L}-L_{Q\_R}) \cdot \Delta f}{C} \right| > 0 \quad (29)$$

Accordingly, the positions of the auxiliary speaker 111 and target sound image 120 are set so as to satisfy Expression (29), thereby enabling a useful control filter G to be realized.

Next, the strength of sound image localization will be explained.

As in the speaker system of FIG. 5, when the auxiliary speaker 511 is arranged immediately above the main speaker 510 and the auxiliary speaker 511 emits a sound with the same amplitude and same phase as those of the main speaker 520, the correlation strength is expressed by the following Equation (30):

$$|P_L \cdot P_R^*| = |(W_L+U_L)(W_R+U_R)^*|$$

$$= |(W_L+W_L)(W_R+W_R)^*| = 4|W_L \cdot W_R^*| \quad (30)$$

In contrast, as in the sound image localization apparatus of FIG. 15, the auxiliary speaker 111 is arranged closer to the middle than the main speaker 110, the auxiliary speaker 111 is located closer to the listener 201 than the main speaker 110 and therefore the linear distance between the main speaker 110 to the listener 201 is shorter. As a result, the distance decay of a control sound becomes smaller and therefore the spatial transfer functions $U_L$, $U_R$ become greater than the spatial transfer functions $W_L$, $W_R$. Therefore, as seen from Equation (31) below, the correlation strength in the sound image localization apparatus of FIG. 15 becomes higher than the correlation strength expressed by Equation (30):

$$|P_L \cdot P_R^*|' = |(W_L+G \cdot U_L)(W_R+G \cdot U_R)^*|$$

$$\cong |(W_L+3W_L)(W_R+3W_R)^*| = 16|W_L \cdot W_R^*| > |P_L \cdot P_R^*| \because U > W \quad (31)$$

The strength increases as the distance between the auxiliary speaker 111 and the listener 201 becomes shorter. The distance between the auxiliary speaker 111 and the listener 201 becomes the shortest when the auxiliary speaker 111 is arranged in the middle of the upper end of the front frame 154 of the housing 151, that is, when dQ=0. Therefore, the auxiliary speaker 111 is arranged closer to the middle of the upper end of the front frame 154, preferably in the middle of the upper end of the front frame 154.

When the auxiliary speaker 111 is arranged in the middle of the upper end of the front frame 154, the linear distance $L_{Q\_R}$ from the auxiliary speaker 111 to the right ear position is equal to the linear distance $L_{Q\_L}$ from the auxiliary speaker 111 to the left ear position. At this time, Equation (25) is transformed into Equation (32) below. In this case, it is necessary to set the target sound image 120 in a position away from the middle of the display panel so that the linear distance $L_{TQ\_R}$ from the target sound image 120 to the right ear position may not be equal to the linear distance $L_{TQ\_L}$ from the target sound image 120 to the left ear position, that is, Equation (29) may be satisfied.

$$G = -\frac{\dfrac{e^{-jk(L_{Tq\_R}+L_{q\_L})}}{L_{Tq\_R} \cdot L_{q\_L}} - \dfrac{e^{-jk(L_{Tq\_L}+L_{q\_R})}}{L_{Tq\_L} \cdot L_{q\_R}}}{\dfrac{e^{-jk(L_{Q\_L})}}{L_{Q\_L}} \left( \dfrac{e^{-jk(L_{Tq\_R})}}{L_{Tq\_R}} - \dfrac{e^{-jk(L_{Tq\_L})}}{L_{Tq\_L}} \right)} \quad (32)$$

As described above, the sound image localization apparatus according to the third embodiment produces the same effect as that of the first embodiment. Using a single control sound source, the third embodiment can derive the control filter G more easily than the first embodiment, provided the condition that the tap difference ΔN expressed by Equation (29) is greater than zero must be satisfied.

(Fourth Embodiment)

Figure 16:
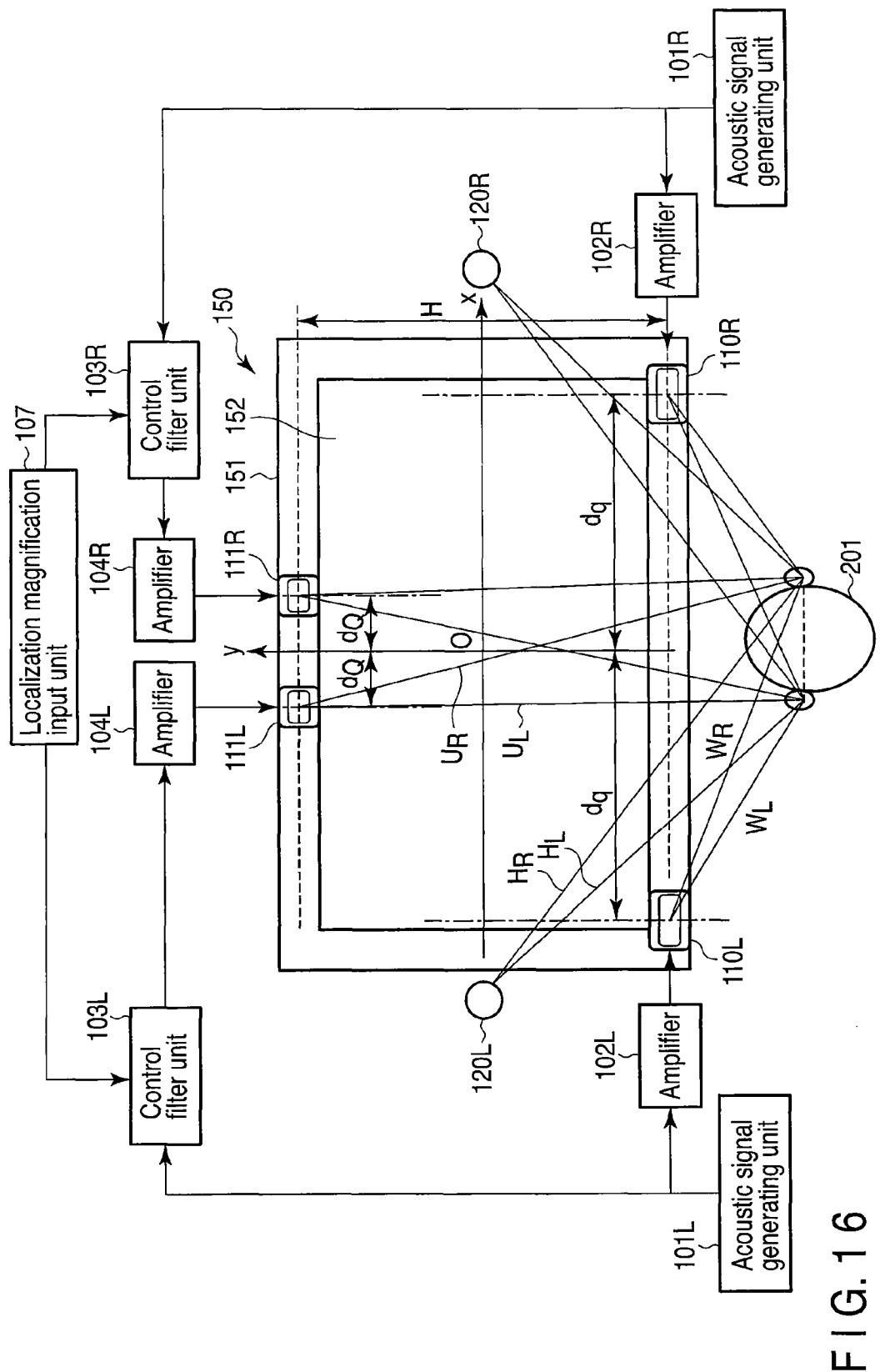
FIG. 16 is a schematic diagram of a sound image localization apparatus according to a fourth embodiment.

FIG. 16 schematically shows a sound image localization apparatus according to a fourth embodiment. The sound image localization apparatus of FIG. 16 is such that the sound image localization apparatus of FIG. 15 is applied to a stereo speaker system. In FIG. 16, the same parts are indicated by the same reference symbols as those of FIG. 15 and suffixes L and R attached to symbols indicate use for the left sound source and right sound source of the stereo speaker system, respectively.

In FIG. 16, according to a television broadcast signal demodulated by the tuner (not shown) of the image display device 150, a left acoustic signal is generated at an acoustic signal generating unit 101L and a right acoustic signal is generated at an acoustic signal generating unit 101R. The right and left acoustic signals correspond to two channels of a stereo signal. Main speakers 110L, 110R and auxiliary speakers 111L, 111R are arranged symmetrically with respect to the middle of the display panel 152, that is, with respect to the y-z plane. Consequently, sound images created according to the left and right acoustic signals are also localized in positions located symmetrically with respect to the middle of the display panel. As a result, when the stereo signal is reproduced, a sound image is localized in the middle of the display panel 152.

As described above, with the sound image localization apparatus of the fourth embodiment, the sound image localization apparatus of the third embodiment has been applied to a stereo speaker system, enabling a sound image to be localized in the middle of the display panel 152. Furthermore, since the sound image localization apparatus of the fourth embodiment comprises the localization magnification input unit 107 for inputting the localization magnification n and enables the localization magnification n to be externally changed, the user can create a sense of localization to taste.

(Fifth Embodiment)

A sound image localization apparatus according to a fifth embodiment will be explained with reference to FIG. 2. The fifth embodiment has the same configuration as that of the first embodiment. The fifth embodiment differs from the first embodiment in that the number N of evaluation points is 1 and control filters G1 and G2 derived under this condition differ.

As described above, a sound pressure signal $P_L$ reaching the left ear position can be expressed by the sound pressure of a synthetic sound from the main speaker 110 and the first and second auxiliary speakers 111, 112 as shown by Equation (33) below. Similarly, a sound pressure signal $P_R$ reaching the right ear position can be expressed by the sound pressure of a synthetic sound from the main speaker 110 and the first and second auxiliary speakers 111, 112 as shown by Equation (34) below.

$$P_L = W_L q_P + G_1 \cdot U_{L1} q_P + G_2 \cdot U_{L2} q_P \tag{33}$$

$$P_R = W_R q_P + G_1 \cdot U_{R1} q_P + G_2 \cdot U_{R2} q_P \tag{34}$$

Here, $W_L$ denotes a transfer function from the sound source center of the main speaker 110 to the left ear position of the listener 201 and is determined by the linear distance $L_{WL}$ between the sound source center of the main speaker 110 and the left ear position. $W_R$ denotes a transfer function from the sound source center of the main speaker 110 to the right ear position of the listener 201 and is determined by the linear distance $L_{WR}$ between the sound source center of the main speaker 110 and the right ear position. $U_{L1}$ denotes a transfer function from the sound source center of the first auxiliary speaker 111 to the left ear position and is determined by the linear distance $L_{UL1}$ between the sound source center of the first auxiliary speaker 111 and the left ear position. $U_{L2}$ denotes a transfer function from the sound source center of the second auxiliary speaker 112 to the left ear position and is determined by the linear distance $L_{UL2}$ between the sound source center of the second auxiliary speaker 112 and the left ear position. $U_{R1}$ denotes a transfer function from the sound source center of the first auxiliary speaker 111 to the right ear position and is determined by the linear distance $L_{UR1}$ between the sound source center of the first auxiliary speaker 111 and the right ear position. $U_{R2}$ denotes a transfer function from the sound source center of the second auxiliary speaker 112 to the right ear position and is determined by the linear distance $L_{UR2}$ between the sound source center of the second auxiliary speaker 112 and the right ear position.

If the sound pressures of the controlled synthetic sound which are expressed by Equation (33) and Equation (34) have been amplified n times as compared with the reference sound pressures expressed by Equation (10) and Equation (11) respectively, Equation (35) and Equation (36) will be derived as follows:

$$P_L = W_L q_P + G_1 \cdot U_{L1} q_P + G_2 \cdot U_{L2} q_P = 2n W_L q_P \tag{35}$$

$$P_R = W_R q_P + G_1 \cdot U_{R1} q_P + G_2 \cdot U_{R2} q_P = 2n W_R q_P \tag{36}$$

Calculating Equation (35) and Equation (36) for control filters G1 and G2 gives the following Equation (37):

$$\begin{pmatrix} G_1 \\ G_2 \end{pmatrix} = (1 - 2n) \begin{pmatrix} U_{L1} & U_{L2} \\ U_{R1} & U_{R2} \end{pmatrix}^{-1} \begin{pmatrix} W_L \\ W_P \end{pmatrix} \tag{37}$$

Thus, when the number N of evaluation points is 1, control filters G1 and G2 can be derived without partial differentiation. As seen from Equation (37), the denominator of each of the control filters G1 and G2 is expressed by the difference between transfer functions as $(U_{L1} \times U_{R2} - U_{L2} \times U_{R1})$. Therefore, it is necessary to set the positions of the first and second auxiliary speakers 111, 112 so that the denominator may not become zero. This condition is satisfied when the tap difference $\Delta N$ is greater than 0 as expressed by Equation (38):

$$\Delta N = \left| \frac{(L_{UL1} + L_{UR2} - L_{UL2} - L_{UR1}) \cdot \Delta f}{C} \right| > 0 \tag{38}$$

When this condition is satisfied, the sound pressure at the right and left ear positions after control increases n-fold. The cross spectrum η expressed by Equation (22) increases $n^2$-fold, that is, the localization strength increases $n^2$-fold.

As described above, the sound image localization apparatus of the fifth embodiment produces the same effect as that of the first embodiment. In addition, although restrictions are placed on the arrangement of the auxiliary speakers and the target sound image, it becomes much easier to calculate the control filters G1 and G2.

In the second embodiment, the first embodiment has been applied to a stereo speaker system. Similarly, the sound image localization apparatus of the fifth embodiment may be applied to a stereo speaker system.

(Sixth Embodiment)

Figure 17:
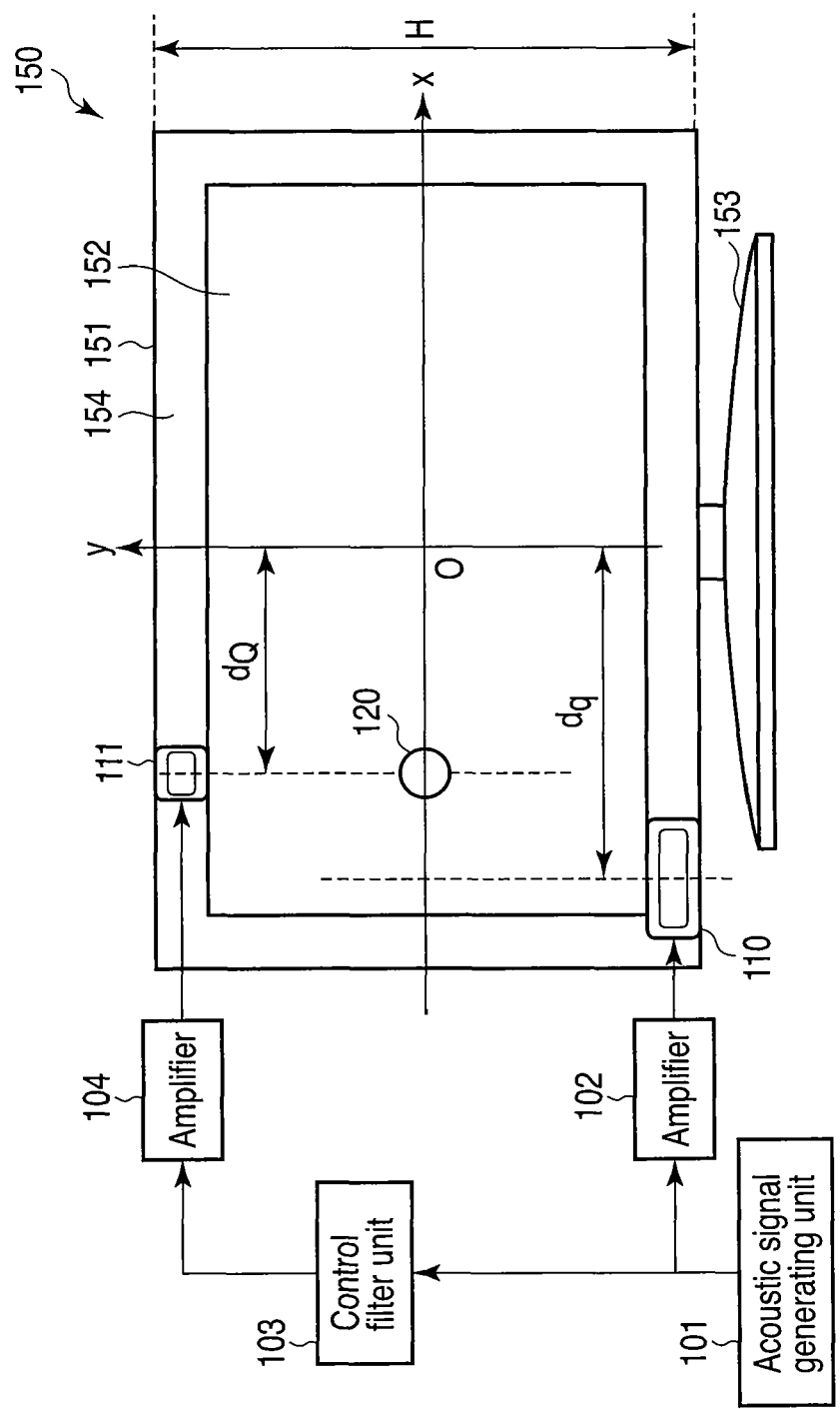
FIG. 17 is a schematic diagram of a sound image localization apparatus according to a sixth embodiment.

FIG. 17 schematically shows a sound image localization apparatus according to a sixth embodiment. The sound image localization apparatus of FIG. 17 is such that the localization magnification input unit 107 is eliminated from the sound image localization apparatus of FIG. 15 and the localization magnification n is fixed to 1. In the sixth embodiment, the target sound image 120 is set on the display panel 152 below the auxiliary speaker 111. A control filter G is calculated using Equation (25), provided that Equation (29) must be satisfied.

As an example, derived are the linear distance $L_{Tq\_R}$ between the target sound image 120 and the right ear position of the listener 201, the linear distance $L_{Tq\_L}$ between the target sound image 120 and the left ear position of the listener 201, the linear distance $L_{q\_R}$ between the main speaker 110 and the right ear position, the linear distance $L_{q\_L}$ between the main speaker 110 and the left ear position, the linear distance $L_{Q\_R}$ between the auxiliary speaker 111 and the right ear position, and the linear distance $L_{Q\_L}$ between the auxiliary speaker 111 and the left ear position as shown in Equation (25) and Equation (29) as expressed by the following Equations (29):

$$L_{Tq\_R} = \sqrt{(-d_Q - d_e)^2 + R^2} \qquad (39)$$

$$L_{Tq\_L} = \sqrt{(d_Q + d_e)^2 + R^2}$$

$$L_{Q\_R} = \sqrt{(-d_Q - d_e)^2 + R^2 + \left(\frac{H}{2}\right)^2}$$

$$L_{Q\_L} = \sqrt{(d_Q + d_e)^2 + R^2 + \left(\frac{H}{2}\right)^2}$$

$$L_{q\_R} = \sqrt{(-d_q - d_e)^2 + R^2 + \left(-\frac{H}{2}\right)^2}$$

$$L_{q\_L} = \sqrt{(d_q + d_e)^2 + R^2 + \left(-\frac{H}{2}\right)^2}$$

Where, H denotes the height of the image display device 150, for example, the height of the housing 151. Alternatively, the height H may be the distance between the sound source center of the main speaker 110 and the sound source center of the auxiliary speaker 111 in the height direction (or in the direction along the y-axis) or the height of the display panel 152. $d_q$ denotes the distance between the sound source center of the main speaker 110 and the screen center in the width direction. $d_Q$ indicates the distance between the sound source center of the auxiliary speaker 111 and the screen center in the width direction. de denotes the value of half the distance between both ear positions.

Figure 18:
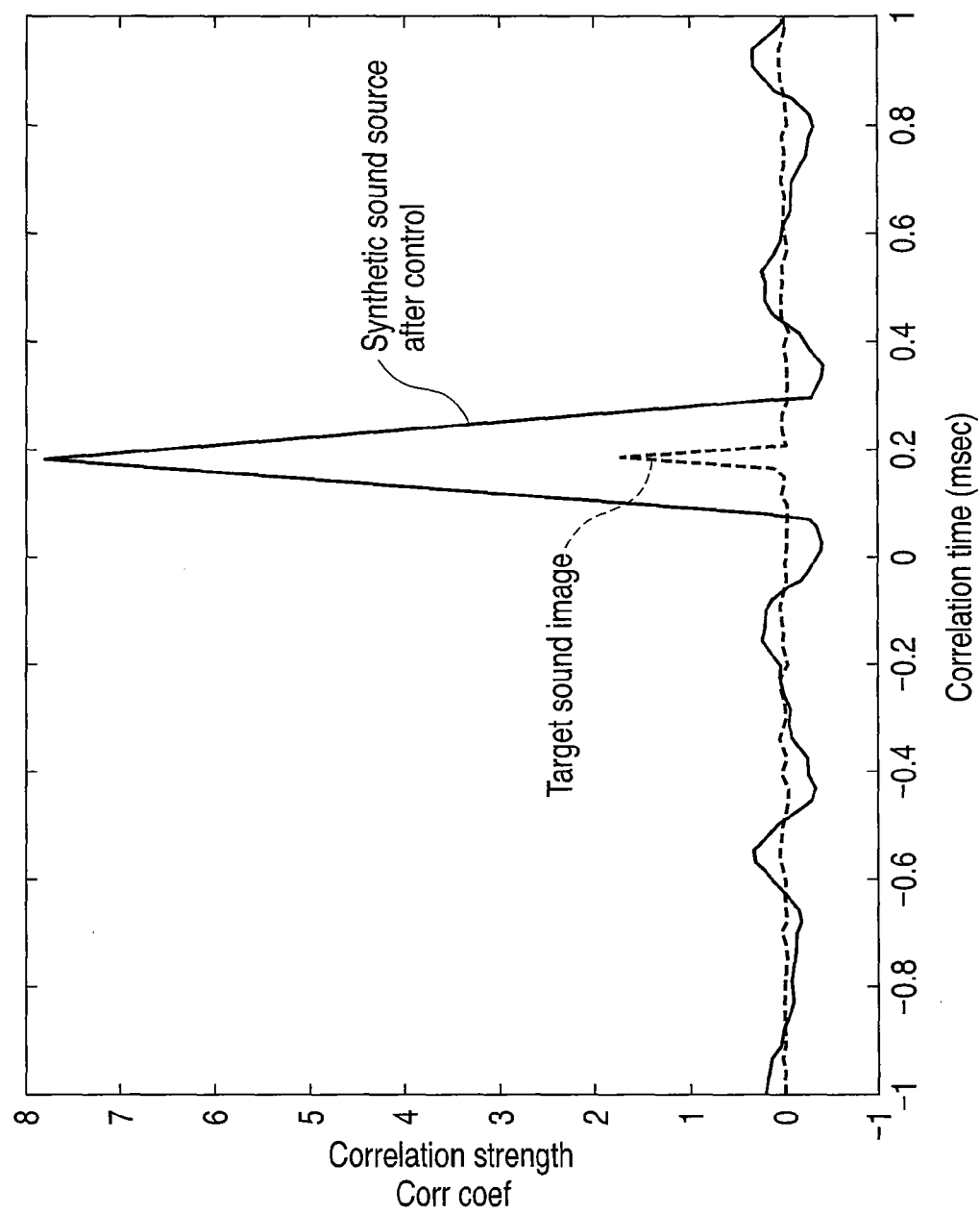
FIG. 18 is a graph showing the result of calculating cross-correlation functions of a synthetic sound source and a target sound image according to the sixth embodiment.

FIG. 18 shows an example of the result of calculating a cross-correlation function of a synthetic sound source including the main speaker 110 and auxiliary speaker 111. As shown in FIG. 18, the correlation time showing the correlation peak of the cross-correlation function of the synthetic sound source coincides with the correlation time showing the correlation peak of the cross-correlation function of the target sound image. Therefore, it is seen that a sound image is localized in the target position.

Figure 19:
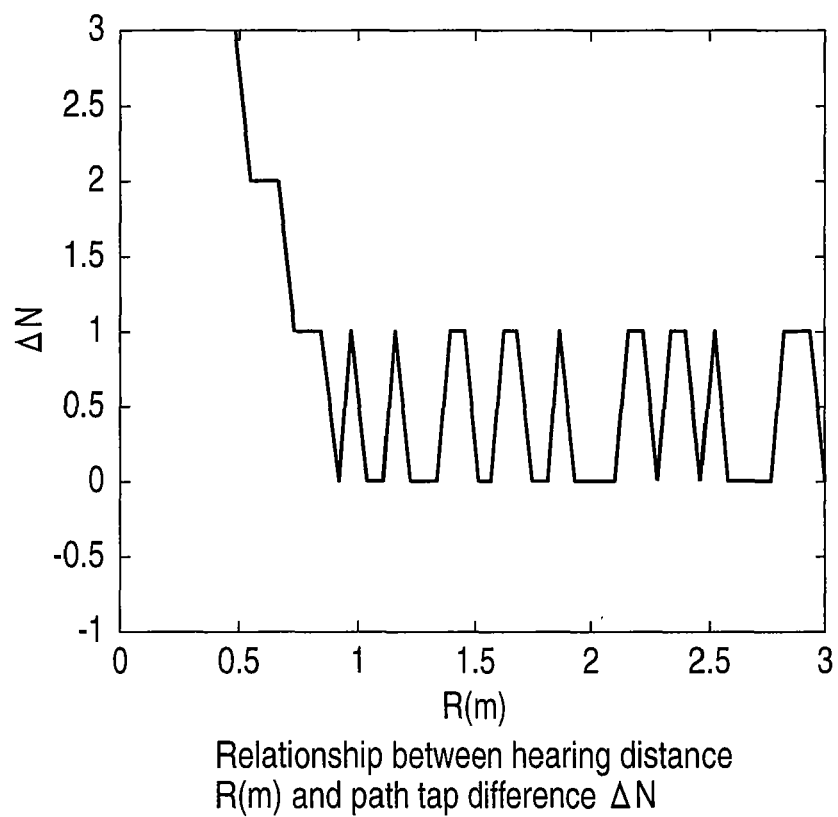
FIG. 19 is a graph showing the relationship between a hearing distance R and a tap difference $\Delta N$ according to the sixth embodiment.
Figure 20A:
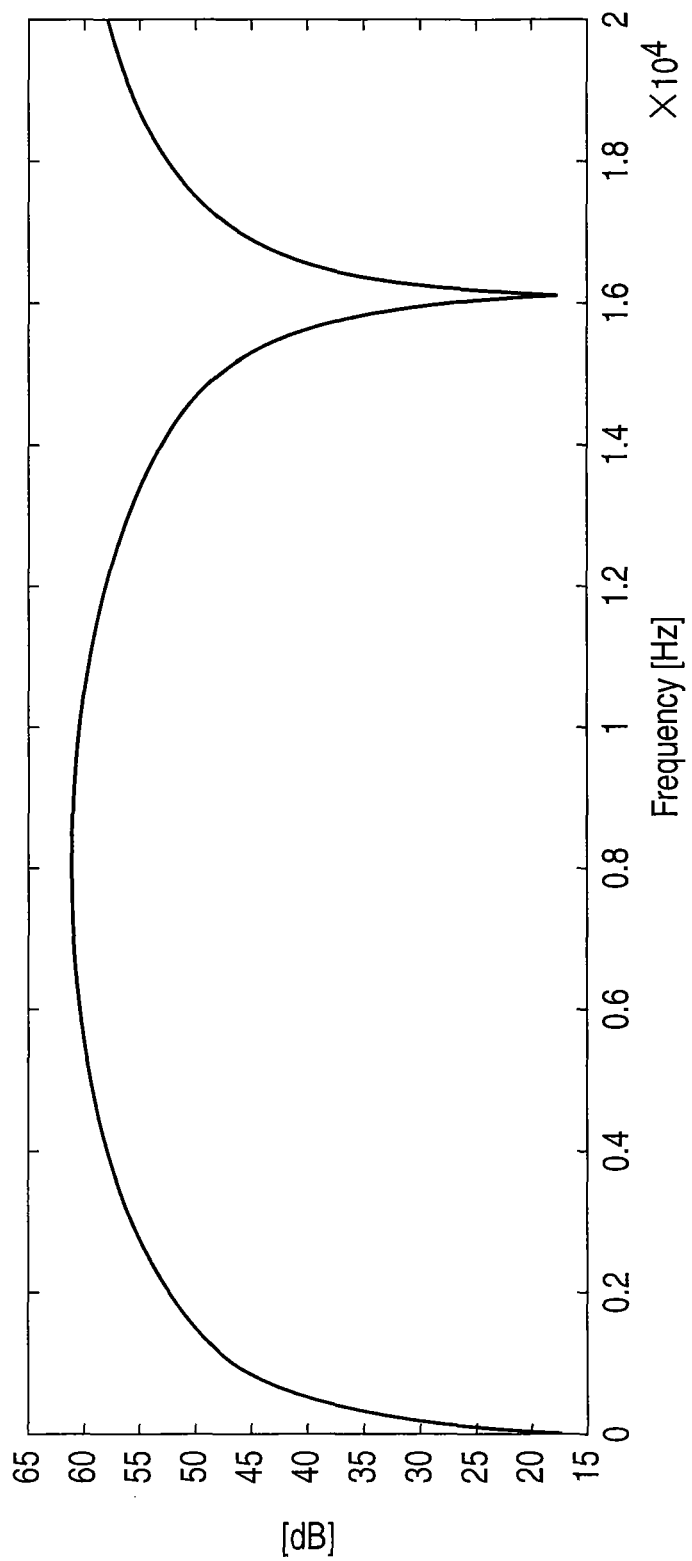
FIG. 20A is a graph showing a gain-frequency characteristic in a control filter calculated when the tap difference $\Delta N$ becomes zero in the sixth embodiment.
Figure 20B:
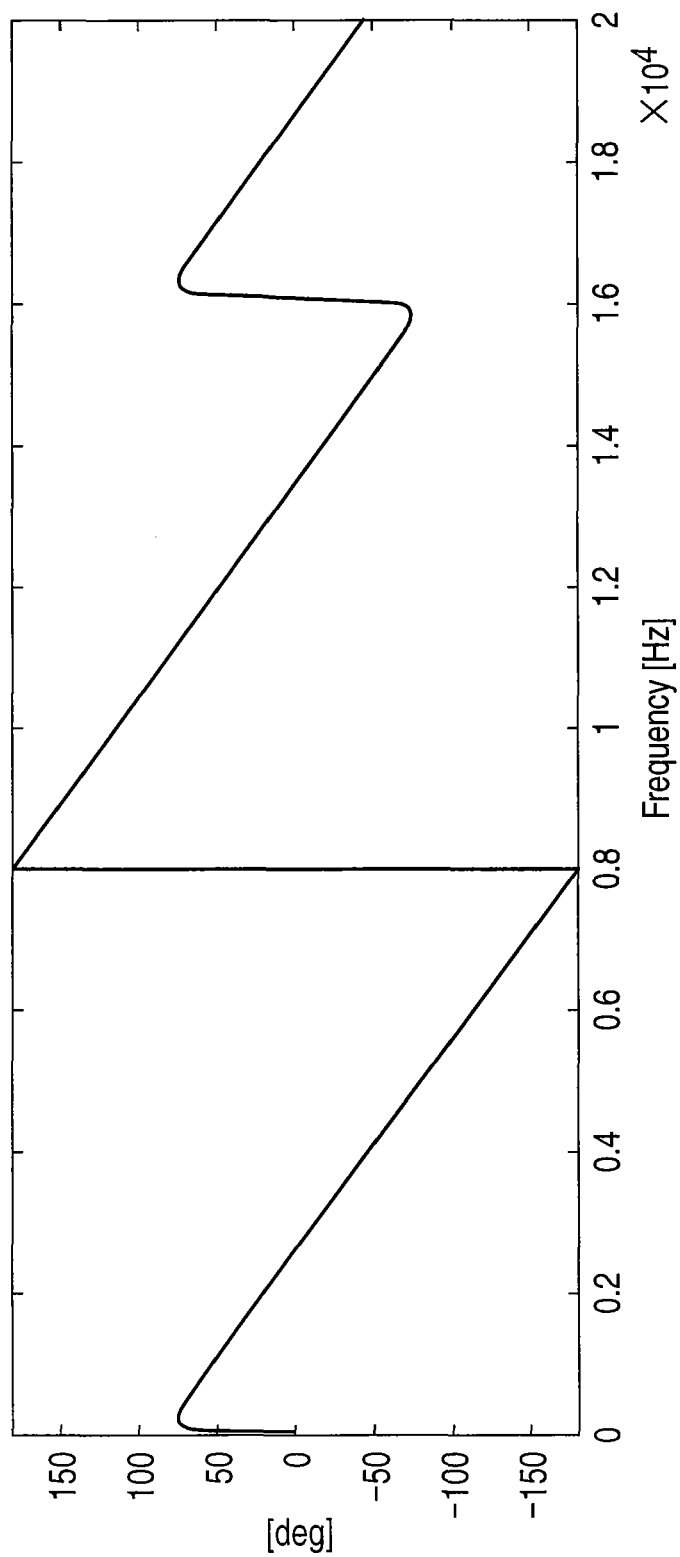
FIG. 20B is a graph showing a phase-frequency characteristic in a control filter calculated when the tap difference $\Delta N$ becomes zero according to the sixth embodiment.
Figure 21A:
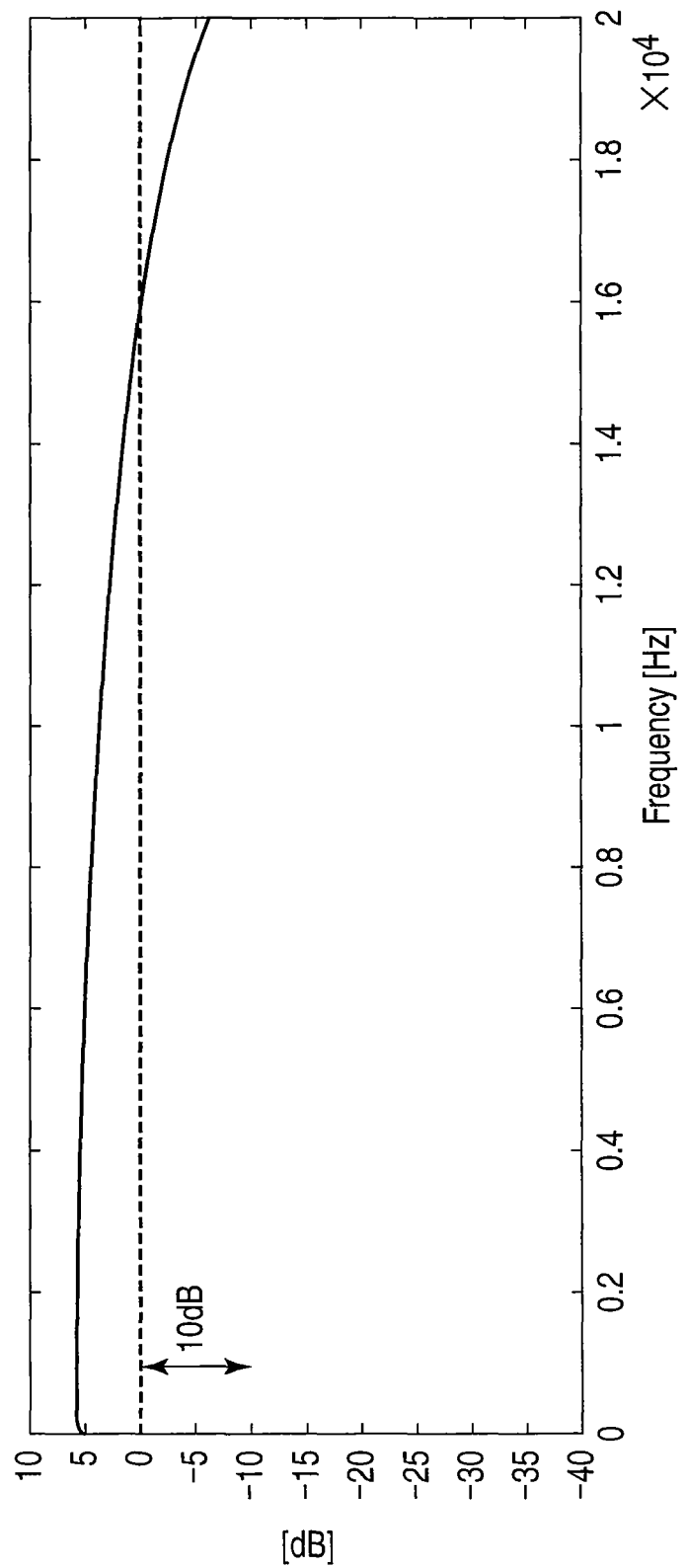
FIG. 21A is a graph showing a gain-frequency characteristic in a control filter calculated when the tap difference $\Delta N$ becomes one according to the sixth embodiment.
Figure 21B:
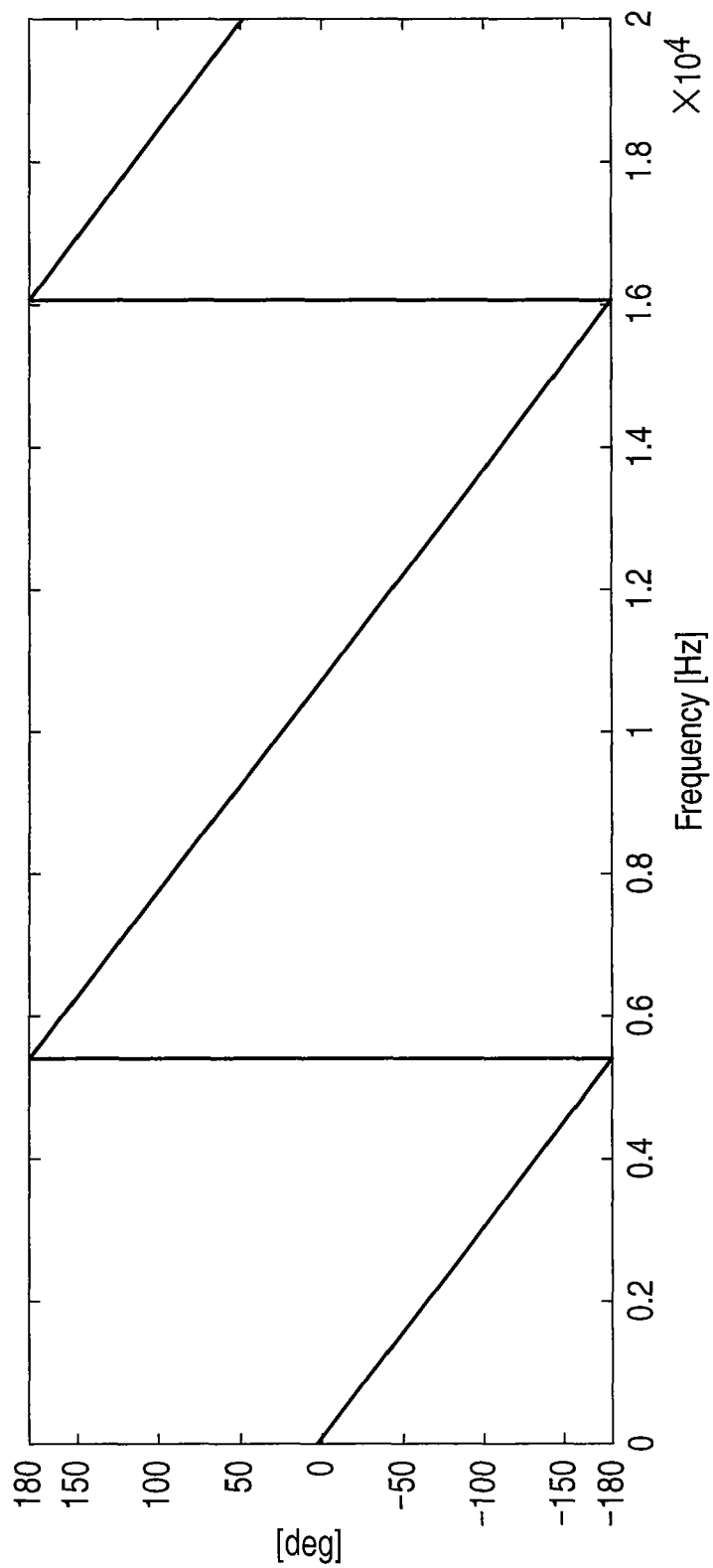
FIG. 21B is a graph showing a phase-frequency characteristic in a control filter calculated when the tap difference $\Delta N$ is one according to the sixth embodiment.

FIG. 19 shows the relationship between a hearing distance R and a tap difference ΔN expressed by Equation (29). As shown in FIG. 19, the tap difference ΔN may become zero, depending on the hearing distance R. The hearing distance R is determined to be a value in a specific range according to the size of the image display device 150. Therefore, depending on the determined value, the tap difference ΔN may become zero or approach zero. As an example, when the hearing distance R is 1.2 m, the tap difference ΔN becomes zero. The result of calculating a control filter G with the hearing distance R being 1.2 m is shown in FIGS. 20A and 20B. FIG. 20A shows a gain-frequency characteristic and FIG. 20B shows a phase-frequency characteristic. Since the control filter G has not been calculated discretely, the denominator does not become zero. The gain does not diverge, but increases as much as about 60 dB. In contrast, the result of calculating a control filter G with the tap difference ΔN being 1 is shown in FIGS. 21A and 21B. As shown in FIG. 21A, when Equation (29) is satisfied, an almost flat frequency characteristic is obtained.

As described above, the sound image localization apparatus of the sixth embodiment enables a control filter to be derived from the size of the image display device and such a geometric arrangement as the arrangement of speakers or the position of the target sound image without using a head-related transfer function. In addition, since a term about the position of the target sound image is included in the equation for deriving a control filter, a sound image can be localized in the target position.

(Seventh Embodiment)

A sound image localization apparatus according to a seventh embodiment will be explained with reference to FIGS. 17 and 22. The seventh embodiment has the same configuration as that of the sixth embodiment shown in FIG. 17. In the seventh embodiment, to satisfy Equation (29), that is, to prevent the denominator of the control filter G from becoming zero, the distance from the display panel 152 to the left ear position of the listener 201 is made different from the distance from the display panel 152 to the right ear position of the listener 201. As an example, as shown in FIG. 22, the distance from the display panel 152 to the left ear position is set to R and the distance from the display panel 152 to the right ear position is set to R+r. Distance r is, for example, 0.1 m. In this case, equations (39) are transformed into the following equations (40):

$$L_{Tq\_R} = \sqrt{(-d_Q - d_e)^2 + (R+r)^2} \qquad (40)$$

$$L_{Tq\_L} = \sqrt{(d_Q + d_e)^2 + R^2}$$

$$L_{Q\_R} = \sqrt{(-d_Q - d_e)^2 + (R+r)^2 + \left(\frac{H}{2}\right)^2}$$

$$L_{Q\_L} = \sqrt{(d_Q + d_e)^2 + R^2 + \left(\frac{H}{2}\right)^2}$$

$$L_{q\_R} = \sqrt{(-d_q - d_e)^2 + (R+r)^2 + \left(-\frac{H}{2}\right)}$$

$$L_{q\_L} = \sqrt{(d_q + d_e)^2 + R^2 + \left(-\frac{H}{2}\right)^2}$$

FIG. 23 shows the relationship between the tap difference ΔN and hearing distance R in Equation (29) in a case where the distance between the left ear position and the display panel 152 is made different from the distance between the right ear position and the display panel 152. The comparison between FIG. 23 and FIG. 19 has shown that the range of the hearing distance R where the tap difference ΔN becomes zero decreases in FIG. 23. For example, when the hearing distance R is 1.5 m, the tap difference ΔN is zero in FIG. 19, whereas the tap difference ΔN is 1 in FIG. 23.

As described above, with the sound image localization apparatus of the seventh embodiment, the distance from the left position to the display panel 152 is made different from the distance from the right ear position to the display panel 152, making greater the range of the hearing distance R that satisfies Equation (29), which enables the denominator of control filter G to be prevented from becoming zero. This makes it possible to derive a useful control filter G easily. In addition, since the equation for deriving a control filter includes a term about the position of the target sound image, a sound image can be localized in the target position.

(Eighth Embodiment)

A sound image localization apparatus according to an eighth embodiment will be explained with reference to FIGS. 17 and 24. The eighth embodiment has the same configuration as that of the sixth embodiment shown in FIG. 17. In the eighth embodiment, it is assumed that the hearing distance R is determined by the height H of the housing 151. A control filter G is determined based on the size of the housing 151 and the positions of the speakers 110, 111.

Generally, the marginal hearing distance is 3.18 times the height of the display panel 152. Three times the height of the display panel 152 is the optimum hearing distance. When the height of the display panel 152 is 0.7 m, the hearing distance is 2.1 m to 2.226 m. The hearing distance R necessary to derive a control filter G is determined by the positions of speakers. In an image display device where the housing 151 is formed into a thin box, a speaker is generally arranged on the front frame (i.e., bezel) 154 of the housing 151 and therefore the distance between the main speaker 110 and auxiliary speaker 111 in the height direction can be regarded as being equal to the height H of the housing H (or the height of the display panel 152). Therefore, if the hearing distance R is three times the height H of the housing 151, equations (39) are transformed into equations (41).

$$L_{Tq\_R} = \sqrt{\left(d_e + \frac{W}{2} - ds\right)^2 + (3H)^2}$$

$$L_{Tq\_L} = \sqrt{\left(-d_e + \frac{W}{2} - ds\right)^2 + (3H)^2}$$

$$L_{Q\_R} = \sqrt{\left(d_e + \frac{W}{2} - ds\right)^2 + (3H)^2 + \left(\frac{H}{2}\right)^2}$$

$$L_{Q\_L} = \sqrt{\left(-d_e + \frac{W}{2} - ds\right)^2 + (3H)^2 + \left(\frac{H}{2}\right)^2}$$

$$L_{q\_R} = \sqrt{\left(d_e + \frac{W}{2} - dp\right)^2 + (3H)^2 + \left(-\frac{H}{2}\right)^2}$$

$$L_{q\_L} = \sqrt{\left(-d_q + \frac{W}{2} - dp\right)^2 + (3H)^2 + \left(-\frac{H}{2}\right)^2}$$

(41)

Where, as shown in FIG. 24, W denotes the width of the housing 151, ds denotes the distance from the left end of the housing 151 to the sound source center of the auxiliary speaker 111 (or the target sound image 120) in the width direction, and dp indicates the distance from the left end of the housing 151 to the main speaker 110 in the width direction. A control filter G expressed by Equation (25) is derived using the distances $L_{Tq\_R}$, $L_{Tq\_L}$, $L_{q\_R}$, $L_{q\_L}$, $L_{Q\_R}$, and $L_{Q\_L}$ in equations (41), enabling a sound image to be localized near the middle of the display panel 152 directly under the auxiliary speaker 111 even under the condition that the auxiliary speaker 111 is not arranged directly above the main speaker 110 (i.e., dp≠ds) so as to face the main speaker 110.

As described above, with the sound image localization apparatus according to the eighth embodiment, a control filter G expressed by Equation (25) can be derived easily based on the size of the image display device 150, the positions of the main speaker 110 and auxiliary speaker 111, and the position of the target sound image 120. As in the sixth embodiment, the sound image localization apparatus of the eighth embodiment enables a sound image to be localized in the target position using the derived control filter G.

Example

To verify the validity of the control filters in the aforementioned embodiments, the inventors did numeric calculations and experiments on the sound image localization apparatuses according to the Examples 1 to 3. A sound image localization apparatus of Example 1 is based on the sixth embodiment. That is, as shown in FIG. 17, the sound image localization apparatus of Example 1 includes an acoustic signal generating unit 101, an amplifier 102, a main speaker 110, a control filter unit 103, an amplifier 104, and an auxiliary speaker 111. The main speaker (also referred to as main sound source) 110 is arranged below a display panel 152 and the auxiliary speaker (also referred to as control sound source) 111 is arranged above the display panel 152.

In the sound image localization apparatus of Example 1, the width W is set to 1.0 m, the height H to 0.7 m, and the hearing distance R to 1.5 m as shown in FIG. 25 on the assumption that a 42-inch liquid-crystal television is used. As an acoustic signal whose sampling frequency Δf is 44.1 kHz, white noise whose frequency characteristic is uniform is used. The distance $d_q$ between the sound source center of the main speaker 110 and the screen center in the width direction is set to 0.5 m, the distance $d_Q$ between the sound source center of the auxiliary speaker 111 and the screen center in the width direction is set to 0.3 m, and the distance between both ears (2×de) is set to 0.3 m.

Figure 26:
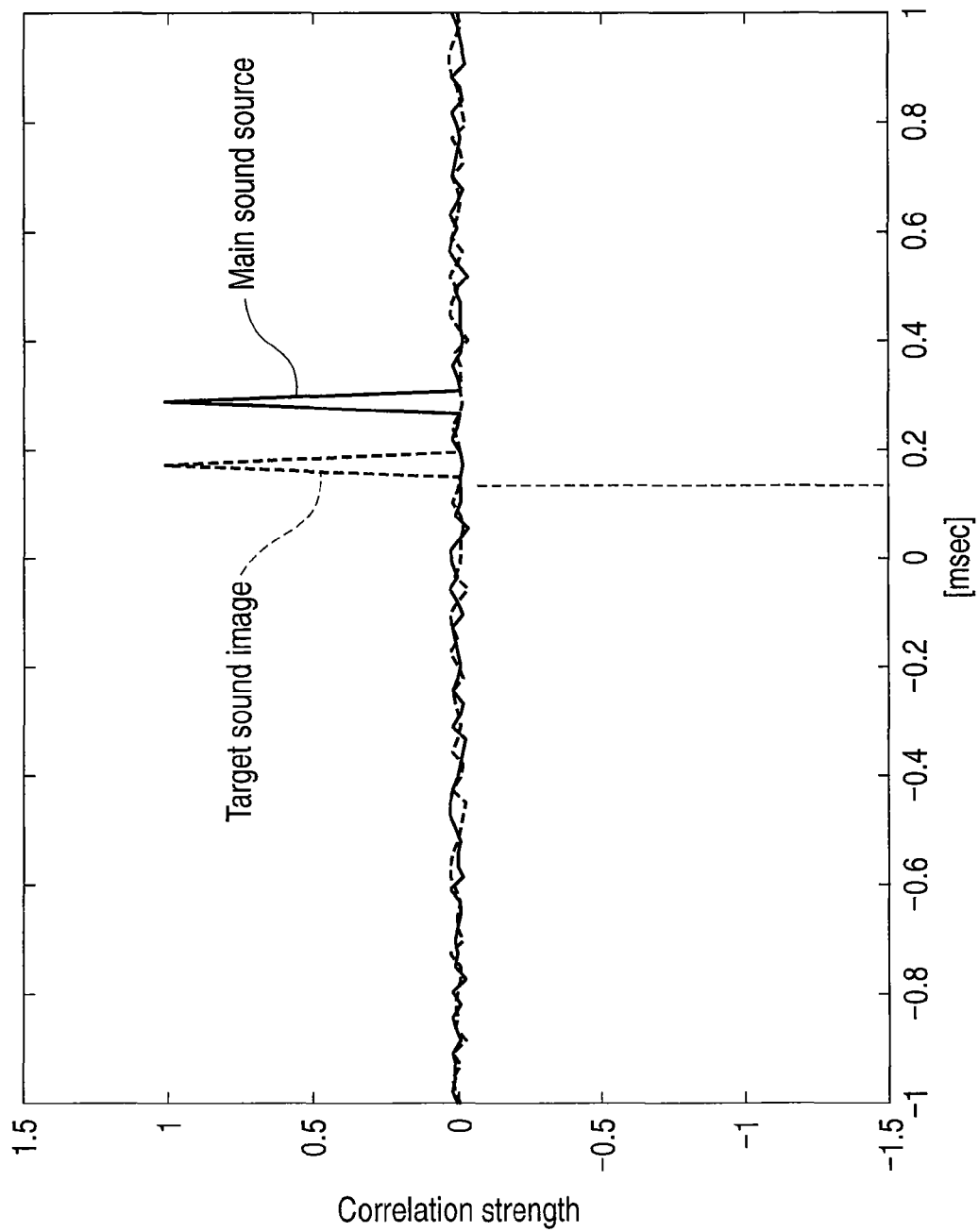
FIG. 26 is a graph showing the result of calculating cross-correlation functions of a main sound source and a target sound image in the speaker arrangement shown in FIG. 25.

FIG. 26 shows the result of calculating a cross-correlation function of a target sound image and that of the main sound source according to Example 1. In FIG. 26, the cross-correlation function of a target sound image and that of a main sound source have been normalized. The cross-correlation function of a target sound image is shown by a broken line and that of a main sound source is shown by a solid line. In the cross-correlation function of a target sound image, a correlation peak appears at correlation time τ=0.158 (msec) (corresponding to 7 taps). The path difference ΔL=5.4 (cm) obtained by multiplying the correlation time by the speed of sound (C=340 m/s) corresponds to the difference between the distance from the position of the target sound image 120 to the right ear position and the distance from the position of the target sound image 120 to the left ear position. In contrast, in the cross-correlation function of the main sound source, a correlation peak appears at correlation time τ=0.272 (msec) (corresponding to 12 taps) and the path difference ΔL=9.3 (cm) is obtained. Therefore, it is seen from FIG. 26 that the position of the target sound image 120 is distinctly different from that of the main speaker 110.

Figure 29A:
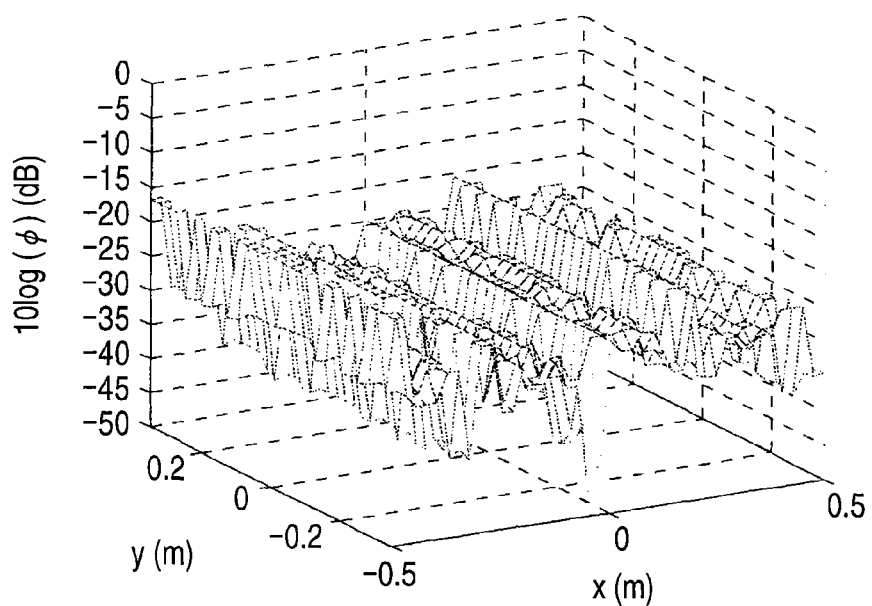
FIG. 29A is a graph three-dimensionally showing a correlation strength distribution of the main sound source of FIG. 27.
Figure 29B:
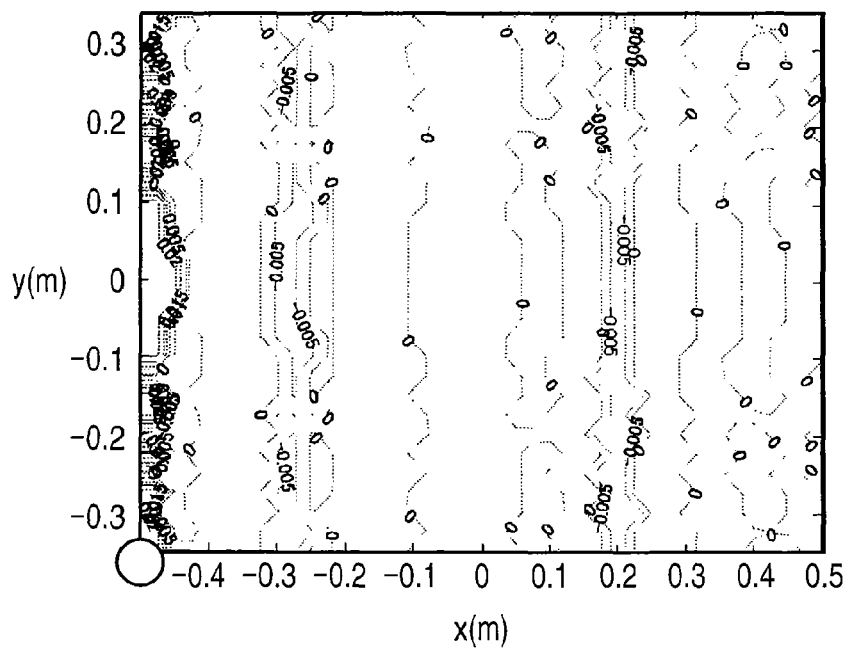
FIG. 29B is a graph showing a correlation strength distribution of the main sound source of FIG. 27.

In the sound image localization apparatus of a first comparative example, the target sound image 120 is set in a position 0.3 m away from the screen center O on the left, that is, set at x=−0.3 [m], y=0 [m]. FIGS. 28A and 28B show a correlation strength distribution of the target sound image when the display panel 152 (x-y plane) is used as an observation plane. FIGS. 29A and 29B show a correlation strength distribution of the main sound source when the display panel 152 is used as an observation plane. The transverse axis in the distribution chart of each of FIGS. 28B and 29B corresponds to the width W of the display panel and the vertical axis corresponds to the height H of the display panel 152. In each of FIGS. 28A and 29A, a correlation strength level (dB) is plotted in the height direction so as to show FIGS. 28B and 29B three-dimensionally.

As shown in FIG. 28B, in the correlation strength distribution of the target sound image, correlation peaks are distributed along a vertical line (or a line in the y-axis direction) including the position of the target sound image 120 indicated by a circle. It is seen from FIG. 28A that the correlation strength does not particularly become larger in the position of the target sound image 120. The same holds true for the correlation strength distribution of the main sound source. As shown in FIG. 29A, correlation peaks are distributed along a vertical line including the position of the main speaker 110 indicated by a circle. It is seen from FIG. 29B that the correlation strength does not particularly become larger in the position of the main speaker 110.

The reason why correlation peaks are distributed along a vertical line is that the path difference ΔL corresponding to the time difference between correlation peaks appearing in FIG. 26 differs less in the vertical direction than in the horizontal direction. This is because the right and left ears of the listener are located so as to correspond to the right and left of the display panel 152.

Next, as a second comparative example, the inventors arranged the auxiliary speaker 111 at the top left corner of the front frame 154 and the main speaker 110 at the bottom left corner of the front frame 154 as shown in FIG. 30A. When the main speaker 110 and auxiliary speaker 111 were caused to output acoustic signals with the same amplitude and same phase simultaneously, the inventors calculated a cross-correlation function based on the sound pressures reaching both ears of the listener 201. The calculation results are shown in FIGS. 30B, 30C, and 30D. As shown in FIGS. 30B and 30C, correlation peaks are distributed along a vertical line including the positions of the main speaker 110 and auxiliary speaker 111, that is, along the left end of the display panel 152. As shown in FIG. 30D, the correlation peak of the synthetic sound source according to the second comparative example does not coincide with the correlation peak of the target sound source. From this, it is seen that a sound image cannot be localized in the position of the target sound image 120 by just arranging the auxiliary speaker 111 just above the main speaker 110 and causing the main speaker 110 and auxiliary speaker 111 to output signals with the same amplitude and same phase.

In the second comparative example, when the auxiliary speaker 111 is arranged at the bottom right corner of the front frame 154, the main speaker 110 and auxiliary speaker 111 take the form of ordinary stereo sound sources. In this case, since synthetic sound pressure signals from the main speaker 110 and auxiliary speaker 111 reaching both ears have the same amplitude and same phase, a sound image is localized strongly in the middle of the display panel 152. The reason why a sound image is not localized strongly in the middle of the display panel 152 when the main speaker 110 and auxiliary speaker 111 are arranged vertically as shown in FIG. 30A is that the both ears of the listener 201 are located horizontally.

When actually having heard a sound with the speaker arrangement shown in FIG. 30A, the inventors sensed a sound image as if it were blurred vertically as shown by the correlation strength distribution shown in FIGS. 30B and 30C. However, when having leaned our heads 90 degrees so that the right and left ears may be located vertically, the inventors sensed a sound image as if it were localized in the middle of the display panel as in stereo.

Furthermore, as a third comparative example, the inventors shifted the auxiliary speaker 111 toward the middle of the display panel 152 and placed it in a position 0.3 m from the middle of the display panel 152 and immediately above the position of the target sound image without changing the arrangement of the main speaker 110 as shown in FIG. 31A. Then, the inventors calculated a correlation strength distribution of a synthetic sound from the main speaker and auxiliary speaker. As described above, the second comparative example has the same speaker arrangement as that of Example 1. In calculating a correlation strength distribution in the third comparative example, too, the main speaker 110 and auxiliary speaker 111 output acoustic signals with the same amplitude and same phase simultaneously. The calculation results are shown in FIGS. 31B and 31C. It is seen from FIGS. 31B and 31C that a sound image is localized in a position 0.1 m away from the middle of the display panel 152 on the left and a correlation peak is localized in a position differing from that of the target sound image 120. Therefore, even if the auxiliary speaker 111 is arranged just above the target sound image 120, that is, in the same horizontal position (x-coordinate), a sound image cannot be localized in the target position merely by causing the main speaker 110 and auxiliary speaker 111 to output signals with the same amplitude and same phase simultaneously.

In addition, the inventors calculated a cross-correlation function of a synthetic sound source according to Example 1 shown in FIG. 32A. In Example 1, the main speaker 110 is arranged at the bottom left corner of the front frame 154 and the auxiliary speaker 111 is arranged at the upper end of the front frame 154 and in a position 0.3 m from the middle of the display panel 152 on the left. Then, an acoustic signal is reproduced by the main speaker 110 and an acoustic signal filtered by a control filter G expressed by Equation (25) is reproduced by the auxiliary speaker 111. In a correlation strength distribution shown in FIGS. 32B and 32C, too, correlation peaks appear along a vertical line including the target sound image 120. Therefore, it is seen that the effect of control filtering takes place as compared with the second comparative example. However, it is seen from FIG. 32B that the correlation strength level (dB) in the position of the target sound image 120 is not too high. The reason for this is that the resolution cannot be increased any further because it is assumed that a spatial transfer function is determined according to the distance in the course of deriving a control filter G due to the fact that the right and left ears of the listener 201 are located horizontally and, at this time, a correlation evaluation is also determined by the distance difference.

Figure 33:
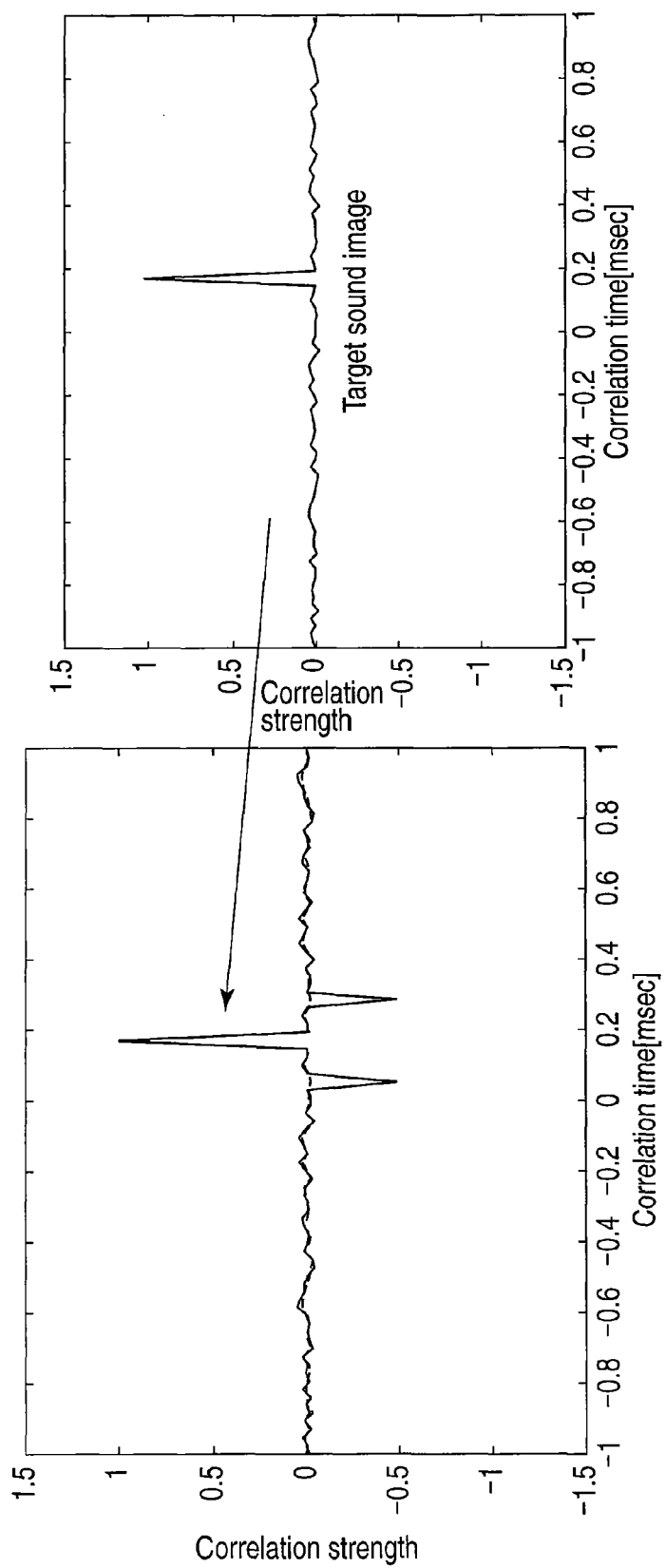
FIG. 33 is a graph showing the result of calculating a cross-correlation function of a synthetic sound source according to Example 1.

Furthermore, the result of calculating a cross-correlation function of a synthetic sound source in Example 1 is shown in FIG. 33. As shown in FIG. 33, correlation peaks appear on both sides of the maximum correlation peak of a controlled synthetic sound source. The maximum correlation peak having a strong effect on sound image localization coincides with the position of the target sound image 120.

It is seen from these that the sound image localization apparatus of Example 1 can localize a sound image in the target position.

Next, to verify that the control filter G has the function of localizing a sound image just below the auxiliary speaker 111, the inventors set, as Example 2, the position of the target sound image 120 in a position 0.2 m from the middle of the display panel 152 on the left as shown in FIG. 34A. Then, the inventors calculated a control filter G and then a correlation strength distribution according to Example 2. In this case, the auxiliary speaker 111 is arranged at the upper end of the front frame 154 and in a position 0.2 m from the middle on the left.

Figure 35A:
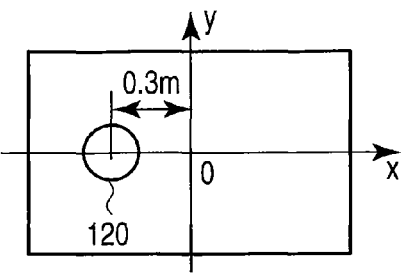
FIG. 35A is a diagram showing the position of a target sound image.
Figure 35B:
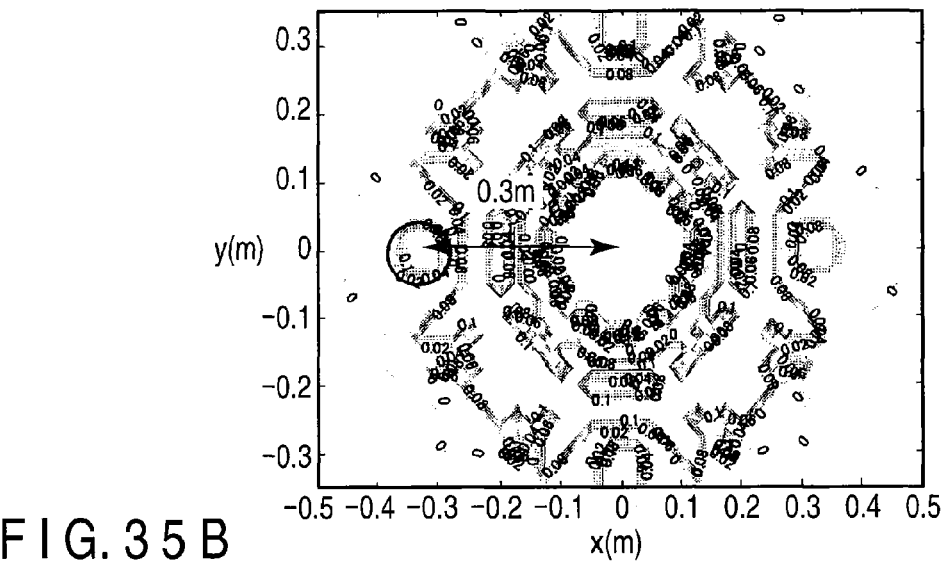
FIG. 35B is a graph showing a correlation strength distribution of the target sound image of FIG. 35A when the listener faces sideways to the display panel.
Figure 35C:
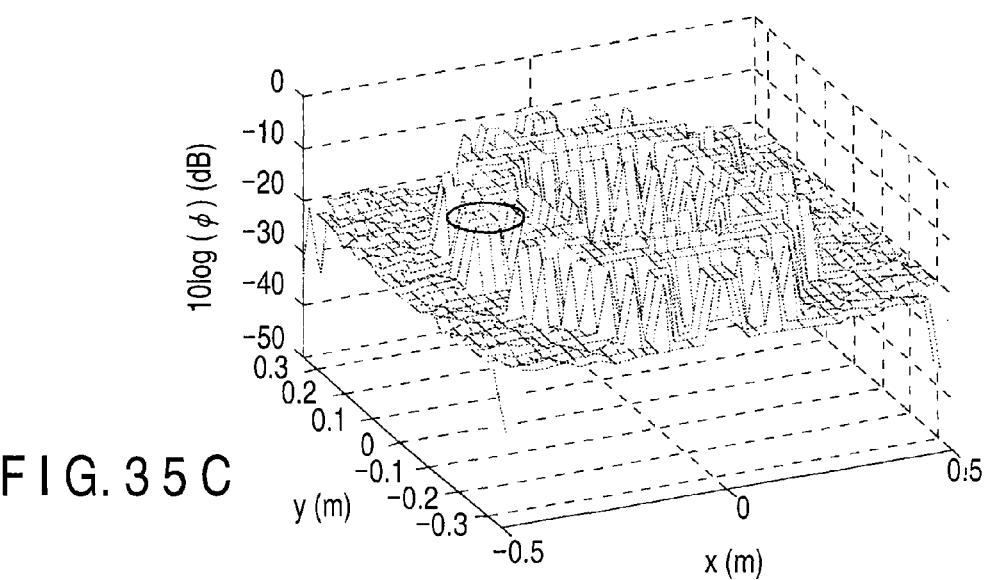
FIG. 35C is a graph three-dimensionally showing a correlation strength distribution of the target sound image of FIG. 35A when the listener faces sideways to the display panel.

The calculation results are shown in FIGS. 34B and 34C. In FIGS. 34B and 35C, correlation peaks are distributed along a vertical line including the position of the target sound image 120. It is seen that a sound image is localized just below the auxiliary speaker 111 even if the position of the target sound image 120 is changed.

Figure 36A:
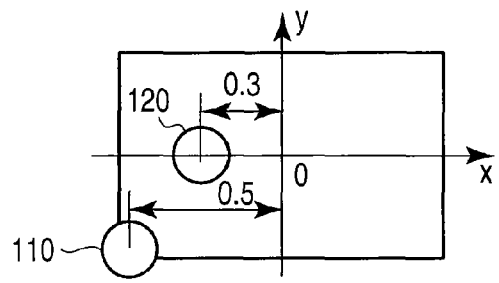
FIG. 36A is a diagram showing the positions of a main speaker and a target sound image.
Figure 36B:
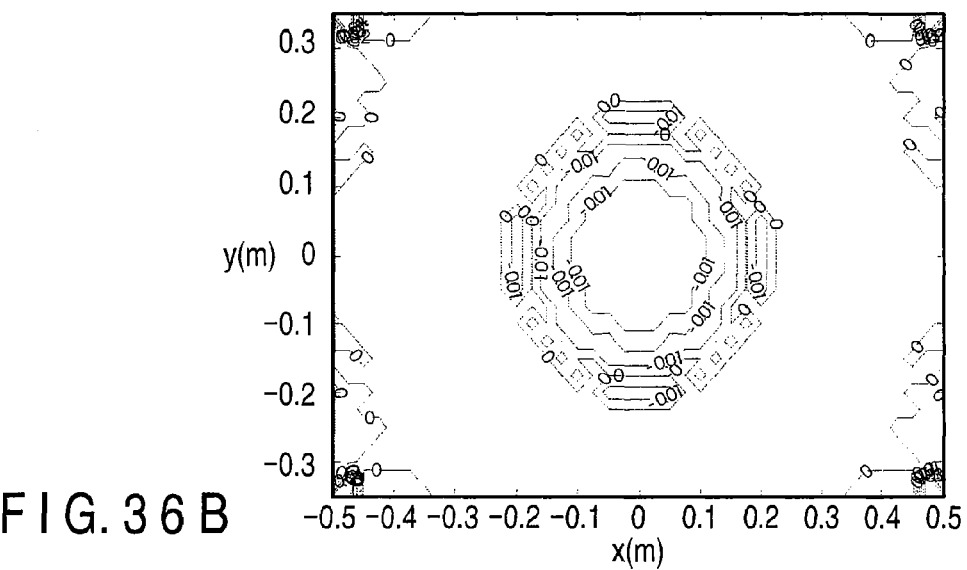
FIG. 36B is a graph showing a correlation strength distribution of the main sound source of FIG. 36A when the listener faces sideways to the display panel.
Figure 36C:
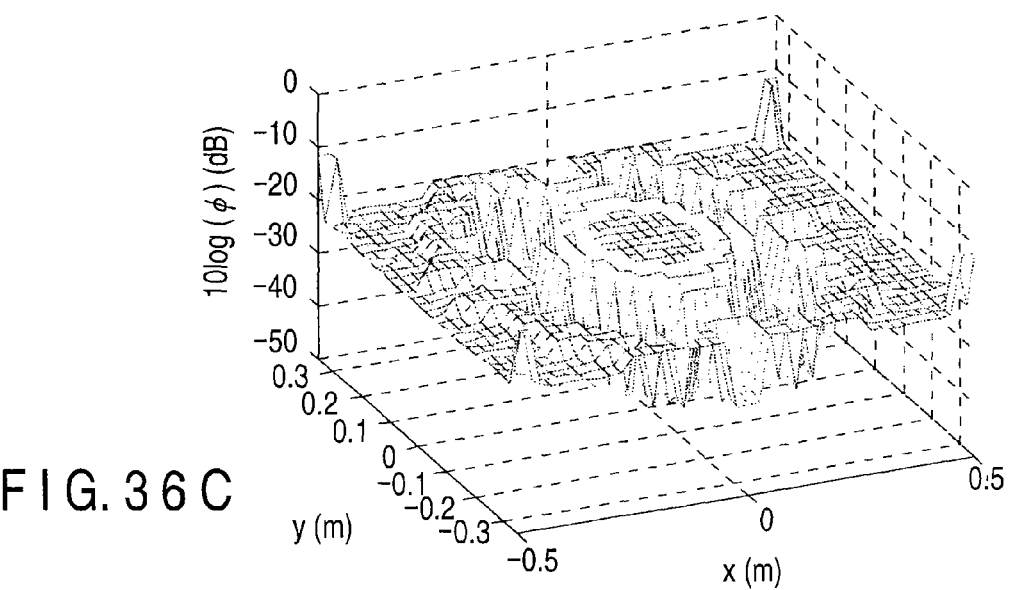
FIG. 36C is a graph three-dimensionally showing a correlation strength distribution of the main sound source of FIG. 36A when the listener faces sideways to the display panel.
Figure 37A:
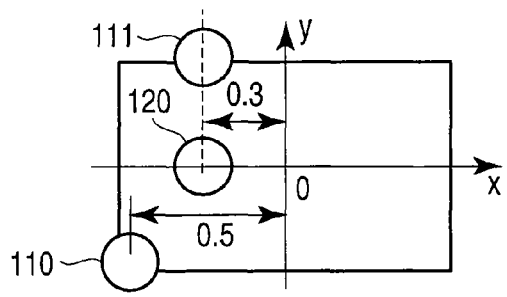
FIG. 37A is a diagram showing the positions of a main speaker, an auxiliary speaker, and a target sound image.
Figure 37B:
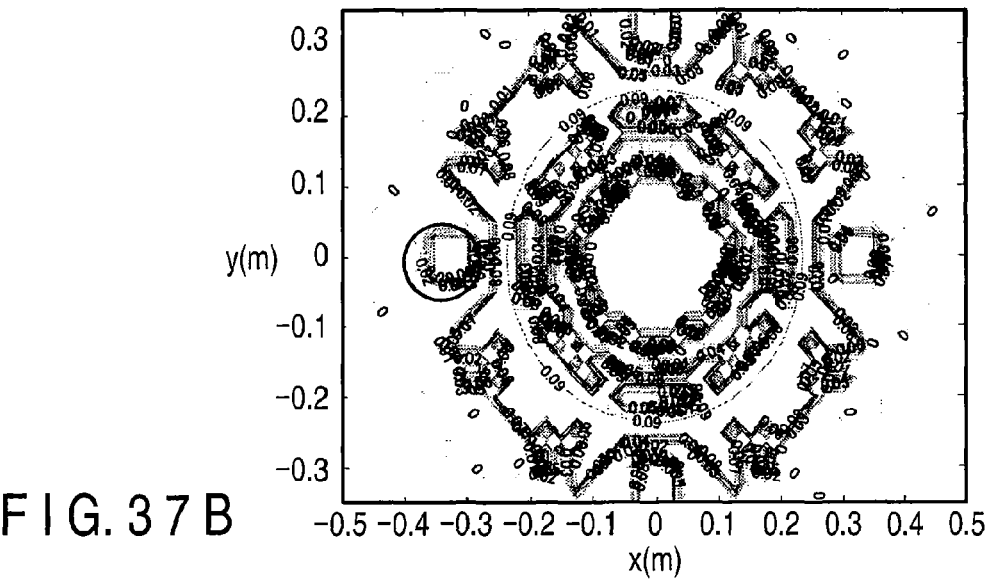
FIG. 37B is a graph showing a correlation strength distribution of a synthetic sound source including the main speaker and auxiliary speaker of FIG. 37A when the listener faces sideways to the display panel.
Figure 37C:
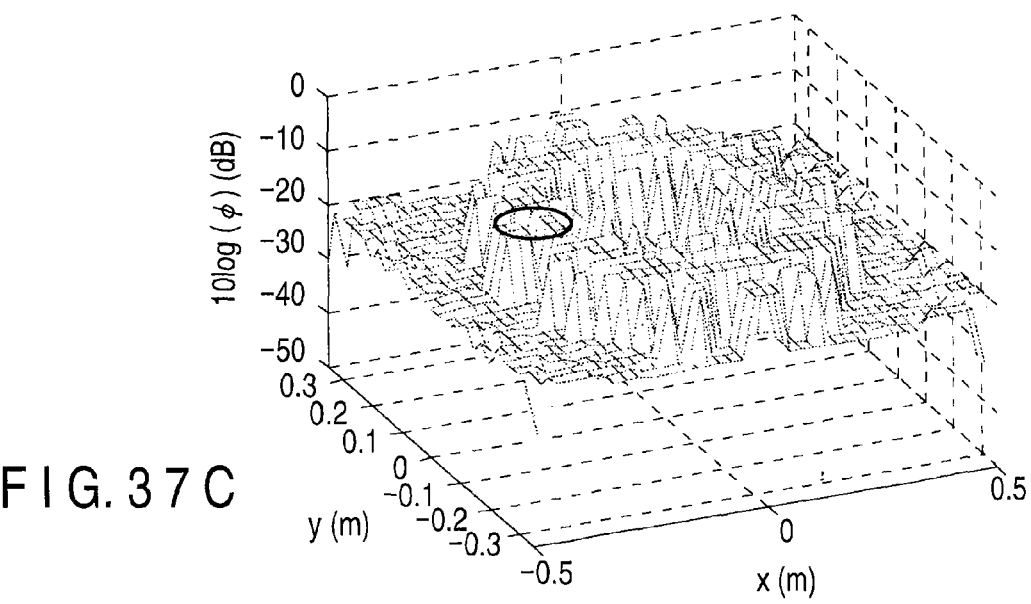
FIG. 37C is a graph three-dimensionally showing a correlation strength distribution of the synthetic sound source including the main speaker and auxiliary speaker of FIG. 37A when the listener faces sideways to the display panel.

To show the significance of sound image localization in Example 1, a correlation strength distribution when the listener 201 faces sideways to the display panel 152 will be explained with reference to FIGS. 35A to 37C. FIGS. 35B and 35C show a correlation strength distribution of the target sound image when the target sound image 120 is arranged 0.3 m away from the screen center O on the left as shown in FIG. 35A. FIGS. 36B and 36C show a correlation strength distribution of the main sound source when the main speaker 110 as shown in FIG. 36A is arranged at the bottom left corner of the front frame 154. FIGS. 37B and 37C show a correlation strength distribution of a synthetic sound source including the main speaker 110 and auxiliary speaker 111 when the main speaker 110 and auxiliary speaker 111 are arranged according to embodiment 1 as shown in FIG. 37A. The amplitude and phase of a sound pressure signal from the auxiliary speaker 111 shown in FIG. 37A are adjusted according to the control filter G expressed by Equation (25). As shown in FIGS. 36B and 36C, a sound image created by the main speaker 110 is localized at one corner of the display panel 152 including the position of the main speaker 110. It is seen that a sound image created by the controlled synthetic sound source shown in FIGS. 37B and 37C coincides with the target sound image 120 shown in FIGS. 35B and 35C.

Figure 38:
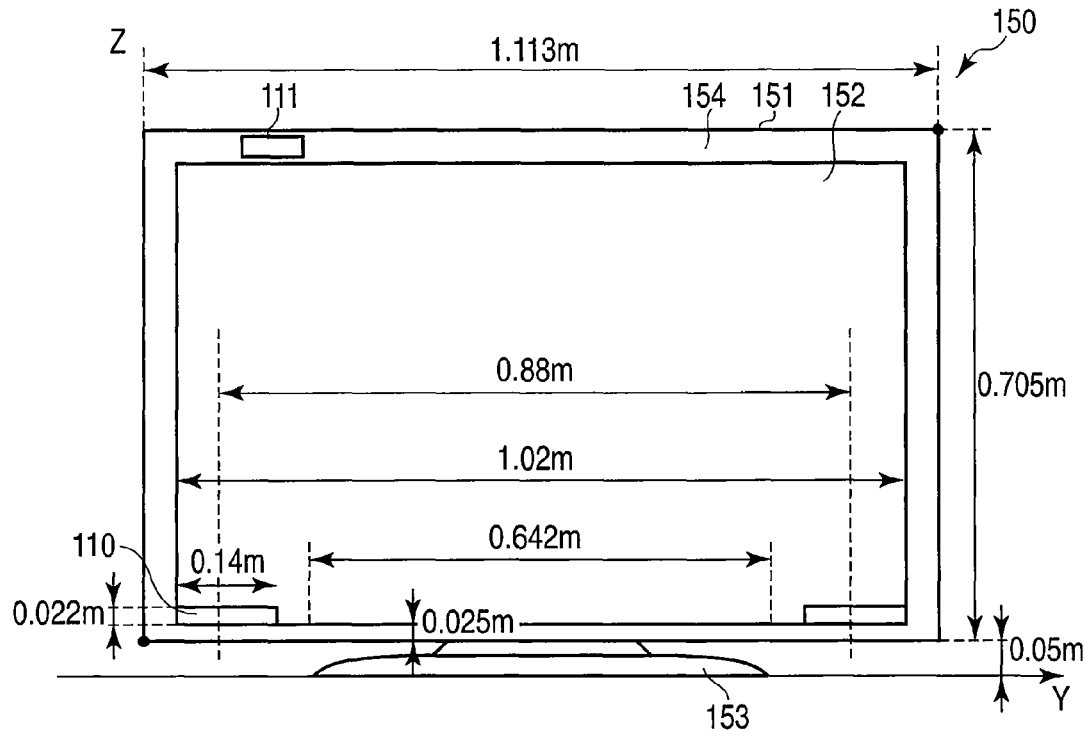
FIG. 38 is a schematic diagram showing an external appearance of a mock-up on which a sound image localization apparatus according to Example 3 is installed.
Figure 39:
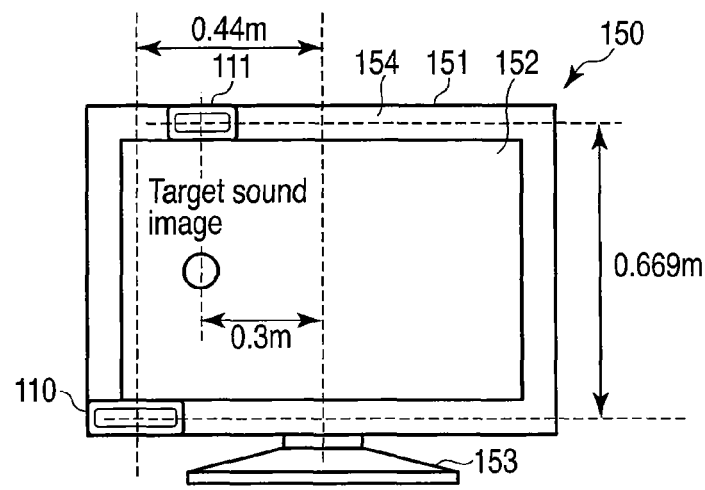
FIG. 39 is a schematic diagram showing an external appearance of a mock-up on which a sound image localization apparatus according to Example 3 is installed.
Figure 40:
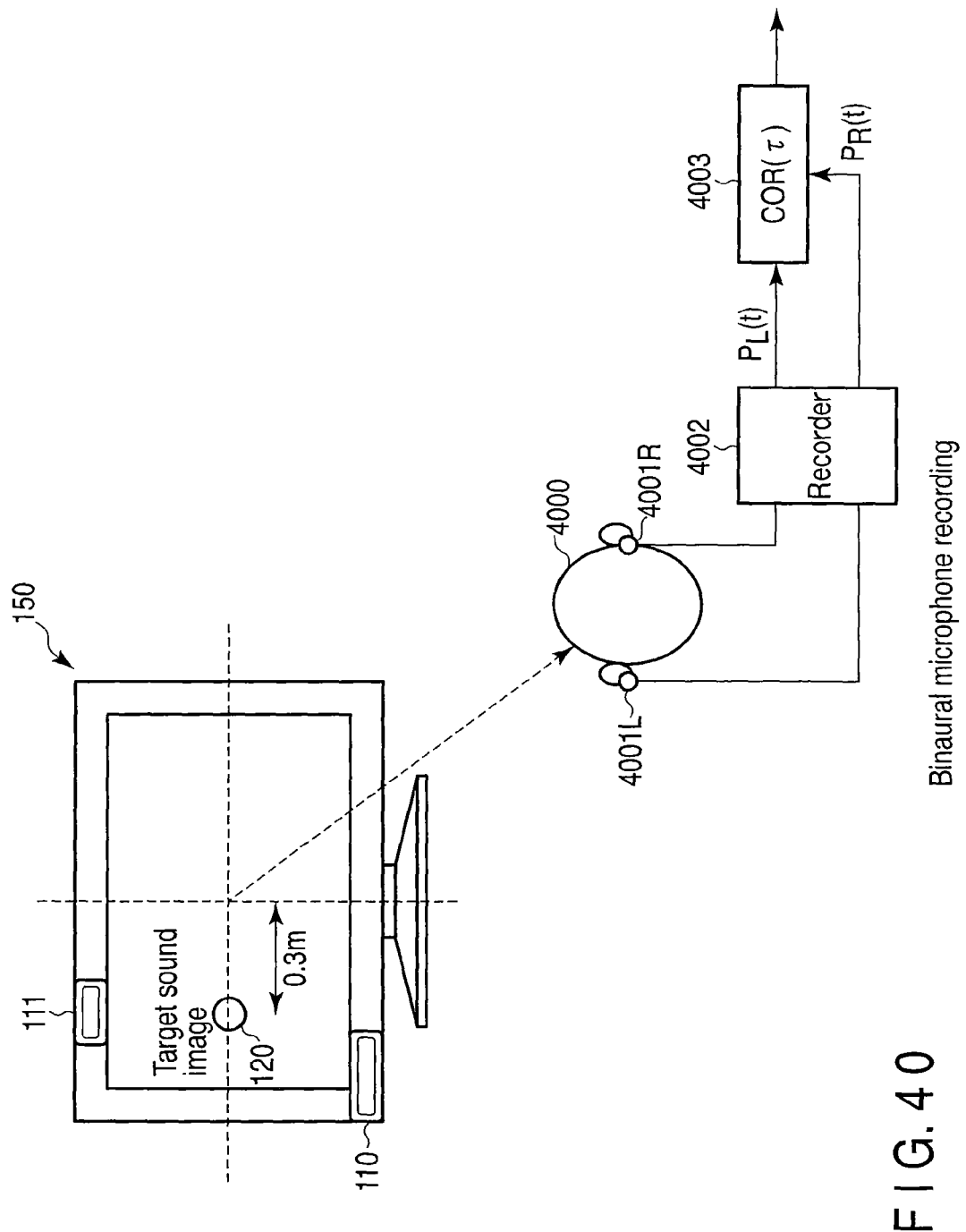
FIG. 40 is a schematic diagram showing a device that measures a cross-correlation function.

Next, as Example 3, the result of conducting a measurement test using a wooden mock-up on the assumption that a large television as shown in FIGS. 38 and 39 was used will be explained. In the mock-up, the width of a housing 151 is 1.113 m, the height of the housing 151 is 0.705 m, the width of a display panel 152 is 1.02 m, and the height of a supporting base 153 is 0.05 m. A main speaker 110 is an elliptical speaker with a 0.14-m major axis and a 0.022-m minor axis. The display panel 152 has the 1.02-m width. The across-the-width distance between the sound source center of the main speaker 110 and the screen center is 0.44 m. The across-the-width distance between the sound source center of an auxiliary speaker 111 and the screen center is 0.3 m. The across-the-width distance between a target sound image 120 and the screen center is 0.3 m. The across-the-height distance between the sound source center of the main speaker 110 and the sound source center of the auxiliary speaker 111 is 0.669 m. A control filter G is calculated using the aforementioned Equation (25).

In the measurement test of Example 3, a dummy head 4000 is arranged in front of the mock-up 150 and a sound pressure is detected by microphones 4001L, 4001R set in both ears of the dummy head 4000. The detected sound pressure signals are recorded by a recorder 4002. Based on the sound pressure output from the recorder 4002, a correlator 4003 calculates a cross-correlation function.

Figure 41:
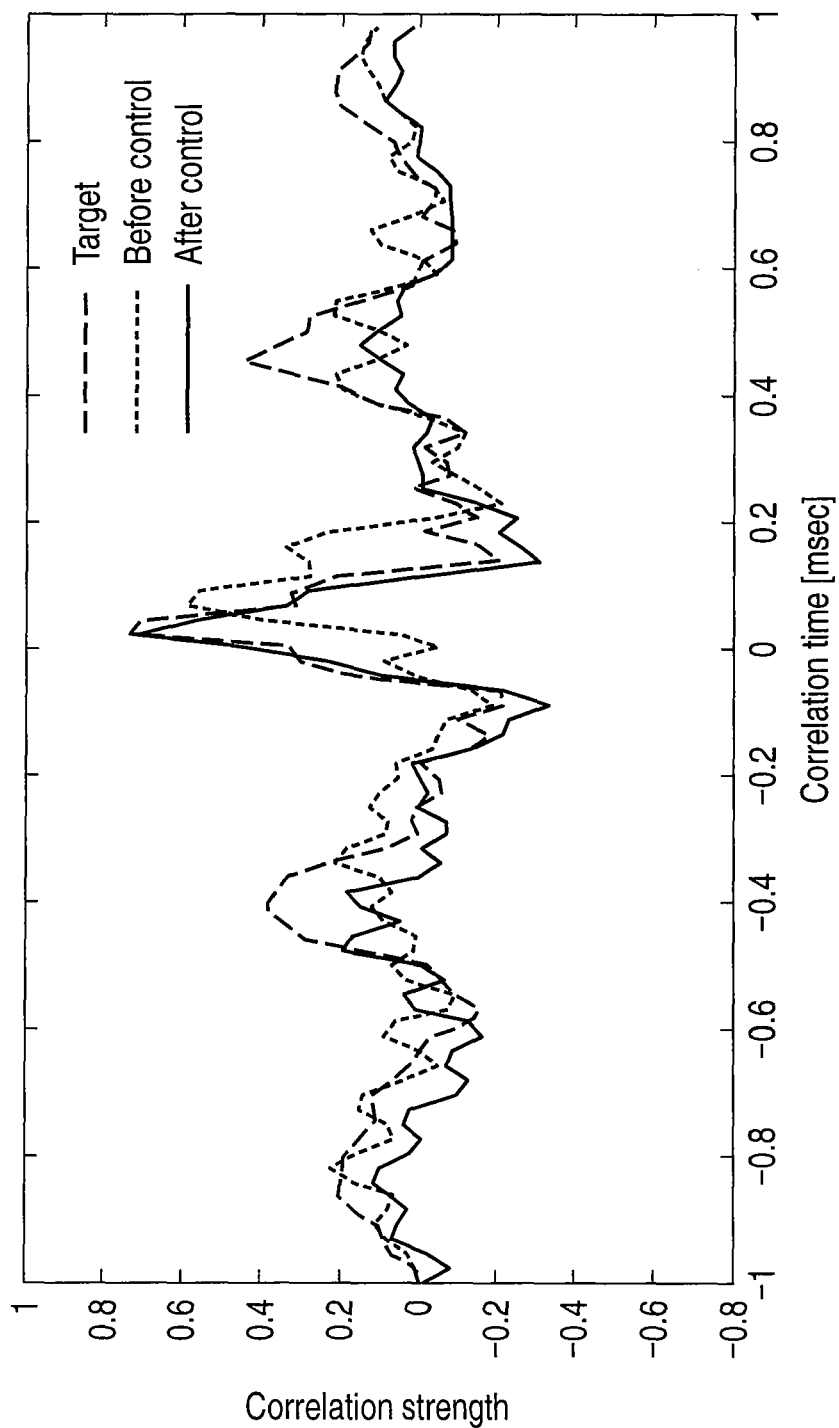
FIG. 41 is a graph showing the result of measuring a cross-correlation function of a synthetic sound source and a target sound image according to Example 3 by using a measuring device of FIG. 40.

First, the elliptical speaker (not shown) is fixed in the position of the target sound image 120 and a cross-correlation function of the target sound image 120 is measured. Then, the elliptic speaker is removed and only the main speaker 110 is caused to make sounds and a cross-correlation function is measured. Thereafter, the main speaker 110 and auxiliary speaker 111 are caused to make sounds at the same time and a cross-correlation function is measured. FIG. 41 shows the result of measuring a cross-correlation function when white noise (0 to 20 kHz) is used as an acoustic signal. In FIG. 41, a cross-correlation function of the target sound image is represented by a dashed line, a cross-correlation function of the main sound source is represented by a dotted line, and a cross-correlation function of a synthetic sound source after control is represented by a solid line. When attention is focused on the maximum correlation peak having a strong effect on localization, the maximum correlation peak of the main sound source is shifted from the maximum correlation peak of the target sound image, but the maximum correlation peak of the synthetic sound source after control almost coincides with the maximum correlation peak of the target sound image. When actually having heard a sound after control, the inventors could sense a sound image in the position of the target sound image.

Figure 42:
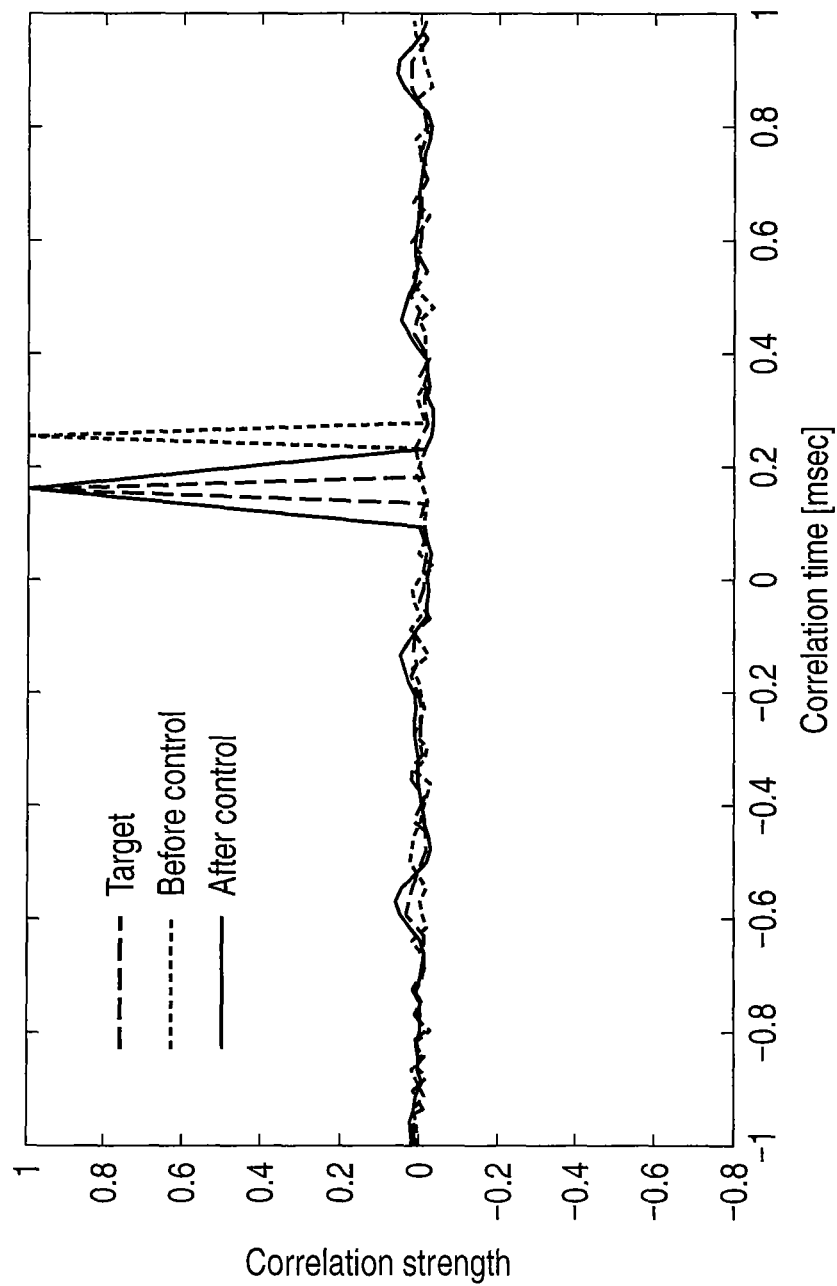
FIG. 42 is a graph showing the result of measuring a cross-correlation function of a synthetic sound source and a target sound image according to Example 3.

FIG. 42 shows the result of calculating a cross-correlation function of the synthetic sound source after control using the dimensions of the mock-up shown in FIGS. 38 and 39. FIG. 42 further shows a cross-correlation function of the target sound image 120 and a cross-correlation function of the main sound source. In FIG. 42, the cross-correlation functions have been normalized. The position of the maximum correlation peak after control (the position of the sound image) in each of actual measurements and calculation results almost coincides with that of the target sound image 120. The length of time when a correlation peak of the main sound source moved almost coincides with the length of time when a correlation peak of the synthetic sound source moved. The reason why the comparison between actual measurements and calculation results has shown that the correlation time showing a correlation peak is shifted about 0.05 msec is that the positions of both ears in actual measurements deviate a little from the calculated positions of both ears. If the positions of both ears are shifted 1 cm, the correlation time is shifted about 0.03 msec.

Next, the result of measuring a cross-correlation function using a music signal with a sampling frequency of 44.1 kHz as an acoustic signal is shown in FIG. 43. FIG. 43 shows not only a cross-correlation function of the main sound source and that of a synthetic sound source but also the result of actually measuring a cross-correlation function of a control sound source. Here, the cross-correlation function of the control sound source shows the result of actually measuring a cross-correlation function obtained when a filtered acoustic signal is reproduced by the auxiliary speaker 111. In FIG. 43, a cross-correlation function of the main sound source is represented by a dashed line, a cross-correlation function of the control sound source is represented by a dotted line, and a cross-correlation function of the synthetic sound source after control is represented by a solid line. It is seen from FIG. 43 that the maximum correlation peak of the synthetic sound source gets closer to the origin than the maximum correlation peak of the main sound source, approaches the maximum correlation peak of the target sound image 120, and becomes the highest of the three.

When having actually heard a synthetic sound after control using a music signal as an acoustic signal, the inventors could sense a sound image more clearly than white noise as if a speaker were placed in the position of the target sound image 120. The reason why the correlation peak presents periodicity more clearly than when white noise is used is that a specific frequency band is emphasized in a music signal as compared with white noise whose frequency characteristic is uniform, showing a frequency characteristic at the time of evaluation.

According to a sound image localization apparatus of at least one embodiment described above, an acoustic signal adjusted by applying a control filter is reproduced with an auxiliary speaker, thereby enabling a sound image to be localized in a target position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for localizing a sound image in a target position from which a synthesized sound is directed to a viewing area in front of a display device, the apparatus comprising:
a first signal generating unit configured to generate a first acoustic signal;
a first speaker provided on the display device and configured to generate a first sound according to the first acoustic signal;
an input unit configured to input a localization magnification n;
a first control filter unit configured to adjust the first acoustic signal with a first control filter G1 expressed by Equation (101) to generate a first adjusted acoustic signal, the first control filter G1 being calculated based on the input localization magnification n;
a second speaker provided on the display device and configured to generate a second sound according to the first adjusted acoustic signal;
a second control filter unit configured to adjust the first acoustic signal with a second control filter G2 expressed by Equation (102) to generate a second adjusted acoustic signal, the second control filter G2 being calculated based on the input localization magnification n; and
a third speaker provided on the display device and configured to generate a third sound according to the second adjusted acoustic signal, wherein the first, second and third sounds are produced as the synthesized sound in the viewing area:

$$G_1 = \alpha + \beta \cdot G_2 \quad (101)$$

$$G_2 = -\frac{\sum_{i=1}^{N} A_i \cdot B_i^*}{\sum_{i=1}^{N} B_i \cdot B_i^*} \quad (102)$$

where $$A_i = (1 - 2n)W_{Ri} + \alpha \cdot U_{Ri1}$$

$$B_i = \beta \cdot U_{Ri1} + U_{Ri2}$$

$$\alpha = \frac{(2n - 1)\sum_{i=1}^{N}(W_{Li} \cdot U_{Li1}^*)}{\sum_{i=1}^{N}(U_{Li1} \cdot U_{Li1}^*)}$$

$$\beta = \frac{\sum_{i=1}^{N}(U_{Li2} \cdot U_{Li1}^*)}{\sum_{i=1}^{N}(U_{Li1} \cdot U_{Li1}^*)}$$

N denotes a number of left ear positions which are set along a direction perpendicular to a display panel included in the display device, N also denotes a number of right ear positions which are set in parallel with the left ear positions respectively, $W_{Li}$ denotes a transfer function determined by a linear distance between the first speaker and an i-th left ear position of the left ear positions, $W_{Ri}$ denotes a transfer function determined by a linear distance between the first speaker and an i-th right ear position of the right ear positions, $U_{Li1}$ denotes a transfer function determined by a linear distance between the second speaker and the i-th left ear position, $U_{Ri1}$ denotes a transfer function determined by a linear distance between the second speaker and the i-th right ear position, $U_{Li2}$ denotes a transfer function determined by a linear distance between the third speaker and the i-th left ear position, $U_{Ri2}$ denotes a transfer function determined by a linear distance between the third speaker and the i-th right ear position, and i is an arbitrary natural number not more than N.

2. The apparatus according to claim 1, wherein the display device includes a housing configured to house the display panel, the housing includes a front frame having an opening to expose the display panel, the front frame includes an upper end part and a lower end part which are arranged opposite to each other, the display panel is interposed between the upper end part and lower end part, the first speaker is arranged on the lower end part, and the second and third speakers are arranged on the upper end part.

3. The apparatus according to claim 1, further comprising:
a second signal generating unit configured to generate a second acoustic signal, wherein the first and second acoustic signals correspond to two channels of a stereo signal;
a fourth speaker provided on the display device and configured to generate a fourth sound according to the second acoustic signal, the first and fourth speakers being arranged substantially symmetrically with respect to a virtual vertical plane passing a center of the display panel;
a third control filter unit configured to adjust the second acoustic signal with the first control filter G1 to generate a third adjusted acoustic signal;
a fifth speaker provided on the display device and configured to generate a fifth sound according to the third adjusted acoustic signal, the second and fifth speakers being arranged substantially symmetrically with respect to the virtual vertical plane;
a fourth control filter unit configured to adjust the second acoustic signal with the second control filter G2 to generate a fourth adjusted acoustic signal; and
a sixth speaker provided on the display device and configured to generate a sixth sound according to the fourth adjusted acoustic signal, the third and sixth speakers being arranged substantially symmetrically with respect to the virtual vertical plane, wherein the first, second, third, fourth, fifth, and sixth sounds are produced as the synthesized sound in the viewing area.

4. An apparatus for localizing a sound image in a target position from which a synthesized sound is directed to a viewing area in front of a display device, the apparatus comprising:
a first signal generating unit configured to generate a first acoustic signal;
a first speaker provided on the display device and configured to generate a first sound according to the first acoustic signal;
a first control filter unit configured to adjust the first acoustic signal with a control filter G calculated in accordance with Equation (104) under condition that Equation (103) is satisfied to generate a first adjusted acoustic signal; and a second speaker provided on the display device and configured to generate a second sound according to the first adjusted acoustic signal, wherein the first and second sounds are produced as the synthesized sound in the viewing area:

$$\Delta N = \left| \frac{(L_{Tq\_R} + L_{Q\_L} - L_{Tq\_L} - L_{Q\_R}) \cdot \Delta f}{C} \right| > 0 \quad (103)$$

$$G = -\frac{\dfrac{e^{-jk(L_{Tq\_R}+L_{q\_L})}}{L_{Tq\_R} \cdot L_{q\_L}} - \dfrac{e^{-jk(L_{Tq\_L}+L_{q\_R})}}{L_{Tq\_L} \cdot L_{q\_R}}}{\dfrac{e^{-jk(L_{Tq\_R}+L_{Q\_L})}}{L_{Tq\_R} \cdot L_{Q\_L}} - \dfrac{e^{-jk(L_{Tq\_L}+L_{Q\_R})}}{L_{Tq\_L} \cdot L_{Q\_R}}} \quad (104)$$

where $L_{Tq\_R}$ denotes a linear distance between the target position and a right ear position which is set in the viewing area, $L_{Tq\_L}$ denotes a linear distance between the target position and a left ear position which is set in parallel with the right ear position, $L_{q\_R}$ denotes a linear distance between the first speaker and the right ear position, $L_{q\_L}$ denotes a linear distance between the first speaker and the left ear position, $L_{Q\_R}$ denotes a linear distance between the second speaker and the right ear position, $L_{Q\_L}$ denotes a linear distance between the second speaker and the left ear position, $\Delta N$ denotes a tap difference, k denotes a wave number, j denotes an imaginary unit, C denotes a speed of sound, and $\Delta f$ denotes a sampling frequency of the first acoustic signal.

5. The apparatus according to claim 4, further comprising:

a second signal generating unit configured to generate a second acoustic signal, wherein the first and second acoustic signals correspond to two channels of a stereo signal;

a third speaker provided on the display device and configured to generate a third sound according to the second acoustic signal, the first and third speakers being arranged substantially symmetrically with respect to a virtual vertical plane which passes a center of the display panel;

a second control filter unit configured to adjust the second acoustic signal with the control filter G to generate a second adjusted acoustic signal; and a fourth speaker provided on the display device and configured to generate a fourth sound according to the second adjusted acoustic signal, the second and fourth speakers being arranged substantially symmetrically with respect to the virtual vertical plane, wherein the first, second, third, and fourth sounds are produced as the synthesized sound in the viewing area.

6. An apparatus for localizing a sound image in a target position from which a synthesized sound is directed to a viewing area in front of a display device, the apparatus comprising:

a first signal generating unit configured to generate a first acoustic signal;

a first speaker provided on the display device and configured to generate a first sound according to the first acoustic signal;

an input unit configured to input a localization magnification n;

a first control filter unit configured to adjust the first acoustic signal with a first control filter G1 calculated in accordance with Equation (106) under condition that Equation (105) is satisfied to generate a first adjusted acoustic signal;

a second speaker provided on the display device and configured to generate a second sound according to the first adjusted acoustic signal;

a second control filter unit configured to adjust the first acoustic signal with a second control filter G2 calculated in accordance with Equation (106) under condition that Equation (105) is satisfied to generate a second adjusted acoustic signal; and a third speaker provided on the display device and configured to generate a third sound according to the second adjusted acoustic signal, wherein the first, second and third sounds are produced as the synthesized sound in the viewing area:

$$\Delta N = \left| \frac{(L_{UL1} + L_{UR2} - L_{UL2} - L_{UR1}) \cdot \Delta f}{C} \right| > 0 \quad (105)$$

$$\begin{pmatrix} G_1 \\ G_2 \end{pmatrix} = (1 - 2n) \begin{pmatrix} U_{L1} & U_{L2} \\ U_{R1} & U_{R2} \end{pmatrix}^{-1} \begin{pmatrix} W_L \\ W_P \end{pmatrix} \quad (106)$$

where $W_L$ denotes a transfer function determined by a linear distance between the first speaker and a left ear position which is set in the viewing area, $W_R$ is a transfer function determined by a linear distance between the first speaker and a left ear position which is set in parallel with the right ear position, $U_{L1}$ denotes a transfer function determined by a linear distance $L_{UL1}$ between the second speaker and the left ear position, $U_{R1}$ denotes a transfer function determined by a linear distance $L_{UR1}$ between the second speaker and the right ear position, $U_{L2}$ denotes a transfer function determined by a linear distance $L_{UL2}$ between the third speaker and the left ear position, $U_{R2}$ denotes a transfer function determined by a linear distance $L_{UR2}$ between the third speaker and the right ear position, $\Delta N$ denotes a tap difference, C denotes a speed of sound, and $\Delta f$ denotes a sampling frequency of the first acoustic signal.

* * * * *